(12) United States Patent  
Conrad et al.

(10) Patent No.: US 11,602,758 B2  
(45) Date of Patent: Mar. 14, 2023

(54) SURFACE CLEANING APPARATUS

(71) Applicant: Omachron Intellectual Property Inc., Hampton (CA)

(72) Inventors: Wayne Ernest Conrad, Hampton (CA); Daniel Innes, West Roxbury, MA (US)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 17/553,961

(22) Filed: Dec. 17, 2021

(65) Prior Publication Data

US 2022/0184640 A1 Jun. 16, 2022

Related U.S. Application Data

(63) Continuation of application No. 16/911,851, filed on Jun. 25, 2020, now Pat. No. 11,235,339, which is a  
(Continued)

(51) Int. Cl.  
*B01D 45/16* (2006.01)  
*B04C 5/187* (2006.01)  
(Continued)

(52) U.S. Cl.  
CPC ............... *B04C 5/187* (2013.01); *A47L 5/00* (2013.01); *A47L 9/165* (2013.01); *A47L 9/1608* (2013.01);  
(Continued)

(58) Field of Classification Search  
CPC .. B04C 5/187; B04C 5/28; B04C 9/00; B04C 2009/002; A47L 5/00; A47L 9/1608;  
(Continued)

(56) References Cited

U.S. PATENT DOCUMENTS

| 334,234 A | 1/1886 | Josz |
| 2,119,478 A | 5/1938 | Whiton, Jr. |

(Continued)

FOREIGN PATENT DOCUMENTS

| CA | 2971067 A1 | 7/2017 |
| CN | 1729924 A | 2/2006 |

(Continued)

OTHER PUBLICATIONS

TotalPatent: English translation of CN1969739, as published on May 30, 2007.

(Continued)

*Primary Examiner* — Dung H Bui  
(74) *Attorney, Agent, or Firm* — Philip C. Mendes da Costa; Bereskin & Parr LLP/ S.E.N.C.R.L., s.r.l.

(57) ABSTRACT

A hand vacuum cleaner has an air treatment stage positioned below an inlet conduit. A pistol grip handle is provided at the rear end of the hand vacuum cleaner. An arm member extends from the inlet conduit linearly rearwardly to the upper end of the pistol grip handle. A housing is provided at a lower end of the pistol grip handle. All operating components of the hand vacuum cleaner are located between a lower end of the housing and the inlet conduit.

19 Claims, 42 Drawing Sheets

Related U.S. Application Data continuation of application No. 16/201,602, filed on Nov. 27, 2018, now Pat. No. 10,828,650.

(60) Provisional application No. 62/734,603, filed on Sep. 21, 2018.

(51) Int. Cl.
  *B04C 9/00* (2006.01)
  *B04C 5/28* (2006.01)
  *A47L 9/16* (2006.01)
  *A47L 5/00* (2006.01)

(52) U.S. Cl.
  CPC ........... *A47L 9/1641* (2013.01); *A47L 9/1658* (2013.01); *A47L 9/1683* (2013.01); *B01D 45/16* (2013.01); *B04C 5/28* (2013.01); *B04C 9/00* (2013.01); *A47L 9/1625* (2013.01); *B04C 2009/002* (2013.01)

(58) Field of Classification Search
  CPC ...... A47L 9/1641; A47L 9/165; A47L 9/1658; A47L 9/1683; A47L 9/1625; B01D 45/16
  See application file for complete search history.

(56) References Cited

U.S. PATENT DOCUMENTS

| | | |
|---|---|---|
| 2,370,444 A | 2/1945 | Bowman |
| 2,461,677 A | 2/1949 | Burdock et al. |
| 2,643,737 A | 6/1953 | Bowers et al. |
| 2,734,630 A | 2/1956 | Van Der Wal |
| 2,754,968 A | 7/1956 | Vegter et al. |
| 2,867,290 A | 1/1959 | Mcgrane |
| 3,425,192 A | 2/1969 | Davis |
| 4,235,363 A | 11/1980 | Liller |
| 6,192,515 B1 | 2/2001 | Doshi et al. |
| 6,334,234 B1 | 1/2002 | Conrad et al. |
| 6,341,404 B1 | 1/2002 | Salo et al. |
| 6,607,407 B2 | 8/2003 | Takatsuki et al. |
| 6,662,403 B2 | 12/2003 | Oh |
| 7,065,826 B1 | 6/2006 | Arnold |
| 7,335,242 B2 | 2/2008 | Oh |
| 7,488,362 B2 | 2/2009 | Jeong et al. |
| 7,494,523 B2 | 2/2009 | Oh et al. |
| 7,540,894 B2 | 6/2009 | Ni |
| 7,645,309 B2 | 1/2010 | Jeong et al. |
| 7,651,544 B1 | 1/2010 | Fester et al. |
| 7,803,207 B2 | 9/2010 | Conrad |
| 7,857,878 B2 | 12/2010 | Park et al. |
| 7,867,308 B2 | 1/2011 | Conrad |
| 7,883,560 B2 | 2/2011 | Ni |
| 7,887,612 B2 | 2/2011 | Conrad |
| 7,931,716 B2 | 4/2011 | Oakham |
| 7,951,218 B2 | 5/2011 | Oh |
| 8,176,597 B2 | 5/2012 | Stein et al. |
| 8,192,515 B2 | 6/2012 | Conrad |
| 8,282,697 B2 | 10/2012 | Oh |
| 8,334,234 B2 | 12/2012 | Jones et al. |
| 8,387,204 B2 | 3/2013 | Dyson |
| 8,522,395 B2 | 9/2013 | Oh et al. |
| 8,607,407 B2 | 12/2013 | Conrad |
| 9,066,643 B2 | 6/2015 | Conrad |
| 9,211,046 B2 | 12/2015 | Peace |
| 9,314,139 B2 | 4/2016 | Conrad et al. |
| 9,370,285 B2 | 6/2016 | Visel et al. |
| 9,399,182 B2 | 7/2016 | Pesetsky et al. |
| 9,474,425 B2 | 10/2016 | Gui et al. |
| 9,591,958 B2 | 3/2017 | Conrad |
| 9,607,407 B2 | 3/2017 | Dunaisky et al. |
| 9,629,511 B2 | 4/2017 | Conrad |
| 9,888,817 B2 | 2/2018 | Conrad |
| 9,986,880 B2 | 6/2018 | Conrad |
| 10,165,915 B2 | 1/2019 | Conrad et al. |
| 10,258,210 B2 | 4/2019 | Conrad |
| 10,376,112 B2 * | 8/2019 | Conrad ............ A47L 5/32 |
| 10,646,082 B2 * | 5/2020 | Nam ............ A47L 9/1608 |
| 2002/0088079 A1 | 7/2002 | Oh |
| 2002/0116907 A1 | 8/2002 | Gammack et al. |
| 2003/0106182 A1 | 6/2003 | Lee |
| 2003/0150324 A1 | 8/2003 | West |
| 2004/0112022 A1 | 6/2004 | Vuijk |
| 2005/0050865 A1 | 3/2005 | Oh et al. |
| 2005/0251951 A1 | 11/2005 | Oh et al. |
| 2005/0252179 A1 | 11/2005 | Oh et al. |
| 2006/0090290 A1 * | 5/2006 | Lau ............ A47L 5/24 15/344 |
| 2006/0123590 A1 | 6/2006 | Fester et al. |
| 2006/0137304 A1 | 6/2006 | Jeong et al. |
| 2006/0137309 A1 | 6/2006 | Jeong et al. |
| 2006/0156508 A1 * | 7/2006 | Khalil ............ A47L 9/1666 15/353 |
| 2006/0168923 A1 | 8/2006 | Lee et al. |
| 2006/0207231 A1 | 9/2006 | Arnold |
| 2006/0230715 A1 | 10/2006 | Oh et al. |
| 2006/0230716 A1 | 10/2006 | Oh et al. |
| 2006/0230717 A1 | 10/2006 | Oh et al. |
| 2006/0230719 A1 | 10/2006 | Han et al. |
| 2006/0230720 A1 | 10/2006 | Han et al. |
| 2006/0230726 A1 | 10/2006 | Oh et al. |
| 2006/0254226 A1 | 11/2006 | Jeon |
| 2006/0286499 A1 | 12/2006 | Kim |
| 2007/0011999 A1 | 1/2007 | Oh |
| 2007/0079580 A1 | 4/2007 | Oh |
| 2007/0079581 A1 | 4/2007 | Kim et al. |
| 2007/0079582 A1 | 4/2007 | Oh |
| 2007/0079583 A1 | 4/2007 | Oh |
| 2007/0079584 A1 | 4/2007 | Kim et al. |
| 2007/0079585 A1 | 4/2007 | Oh et al. |
| 2007/0079586 A1 | 4/2007 | Kim |
| 2007/0079587 A1 | 4/2007 | Kim |
| 2007/0084160 A1 | 4/2007 | Kim |
| 2007/0095030 A1 | 5/2007 | Oh |
| 2007/0144116 A1 | 6/2007 | Hong et al. |
| 2007/0209334 A1 | 9/2007 | Conrad |
| 2007/0214754 A1 | 9/2007 | Kim |
| 2007/0289267 A1 | 12/2007 | Makarov et al. |
| 2008/0104795 A1 | 5/2008 | Lang |
| 2008/0172995 A1 | 7/2008 | Conrad |
| 2008/0184681 A1 | 8/2008 | Oh et al. |
| 2008/0184893 A1 | 8/2008 | Oh et al. |
| 2008/0190080 A1 | 8/2008 | Oh et al. |
| 2008/0209869 A1 | 9/2008 | Rother et al. |
| 2008/0264017 A1 | 10/2008 | Oh et al. |
| 2008/0289139 A1 | 11/2008 | Makarov et al. |
| 2009/0100633 A1 | 4/2009 | Bates et al. |
| 2009/0113663 A1 | 5/2009 | Follows et al. |
| 2009/0113861 A1 | 5/2009 | Seo et al. |
| 2009/0173365 A1 | 7/2009 | Conrad |
| 2009/0181841 A1 | 7/2009 | Conrad |
| 2009/0193771 A1 | 8/2009 | Oh et al. |
| 2009/0241491 A1 | 10/2009 | Han et al. |
| 2009/0300872 A1 | 12/2009 | Griffith et al. |
| 2009/0313958 A1 | 12/2009 | Gomiciaga-Pereda et al. |
| 2010/0115726 A1 | 5/2010 | Groff et al. |
| 2010/0132316 A1 | 6/2010 | Ni |
| 2010/0139033 A1 | 6/2010 | Makarov et al. |
| 2010/0154367 A1 | 6/2010 | Luo et al. |
| 2010/0205916 A1 | 8/2010 | Yoo |
| 2010/0205917 A1 | 8/2010 | Oh |
| 2010/0213118 A1 | 8/2010 | Tandon |
| 2010/0251506 A1 | 10/2010 | Conrad |
| 2010/0251507 A1 | 10/2010 | Conrad |
| 2010/0275561 A1 | 11/2010 | Lundquist et al. |
| 2012/0036675 A1 | 2/2012 | Conrad |
| 2012/0167336 A1 | 7/2012 | Tran et al. |
| 2012/0210537 A1 | 8/2012 | Makarov et al. |
| 2012/0222232 A1 | 9/2012 | Conrad |
| 2012/0222250 A1 | 9/2012 | Conrad |
| 2012/0222251 A1 | 9/2012 | Conrad |
| 2012/0222252 A1 | 9/2012 | Conrad |
| 2012/0222257 A1 | 9/2012 | Conrad |
| 2012/0297740 A1 | 11/2012 | Cheng |
| 2013/0031878 A1 | 2/2013 | Menssen |

(56) References Cited

U.S. PATENT DOCUMENTS

| | | |
|---|---|---|
| 2013/0055691 A1 | 3/2013 | Kim et al. |
| 2013/0091655 A1* | 4/2013 | Smith ............... A47L 9/28 15/344 |
| 2013/0091660 A1 | 4/2013 | Smith |
| 2013/0091661 A1 | 4/2013 | Smith |
| 2013/0091812 A1 | 4/2013 | Smith |
| 2013/0091813 A1 | 4/2013 | Smith |
| 2013/0118960 A1 | 5/2013 | Tandon |
| 2013/0152522 A1 | 6/2013 | Stippich et al. |
| 2013/0227813 A1 | 9/2013 | Conrad |
| 2013/0232722 A1 | 9/2013 | Conrad |
| 2013/0247764 A1 | 9/2013 | Kvamsdal et al. |
| 2013/0255203 A1 | 10/2013 | Muenkel et al. |
| 2013/0291334 A1 | 11/2013 | Peng |
| 2013/0327002 A1 | 12/2013 | Ackermann et al. |
| 2014/0237762 A1 | 8/2014 | Conrad |
| 2014/0237956 A1 | 8/2014 | Conrad |
| 2014/0245566 A1 | 9/2014 | Conrad |
| 2015/0182085 A1 | 7/2015 | Tran et al. |
| 2015/0223657 A1 | 8/2015 | Choe et al. |
| 2015/0230677 A1* | 8/2015 | Andrikanish ........... A47L 9/102 15/353 |
| 2015/0359394 A1* | 12/2015 | Peace ............... A47L 9/1683 15/344 |
| 2016/0008741 A1 | 1/2016 | Beg et al. |
| 2016/0206169 A1 | 7/2016 | Hyun et al. |
| 2017/0280950 A1 | 10/2017 | Nam et al. |
| 2017/0280951 A1 | 10/2017 | Nam et al. |
| 2017/0280952 A1 | 10/2017 | Nam et al. |
| 2017/0280959 A1 | 10/2017 | Nam et al. |
| 2017/0290480 A1 | 10/2017 | Conrad |
| 2017/0303759 A1 | 10/2017 | Conrad et al. |
| 2017/0332860 A1 | 11/2017 | Nam et al. |
| 2018/0043292 A1 | 2/2018 | Carroll |
| 2018/0184861 A1* | 7/2018 | Brown ............... B25F 5/02 |
| 2019/0001348 A1 | 1/2019 | Ingram et al. |
| 2019/0003388 A1 | 1/2019 | Atsuchi et al. |
| 2019/0008338 A1 | 1/2019 | Conrad |
| 2019/0021564 A1* | 1/2019 | Walker ............... A47L 9/322 |
| 2019/0090701 A1* | 3/2019 | Tonderys ............... A47L 9/2884 |
| 2019/0091703 A1 | 3/2019 | Hyun et al. |
| 2019/0099766 A1 | 4/2019 | Krishnamurthy et al. |
| 2019/0174984 A1 | 6/2019 | Machida et al. |
| 2019/0277227 A1 | 9/2019 | Larson |
| 2019/0282052 A1 | 9/2019 | Conrad et al. |
| 2019/0357741 A1 | 11/2019 | Conrad |
| 2020/0009487 A1 | 1/2020 | Vanaudenhove et al. |
| 2020/0046190 A1 | 2/2020 | Conrad |
| 2020/0129028 A1 | 4/2020 | Rougher et al. |

FOREIGN PATENT DOCUMENTS

| | | | | |
|---|---|---|---|---|
| CN | 1875846 | A | | 12/2006 |
| CN | 1875855 | A | | 12/2006 |
| CN | 1887437 | A | | 1/2007 |
| CN | 1969739 | A | | 5/2007 |
| CN | 100998484 | A | | 7/2007 |
| CN | 101108081 | A | | 1/2008 |
| CN | 101108111 | A | | 1/2008 |
| CN | 201008534 | Y | | 1/2008 |
| CN | 201131706 | Y | | 10/2008 |
| CN | 201398933 | Y | | 2/2010 |
| CN | 202277306 | U | | 6/2012 |
| CN | 101612025 | B | | 8/2014 |
| CN | 205251427 | U | | 5/2016 |
| CN | 205625805 | U | | 10/2016 |
| CN | 205671987 | U | | 11/2016 |
| CN | 106343919 | A | | 1/2017 |
| CN | 206138051 | U | | 5/2017 |
| CN | 106974586 | A | | 7/2017 |
| CN | 106993983 | A | | 8/2017 |
| CN | 108209714 | A | | 6/2018 |
| CN | 108463151 | A | * | 8/2018 ............... A47L 5/24 |
| CN | 109330476 | A | | 2/2019 |
| CN | 110167410 | A | * | 8/2019 ............... A47L 5/24 |
| CN | 110062595 | B | * | 4/2021 ............... A47L 5/24 |
| DE | 60201666 | T2 | | 6/2006 |
| DE | 202006017010 | U1 | | 2/2007 |
| DE | 60211663 | T2 | | 5/2007 |
| DE | 102004028678 | B4 | | 9/2007 |
| DE | 102007011457 | A1 | | 10/2007 |
| DE | 102004055192 | B4 | | 11/2007 |
| DE | 102006027456 | A1 | | 12/2007 |
| DE | 102004028677 | B4 | | 1/2008 |
| DE | 102005015004 | B4 | | 2/2008 |
| DE | 102005008278 | B4 | | 3/2008 |
| DE | 102006055099 | A1 | | 5/2008 |
| DE | 102005014541 | B4 | | 8/2008 |
| DE | 112006003479 | T5 | | 12/2008 |
| DE | 112007001314 | T5 | | 4/2009 |
| DE | 602006000726 | T2 | | 4/2009 |
| DE | 102008055045 | A1 | | 6/2010 |
| DE | 112011104642 | T5 | | 10/2013 |
| DE | 112012000251 | T5 | | 10/2013 |
| DE | 202010018047 | U1 | | 11/2013 |
| DE | 202010018084 | U1 | | 2/2014 |
| DE | 202010018085 | U1 | | 2/2014 |
| DE | 102014200663 | A1 | | 7/2014 |
| GB | 2402049 | A | * | 12/2004 ............... A47L 9/104 |
| GB | 2454292 | A | | 5/2009 |
| GB | 2476776 | B | | 7/2012 |
| JP | 08322769 | A | | 12/1996 |
| JP | 2005342334 | A | | 12/2005 |
| KR | 1020010024752 | A | | 3/2001 |
| KR | 1020050108623 | A | | 11/2005 |
| KR | 1020060008365 | A | | 1/2006 |
| KR | 1020050119738 | A | | 2/2006 |
| KR | 1020060081229 | A | | 7/2006 |
| KR | 1020060118800 | A | | 11/2006 |
| KR | 1020060118801 | A | | 11/2006 |
| KR | 1020060122249 | A | | 11/2006 |
| KR | 1020060122521 | A | | 11/2006 |
| KR | 1020060125952 | A | | 12/2006 |
| KR | 1020080039105 | A | | 5/2008 |
| WO | 2010048305 | A2 | | 4/2010 |
| WO | 2014131105 | A1 | | 9/2014 |
| WO | 2016065151 | A1 | | 4/2016 |
| WO | 2017046560 | A1 | | 3/2017 |
| WO | 2017181041 | A3 | | 12/2017 |
| WO | 2018119510 | A1 | | 7/2018 |

OTHER PUBLICATIONS

TotalPatent: English translation of CN101108081, as published on Jan. 23, 2008.

TotalPatent: English translation of CN201008534, as published on Jan. 23, 2008.

TotalPatent: English translation of CN202277306, as published on Jun. 20, 2012.

TotalPatent: English translation of DE60201666, as published on Jun. 1, 2006.

TotalPatent: English translation of DE60211663, as published on May 10, 2007.

TotalPatent: English translation of DE 102004028677, as published on Jan. 10, 2008.

TotalPatent: English translation of DE102004028678, as published on Sep. 6, 2007.

TotalPatent: English translation of DE 102004055192, as published on Nov. 15, 2007.

TotalPatent: English translation of DE102005008278, as published on Mar. 27, 2008.

TotalPatent: English translation of DE 102005014541, as published on Aug. 28, 2008.

TotalPatent: English translation of DE 102005015004, as published on Feb. 7, 2008.

TotalPatent: English translation of DE 102006027456, as published on Dec. 13, 2007.

TotalPatent: English translation of DE102006055099, as published on May 29, 2008.

(56) References Cited

OTHER PUBLICATIONS

TotalPatent: English translation of DE102007011457, as published on Oct. 25, 2007.
TotalPatent: English translation of DE112006003479, as published on Dec. 18, 2008.
TotalPatent: English translation of DE112007001314, as published on Apr. 23, 2009.
TotalPatent: English translation of DE112011104642, as published on Oct. 2, 2013.
TotalPatent: English translation of DE112012000251, as published on Oct. 17, 2013.
TotalPatent: English translation of DE202006017010, as published on Feb. 8, 2007.
TotalPatent: English translation of DE202010018047, as published on Nov. 14, 2013.
TotalPatent: English translation of DE202010018084, as published on Feb. 27, 2007.
TotalPatent: English translation of DE202010018085, as published on Feb. 27, 2007.
TotalPatent: English translation of DE602006000726, as published on Apr. 16, 2009.
TotalPatent: English translation of JP2005342334, as published on Dec. 15, 2005.
TotalPatent: English translation of KR1020010024752, as published on Mar. 26, 2001.
TotalPatent: English translation of KR1020050108623, as published on Nov. 17, 2005.
TotalPatent: English machine translation of KR1020060008365, published on Jan. 26, 2006.
TotalPatent: English machine translation of KR1020060081229, published on Jul. 12, 2006.
TotalPatent: English machine translation of KR1020060118801, published on Nov. 24, 2006.
English machine translation of DE102014200663, published on Jul. 31, 2014.
English machine translation of CN206138051, published on May 3, 2017.
English machine translation of CN205671987, published on Nov. 9, 2016.
English machine translation of CN205251427, published on May 25, 2016.
English machine translation of CN 106993983, published on Aug. 1, 2017.
English machine translation of CN 106343919, published on Jan. 25, 2017.
English machine translation of CN205625805, published on Oct. 12, 2016.
English machine translation of CN 109330476, published on Feb. 15, 2019.
English machine translation of CN108209714, published on Jun. 29, 2018.
English machine translation of CN 106974586, published on Jul. 25, 2017.
English machine translation of KR1020060118800, published on Nov. 24, 2006.
English machine translation of DE102008055045, published on Jun. 24, 2010.
English machine translation of CN201131706, published on Oct. 15, 2008.
English machine translation of CN101612025, published on Dec. 30, 2009.
English machine translation of CN101108111, published on Jan. 23, 2008.
English machine translation of CN 100998484, published on Jul. 18, 2007.
English machine translation of JP08322769, published on Dec. 10, 1996.
English machine translation of CN 1887437, published on Jan. 3, 2007.
English machine translation of CN 1729924, published on Feb. 8, 2006.
English machine translation of CN 1875855, published on Dec. 13, 2006.
English machine translation of CN 1875846, published on Dec. 13, 2006.
International Search Report and Written Opinion received in connection to international patent application No. PCT/CA2017/051571, dated Mar. 28, 2018.
Corrected Written Opinion of the International Searching Authority, received in connection to international patent application No. PCT/CA2017/050504, dated Aug. 15, 2017.
International Search Report and Written Opinion received in connection to international patent application No. PCT/CA2017/050504, dated Aug. 15, 2017.
International Search Report and Written Opinion, received in connection to international patent application No. PCT/CA2019/051250, dated Nov. 28, 2019.
English machine translation of CN201398933, published on Feb. 10, 2010.
International Preliminary Report on Patentability, received in connection to international patent application No. PCT/CA2019/051250, dated Apr. 1, 2021.
TotalPatent: English machine translation of KR1020060122249A, published on.
TotalPatent: English machine translation of KR1020060122521A, published on.
TotalPatent: English machine translation of KR1020060125952A, published on.
TotalPatent: English machine translation of KR1020080039105A, published on.

* cited by examiner

SURFACE CLEANING APPARATUS

CROSS-REFERENCE TO RELATED APPLICATION

This application is a continuation of co-pending U.S. patent application Ser. No. 16/911,851, filed on Jun. 25, 2020, which itself is a continuation of co-pending U.S. application Ser. No. 16/201,602, filed Nov. 27, 2018 and issued as U.S. Pat. No. 10,828,650 on Nov. 10, 2020, which itself claims the benefit under 35 U.S.C. 119(e) of U.S. Provisional Application Ser. No. 62/734,603, filed on Sep. 21, 2018, the content of each of which is incorporated herein by reference.

FIELD

This disclosure relates generally to cyclone assemblies for surface cleaning apparatus, and more specifically to cyclone assemblies that have a cyclonic cleaning stage that includes a plurality of cyclones arranged in parallel.

INTRODUCTION

Various types of surface cleaning apparatus are known, including upright surface cleaning apparatus, canister surface cleaning apparatus, stick surface cleaning apparatus, hand carriable surface cleaning apparatus, and central vacuum systems.

Surface cleaning apparatus that use one or more cyclonic cleaning stages to remove particulate matter (e.g. dust and dirt) from an airstream are known.

A second cyclonic cleaning stage, which may comprise a plurality of cyclones in parallel, may be provided downstream of a first air treatment member (e.g. a first cyclonic cleaning stage) and upstream of the suction motor. The second cyclonic cleaning stage is typically provided to remove particulate matter from the airstream exiting the first air treatment member and was not removed from the airstream by the first air treatment member.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, a cyclonic cleaning stage (which may be referred to as a downstream cyclonic cleaning stage or as a second cyclonic cleaning stage if an upstream air treatment member such an upstream cyclonic cleaning stage is provided) may be used as an air treatment member downstream of a primary air treatment member to remove particulate matter (e.g. dirt, dust) from an airflow exiting the first air treatment member. The cyclonic cleaning stage includes a plurality of second stage cyclone chambers arranged in parallel. Each second stage cyclone chamber has a dirt outlet configured such that at least a portion of, and preferably most or substantially all of the dirt exiting a second stage cyclone travels in a radial direction (i.e. approximately perpendicular to the cyclone axis of the second stage cyclone chamber). Such a dirt outlet may be characterized as a 'sideways' dirt outlet. A dirt collection plenum may be provided between the dirt outlets of two or more second stage cyclone chambers and a second stage dirt collection region.

Providing sideways dirt outlets for the second stage cyclone chambers may facilitate a more compact design of the cyclonic cleaning stage. For example, the cyclonic cleaning stage may have an overall length that is about the same as the length of the second stage cyclone chambers.

In accordance with this broad aspect, there is provided a surface cleaning apparatus comprising:

(a) an upstream air treatment member;

(b) a downstream cyclonic cleaning stage comprising a plurality of cyclones in parallel, each cyclone having a cyclone axis of rotation, a first end, an axially spaced apart second end, a sidewall extending between the first and second ends, an air inlet, an air outlet and a sideways dirt outlet;

(c) a dirt collection chamber; and (d) a dirt collection plenum positioned between at least some of the dirt outlets and the dirt collection chamber.

In some embodiments, the cyclone air inlets may have a radial outward extent and the dirt collection plenum may have a radial outer extent that is spaced radially outwardly of the radial outward extent of the cyclone air inlets.

In some embodiments, a plane that is transverse to the cyclone axis of rotation may extend through the cyclone and the dirt collection plenum.

In some embodiments, the plane may extend through the sideways dirt outlets.

In some embodiments, the cyclone air inlets may comprise a passage having an inlet end and an outlet end, and the dirt collection plenum may have a radial outer extent that is spaced radially outwardly of the inlet end of the cyclone air inlets.

In some embodiments, a plane that is transverse to the cyclone axis of rotation may extend through the cyclone and the dirt collection plenum.

In some embodiments, the plane may extend through the sideways dirt outlets.

In some embodiments, the sideways dirt outlet may comprise an opening in the sidewall.

In some embodiments, at least a portion of the sidewall may be spaced from the second end wall, whereby the sideways dirt outlet comprises a space between the sidewall and the second end wall.

In some embodiments, the sideways dirt outlet may direct dirt outwardly in a plane generally transverse to the cyclone axis of rotation into the dirt collection plenum.

In some embodiments, the plurality of cyclones may comprise a first cyclone and a second cyclone and a portion of the dirt collection plenum may be positioned between the first and second cyclones and the sideways dirt outlet of the first cyclone may direct dirt towards the portion.

In some embodiments, each cyclone may have a radially inner side, a radially outer side and lateral sides provided between the radially inner and radially outer sides and the sideways dirt outlet may be provided in one of the lateral sides.

In accordance with another aspect of this disclosure, at least a portion of, and preferably most or substantially all of a second stage dirt collection plenum may be positioned radially outwardly of the second stage cyclone chambers. Providing a dirt collection plenum radially outwardly of the second stage cyclone chambers may facilitate a more compact design of the second cyclonic cleaning stage. For example, such a design may allow an air inlet for the second cyclonic cleaning stage to be provided radially inward of the second stage cyclone chambers.

In accordance with this broad aspect, there is provided a surface cleaning apparatus comprising:

(a) an upstream air treatment member;

(b) a downstream cyclonic cleaning stage comprising a plurality of cyclones in parallel, each cyclone having a cyclone axis of rotation, a first end, an axially spaced apart second end, a sidewall extending between the first and second ends, an air inlet, an air outlet and a dirt outlet;

(c) a dirt collection chamber; and, (d) a dirt collection plenum positioned between at least some of the dirt outlets and the dirt collection chamber, wherein the cyclone air inlets have a radial outward extent and the dirt collection plenum has a radial outer extent that is spaced radially outwardly of the radial outward extent of the cyclone air inlets.

In accordance with another aspect of this disclosure, a cyclonic cleaning stage may be configured such that a plane perpendicular to a cyclone axis of a cyclone chamber that extends through a dirt outlet of that cyclone chamber also extends through a dirt collection plenum. Such a design may have one or more advantages. For example, providing a portion of a dirt collection plenum on the same plane as the cyclone chamber dirt outlets may result in a more compact design of a cyclonic cleaning stage.

In accordance with this broad aspect, there is provided a surface cleaning apparatus comprising:

(a) an upstream air treatment member;

(b) a downstream cyclonic cleaning stage comprising a plurality of cyclones in parallel, each cyclone having a cyclone axis of rotation, a first end, an axially spaced apart second end, a sidewall extending between the first and second ends, an air inlet, an air outlet and a dirt outlet;

(c) a dirt collection chamber; and, (d) a dirt collection plenum positioned between at least some of the dirt outlets and the dirt collection chamber, wherein a plane that is transverse to the cyclone axis of rotation extends through the sideways dirt outlets and the dirt collection plenum.

In accordance with either of these aspects, there is provided a surface cleaning apparatus comprising:

(a) an air flow path extending from a dirty air inlet to a clean air outlet with a suction motor provided in the air flow path;

(b) a cyclonic cleaning stage provided in the air flow path, the cyclonic cleaning stage comprising a plurality of cyclones in parallel, each cyclone having a cyclone axis of rotation, a first end, an axially spaced apart second end, a sidewall extending between the first and second ends, an air inlet, an air outlet and a sideways dirt outlet;

(c) a dirt collection chamber; and, (d) a dirt collection plenum located between first and second axially spaced apart walls and positioned radially from the dirt outlets, wherein the second wall has a first opening communicating with the dirt collection chamber.

In some embodiments, the air inlets and the air outlets may be provided at the first end of the cyclones and the dirt outlet may be provided at the second end of the cyclones.

In some embodiments, the sideways dirt outlets may comprise openings in the sidewalls.

In some embodiments, the sideways dirt outlets may direct dirt outwardly in a plane generally transverse to the cyclone axis of rotation into the dirt collection plenum.

In some embodiments, the plurality of cyclones may comprise a first cyclone and a second cyclone and a portion of the dirt collection plenum may be positioned between the first and second cyclones and the sideways dirt outlet of the first cyclone directs dirt towards the portion.

In some embodiments, each cyclone may have a radially inner side, a radially outer side and lateral sides provided between the radially inner and radially outer sides and the sideways dirt outlet may be provided in one of the lateral sides.

In some embodiments, a portion of the air flow path may extend along the length of the cyclones from second end to the first end wherein the portion of the air flow path extends through the first and second axially spaced apart walls of the dirt collection plenum.

In some embodiments, the dirt collection plenum may be located radially outwardly from the dirt outlets.

In some embodiments, a portion of the air flow path may extend through the first and second axially spaced apart walls of the dirt collection plenum and may extend through a radial inner central portion of the cyclonic cleaning stage.

In some embodiments, the dirt collection plenum may be located radially inwardly from the dirt outlets.

In some embodiments, a portion of the air flow path may extend along an axially extending passage surrounding at least a portion of the cyclonic cleaning stage.

In some embodiments, a portion of the air flow path may extend along an axially extending passage surrounding the cyclonic cleaning stage.

In some embodiments, a plane that is transverse to the cyclone axes of rotation may extend through the cyclones and the dirt collection plenum.

In some embodiments, the plane may extend through the sideways dirt outlets.

In some embodiments, the air inlets may produce a direction of rotation in the cyclones and, for at least some of the cyclones of the plurality of cyclones, the dirt outlet may be located, based on the direction of rotation, to direct dirt towards the first opening.

In some embodiments, some of the cyclones of the plurality of cyclones have a clockwise direction of rotation and a remainder of the cyclones of the plurality of cyclones have a counterclockwise direction of rotation.

In some embodiments, for at least some of the cyclones, the air inlet may be configured to produce a direction of rotation such that dirt exiting the sideways dirt outlet travels in a direction towards the first opening.

In some embodiments, when the surface cleaning apparatus is used to clean a floor, the first opening may be located at a lower end of the dirt collection plenum.

In some embodiments, the second wall may have a second opening and, for some of the cyclones of the plurality of cyclones, the dirt outlet may be located based on a direction of rotation of the cyclone to direct dirt towards the first opening and, for a remainder of the cyclones of the plurality of cyclones, the dirt outlet may be located based on a direction of rotation of the cyclone to direct dirt towards the second opening.

In some embodiments, the surface cleaning apparatus may further comprise an upstream air treatment member and the dirt collection chamber may extend axially along at least a portion of the upstream air treatment member.

In some embodiments, the surface cleaning apparatus may be a hand vacuum cleaner having a front end and a rear end and the dirt collection chamber may have a front openable door.

In some embodiments, the front openable door may be openable concurrently with a dirt collection region of the upstream air treatment member.

In some embodiments, the air inlets may be provided at the first end of the cyclones, the dirt outlet may be provided at the second end of the cyclones and the first wall may be located between the first and second ends of the cyclones.

In some embodiments, the first wall may have a dirt collection plenum face facing the dirt collection plenum and an opposed face that is part of an air inlet plenum for the plurality of cyclones.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
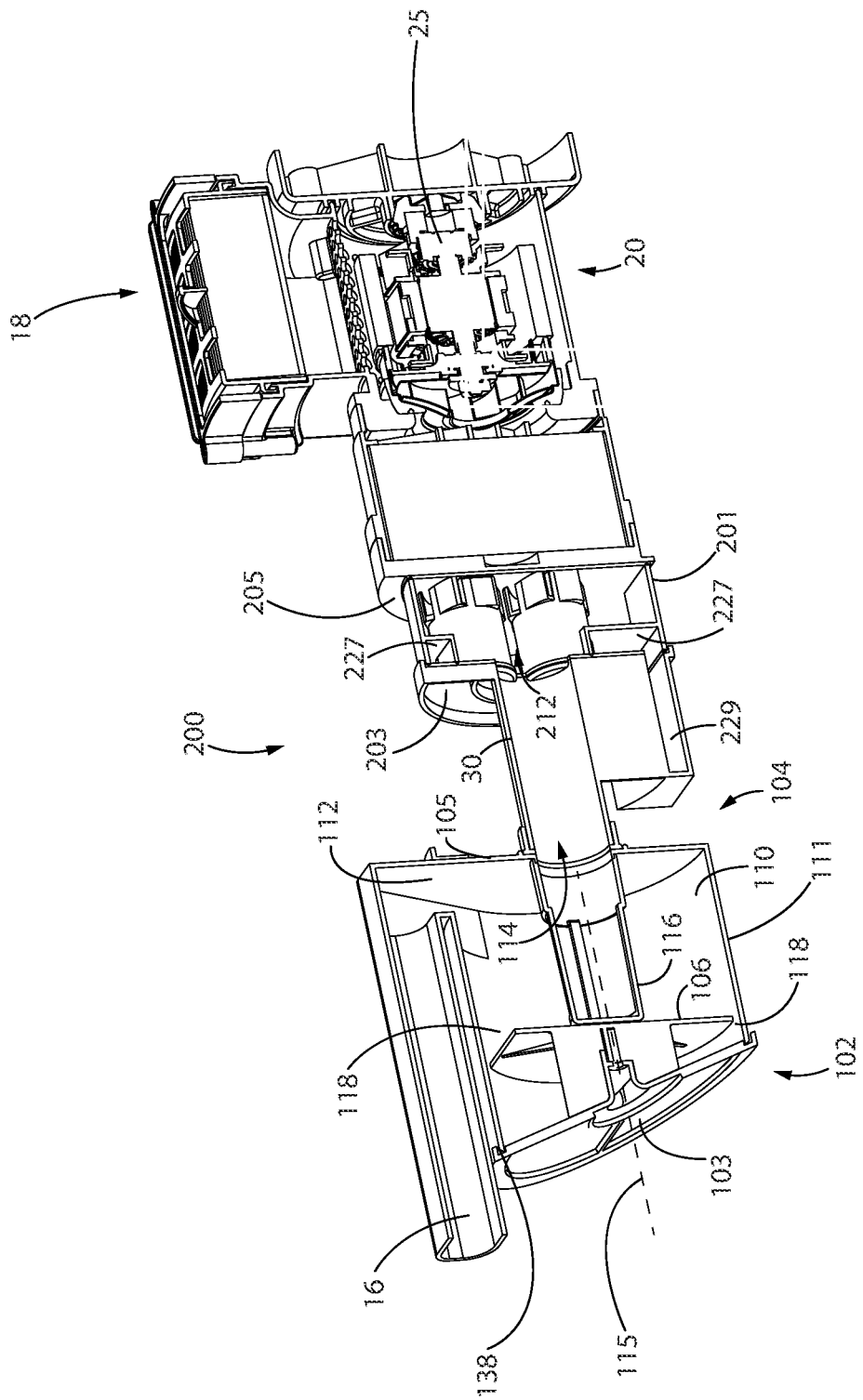
FIG. 1 is a perspective cross-section view of a surface cleaning apparatus comprising a first cyclonic cleaning stage and a second cyclonic cleaning stage in accordance with one embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

General Description of a Surface Cleaning Apparatus

Figure 2:
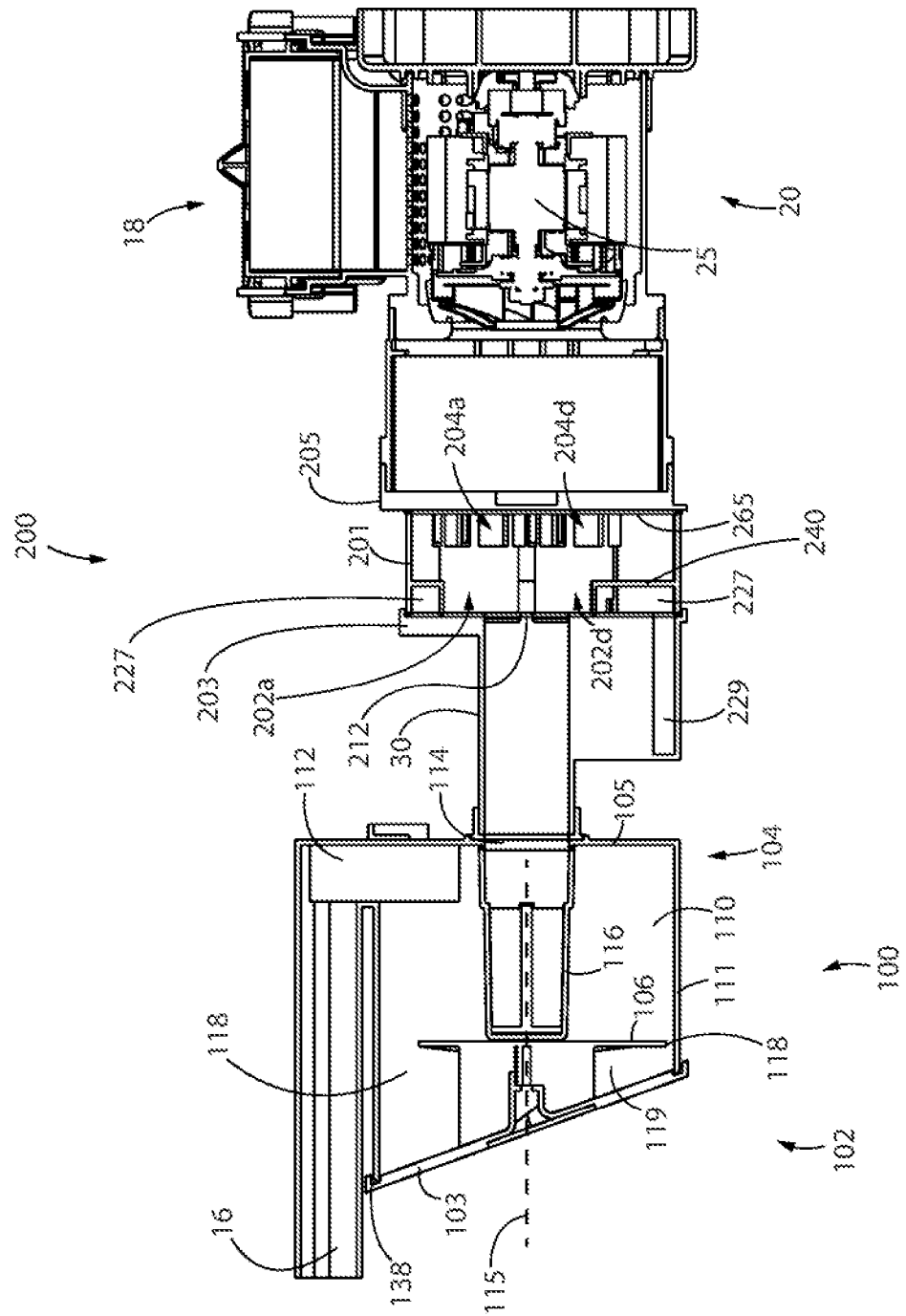
FIG. 2 is a cross-section view of the surface cleaning apparatus of FIG. 1.
Figure 3:
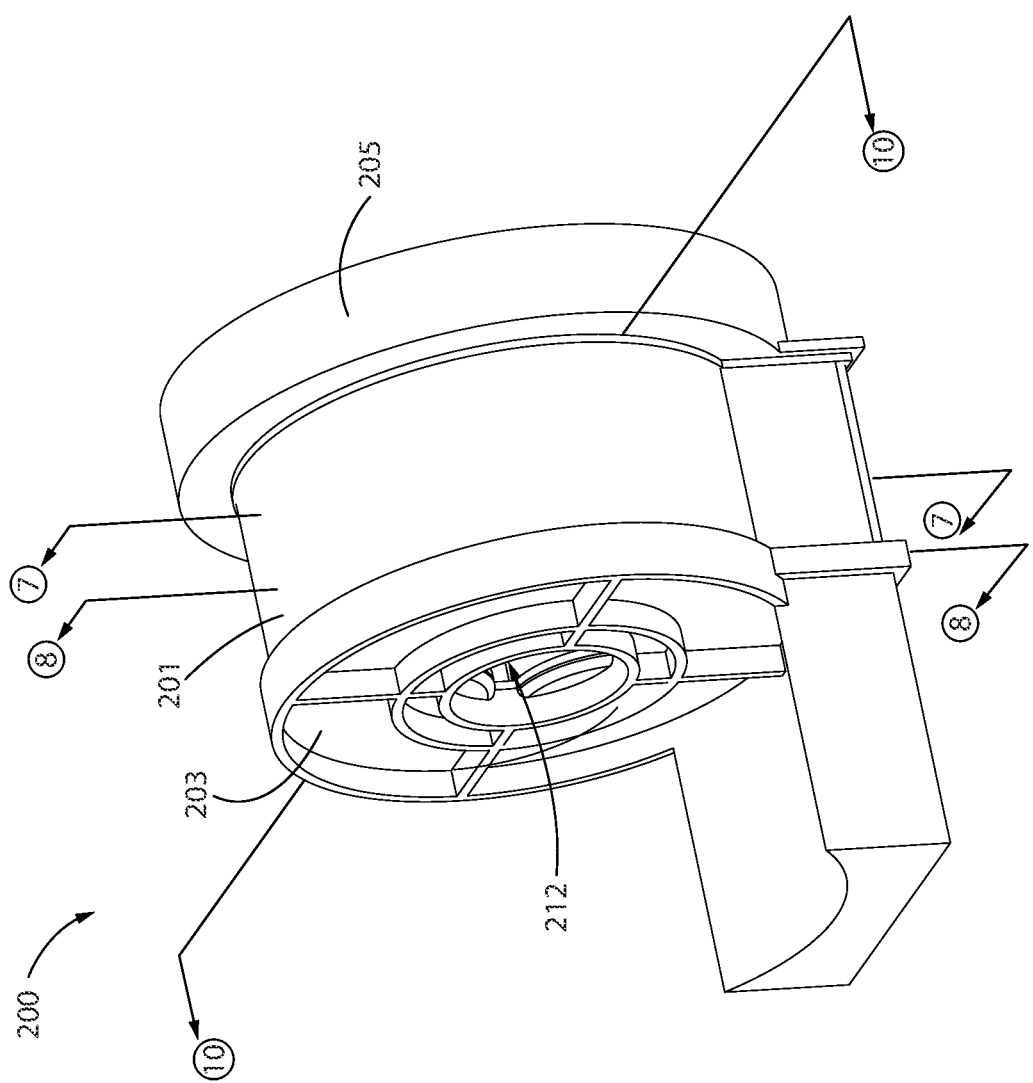
FIG. 3 is a perspective view of the upstream end of the second cyclonic cleaning stage of the surface cleaning apparatus of FIG. 1.

Referring to FIGS. 1 and 2, a surface cleaning apparatus is shown generally as 10. The surface cleaning apparatus 10 includes an inlet conduit 16 downstream of a dirty air inlet (not shown), a clean air outlet 18 and an air flow path or passage extending therebetween. An upstream air treatment member 100, a downstream cyclonic cleaning stage 200 and at least one suction motor 25 are provided in the air flow path. Preferably, the cyclone assembly is provided upstream from a suction unit 20 that contains the suction motor(s) 25, but alternatively may be provided downstream from the suction motor(s).

In addition to the cyclone assembly, the surface cleaning apparatus may also include one or more pre-motor filters (preferably positioned in the air flow path between the downstream cyclonic cleaning stage and the suction motor) and/or one or more post-motor filters (positioned in the air flow path between the suction motor and the clean air outlet).

Preferably, the surface cleaning apparatus includes one or more handles (not shown) for a user to support and/or direct the surface cleaning apparatus above a surface to be cleaned. For example, the surface cleaning apparatus may be an upright vacuum cleaner that has a surface cleaning head and an upper portion that is movably and drivingly connected to the surface cleaning head, wherein the surface cleaning head may be supported by any suitable support members, such as, for example wheels and/or rollers, to allow the surface cleaning head to be moved across a floor or other surface being cleaned. In alternative embodiments, the surface cleaning apparatus may be another suitable type of surface cleaning apparatus, such as a canister type vacuum cleaner, a hand vacuum cleaner, a stick vac, a wet-dry type vacuum cleaner, a carpet extractor, and the like. As exemplified in FIG. 24, handle 120, may be a pistol grip handle. An arm member 122 may extend rearwardly from the inlet conduit 16 to the pistol grip handle 102. A finger gap area 124 may be provided forward of the pistol grip handle 120 and rearward of the suction motor 25, below the arm member 122 and above the housing 126.

General Description of an Upstream Air Treatment Member

FIGS. 1 and 2 illustrate an embodiment of an upstream air treatment member, referred to generally as 100. In the illustrated example, the air treatment member 100 comprises a first cyclonic cleaning stage located upstream of the cyclonic cleaning stage 200. Alternatively, or additionally, the upstream air treatment member may comprise a filter bag or any other suitable air treatment apparatus. Alternatively, or additionally, in some embodiments, an upstream air treatment member may not be provided.

In the illustrated example, the first cyclonic cleaning stage includes a first stage cyclone chamber 110 that has a first end 102, a second end 104, and extends along a cyclone axis 115 and includes a generally cylindrical sidewall 111 extending between a first or front end wall 103 and second or rear end wall 105. In the illustrated embodiment, a plate (which may be referred to as an arrestor plate) 106 is provided at the first end 102. Alternatively, or in addition, the first cyclonic cleaning stage may comprise a plurality of cyclone chambers.

In the illustrated embodiment, the first stage cyclone chamber 110 includes a first stage cyclone air inlet 112 and a first stage cyclone air outlet 114. Optionally, an external dirt chamber 119 may be provided. Accordingly, as exemplified, first stage cyclone chamber 110 also includes at least one dirt outlet 118, through which dirt and debris that is separated from the air flow can exit the cyclone chamber 110. While it is preferred that most or all of the dirt exit the first stage cyclone chamber via the dirt outlet 118, some dirt may be entrained in the air exiting the first stage cyclone chamber via the air outlet 114, and/or may settle on the arrestor plate 106 (e.g. if the surface cleaning apparatus is oriented such that the cyclone axis 115 is generally vertical).

In the illustrated example, the first stage cyclone dirt outlet 118 is in the form of a gap between the cyclone side wall 111 and the arrestor plate 106, and is located toward the first end 102 of the cyclone chamber 110. Alternatively, the dirt outlet may be of any other suitable configuration, and may be provided at another location in the cyclone chamber, including, for example as a hole in the sidewall 111, or as a hole or gap between the sidewall and an end wall of the cyclone chamber.

Preferably, the first stage cyclone air inlet 112 is located toward one end of the cyclone chamber 110 (the second end in the illustrated example) and may be positioned adjacent the corresponding cyclone chamber end wall 105. Alternatively, the cyclone air inlet 112 may be provided at another location within the first stage cyclone chamber 110. Preferably, the air inlet 112 is positioned so that air flowing through the inlet and into the first stage cyclone chamber is travelling generally tangentially relative to, and preferably adjacent, the sidewall 111 of the cyclone chamber 110.

Air can exit the first stage cyclone chamber 110 via the first stage air outlet 114. Preferably, the cyclone air outlet is positioned in one of the cyclone chamber end walls and, in the example illustrated, is positioned in the same end as the air inlet 112. Accordingly, as exemplified, air inlet 112 and air outlet 114 may be positioned adjacent or at the second end wall 105. In the illustrated embodiment the air outlet 114 is generally circular in cross-sectional shape. Preferably, the cross-sectional area in a direction transverse to a direction of flow of air through the outlet 114 or flow area of the first stage cyclone air outlet 114 is generally equal to the cross-sectional area in a direction transverse to a direction of flow of air through the air inlet 112 or flow area of the first stage cyclone air inlet 112. In the illustrated example, the cyclone air outlet 114 comprises a vortex finder 116.

Referring to FIGS. 1 and 2, first stage dirt collection chamber 119 is in communication with dirt outlet 118 to collect the dirt and debris as it exits first stage cyclone chamber 110. Dirt collection chamber 119 may be of any suitable configuration. In the illustrated example, the dirt collection chamber 119 is bounded by the first stage cyclone side wall 111, end wall 103, and arrestor plate 106.

In use, air enters the first stage cyclone chamber 110 via air inlet 112 and exits the chamber 110 via air outlet 114, while separated dirt and debris exits the cyclone chamber 110 via dirt outlet 118, where it collects in the first stage dirt collection chamber 119.

To help facilitate emptying the dirt collection chamber 119, the end walls 103, which may be the front wall of a hand vacuum cleaner, may be openable. Preferably, end wall 103 is moveable between a closed position (FIGS. 1 and 2) and an open position (not shown). When the end wall 103 is in the open position, the first stage dirt collection chamber 119 and the first stage cyclone chamber 110 may be emptied.

End wall 103 is preferably configured so that when it is in the closed position, the surface facing the cyclone chamber 110 cooperatively engages an end surface of the sidewall 111. For example, as shown in FIGS. 1 and 2, the end wall surface may have one or more channels or grooves 138 configured to receive the ends of sidewall 111 when the end wall 103 is in the closed position. Optionally, one or more sealing or gasketing elements may be provided between groove(s) 138 and the sidewall ends.

In the illustrated embodiment, air exiting the first stage air outlet 114 is directed along a conduit 30 to a second stage air inlet 212. From there, the air is directed into a chamber or manifold 217 of the downstream cyclonic cleaning stage 200. Alternatively, conduit 30 may not be provided (or may have a de minimus length) such that air exiting the first stage air outlet 114 passes directly through second stage air inlet 212 and into manifold 217. Optionally, a manifold may not be provided and outlet 114 may be directly connected to the inlets of the inlets of the cyclones second cyclonic stage.

General Description of a Downstream Cyclonic Cleaning Stage

FIGS. 1 to 11 illustrate an embodiment of a downstream cyclonic cleaning stage, referred to generally as 200. The cyclonic cleaning stage includes a plurality of second stage cyclone chambers 220 arranged in parallel. In the embodiment illustrated in FIGS. 1 to 11, four cyclone chambers 220 are shown, referred to as 220a, 220b, 220c, and 220d, respectively. It will be appreciated that an upstream air treatment member need not be provided. Also, it will be appreciated that the plurality of second stage cyclones may comprise any number of cyclones.

In the illustrated embodiment, each cyclone chamber 220 extends along a respective cyclone axis 215 (see e.g. FIG. 8) and includes a sidewall 221 that extends between a first end wall 203 and a second end wall 205.

In the illustrated embodiment, each cyclone chamber 220 includes one or more cyclone air inlets 222 and a cyclone air outlet 224. Each cyclone chamber 220 also includes at least one dirt outlet 228, through which dirt and debris that is separated from the air flow can exit the cyclone chamber 220. While it is preferred that most or all of the dirt entrained in the air exiting the first air treatment member (e.g. cyclone 100) exits the cyclone chambers 200 via the dirt outlets 228, some dirt may be entrained in the air exiting the second stage cyclone chambers via the air outlets 224, and/or may settle on the end wall 203 of the cyclone chambers 220 (e.g. if the surface cleaning apparatus is oriented such that the cyclone axes 215 are generally vertical).

In some embodiments, all or substantially all of the dirt entrained in the air exiting the first cyclonic cleaning stage may be removed from the airflow by the second cyclonic cleaning stage. This may, for example, obviate the need to provide a pre-motor filter in the surface cleaning apparatus 10.

In the illustrated example, each cyclone dirt outlet 228 is in the form of a slot bounded by the cyclone side wall 221 and the first or front end wall member 203 (and/or an optional inlet sealing member 263, discussed further below), and is located toward the first or front end 202 of the cyclone chamber 220. An advantage of this design is that at least a portion of, and preferably most or substantially all of the dirt exiting a second stage cyclone travels in a radial direction (e.g., approximately perpendicular to the cyclone axis of the second stage cyclone chamber). Such a dirt outlet may be characterized as a 'sideways' dirt outlet. This preferred orientation for the dirt collection outlets may facilitate a more compact design of the cyclonic cleaning stage 200. It will be appreciated that the dirt outlet may be of any configuration that permits dirt to exit sideways into dirt plenum for two or more of the cyclone of the second cyclonic cleaning stage if a common dirt plenum is provided.

Preferably, each second stage cyclone has one or more air inlets 222 located toward one end of the cyclone chamber 220 (the second end 204 in the illustrated example). For example, in the illustrated embodiments the inlets 222 are positioned adjacent the corresponding first end wall member 205. Alternatively, the cyclone air inlets 222 may be provided at another location within the cyclone chamber 220. Preferably, each air inlet 222 is positioned so that air flowing through the inlet and into a cyclone chamber 220 is travelling generally tangentially relative to, and preferably adjacent, the sidewall 221 of the cyclone chamber 220.

In the embodiment illustrated in FIGS. 1-10, each second stage cyclone chamber 220a-d includes six airflow inlets (i.e. air inlets 222a,a-f, 222b,a-f, 222c,a-f, and 222d,a-f), and one cyclone air outlet 224a-d. In the illustrated embodiment, the air inlets of each cyclone chamber 220 are positioned radially equidistantly at the second end of each second cyclonic cleaning stage (see e.g. FIGS. 7-10). Alternatively, the air inlets of the second cyclonic stage may be arranged in any suitable manner. Also, while six air inlets are illustrated for each second stage cyclone chamber, it will be appreciated that, alternatively, two or three or four or five or seven or more air inlets may be provided per cyclone chamber.

Also, in the illustrated embodiment, the air inlets 222 of the cyclone chambers 220 are in communication with a common manifold or header 217. Having the second stage cyclone air inlets in communication with the air outlet 114 of the first air treatment stage via manifold 217 may have one or more advantages. For example, it may facilitate airflow to the second cyclonic cleaning stages with reduced bends in an air flow conduit thereby reducing the back pressure through the cyclone assembly. In addition, the use of a common manifold may enable the air to be distributed to the inlets of a plurality of cyclones with reduced back pressure.

The cross-sectional shape of each air inlet 222 can be any suitable shape. In the illustrated example each air inlet has a cross-sectional shape that is generally rectangular. The total cross-sectional area of the second stage air inlets (i.e. the sum of the cross-sectional areas of each inlet 222) can be referred to as the total cross-sectional area or total flow area of the second cyclonic cleaning stage.

Air can exit each cyclone chamber 220 via an air outlet 224 provided for each cyclone chamber 220. Preferably, the cyclone air outlets 224a-d are positioned in one of the end walls of each cyclone chamber 220 and, in the example illustrated, are positioned in the same ends as the air inlets 222a-f. As exemplified, the air inlets and air outlets may be at the rear end of the second cyclonic cleaning stage.

In the illustrated embodiment the air outlets 224a-d are generally circular in cross-sectional shape. Preferably, the cross-sectional area in a direction transverse to a direction of flow of air through the air outlets 224 a-d or flow area of each second stage air outlet 224 is generally equal to the flow area of the air inlets 222 in a direction transverse to a direction of flow of air through the air inlets 224 for that cyclone chamber. As exemplified, each cyclone air outlet 224 may comprise a vortex finder 226.

Figure 4:
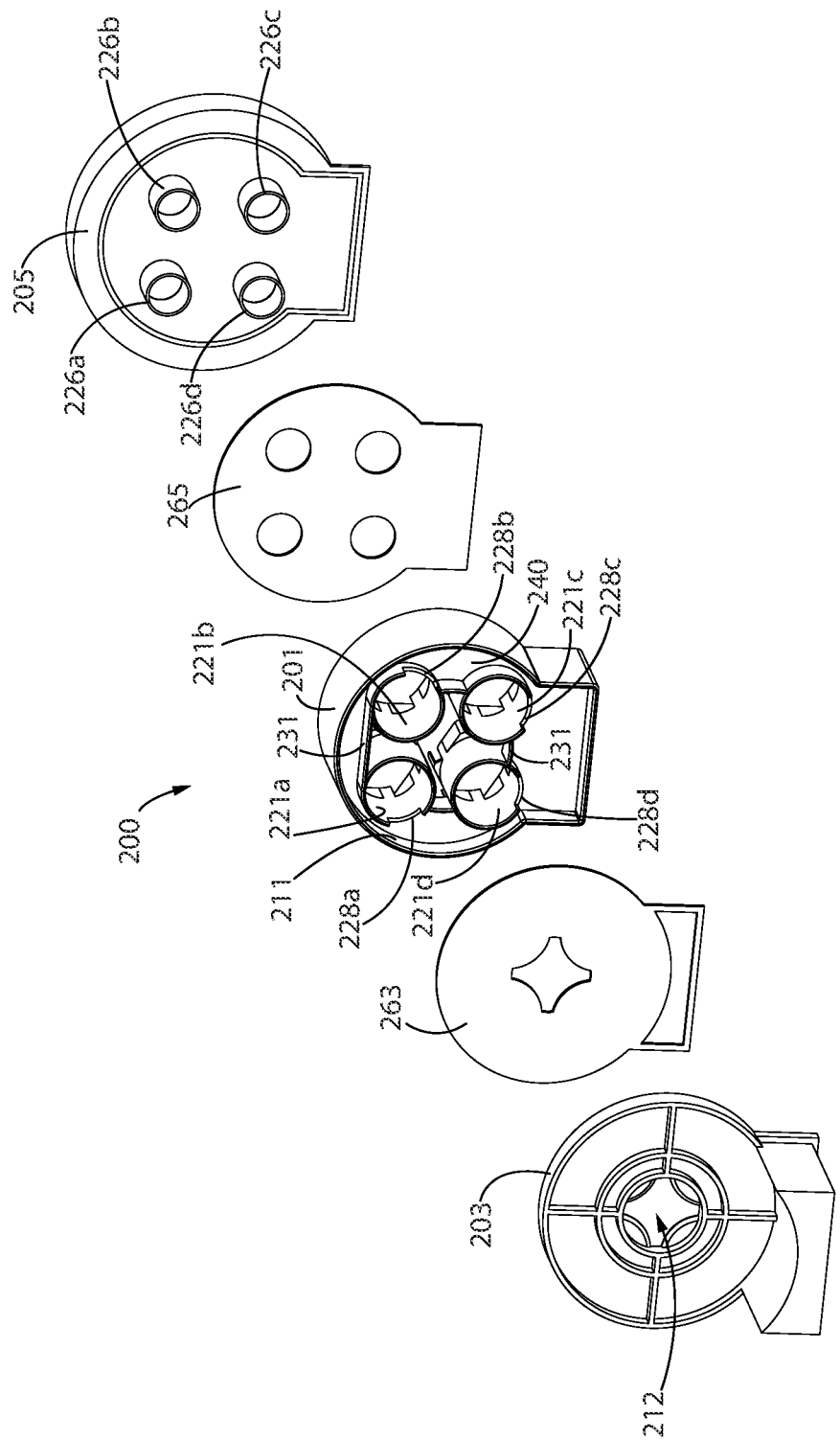
FIG. 4 is an exploded view of the second cyclonic cleaning stage of FIG. 3.
Figure 5:
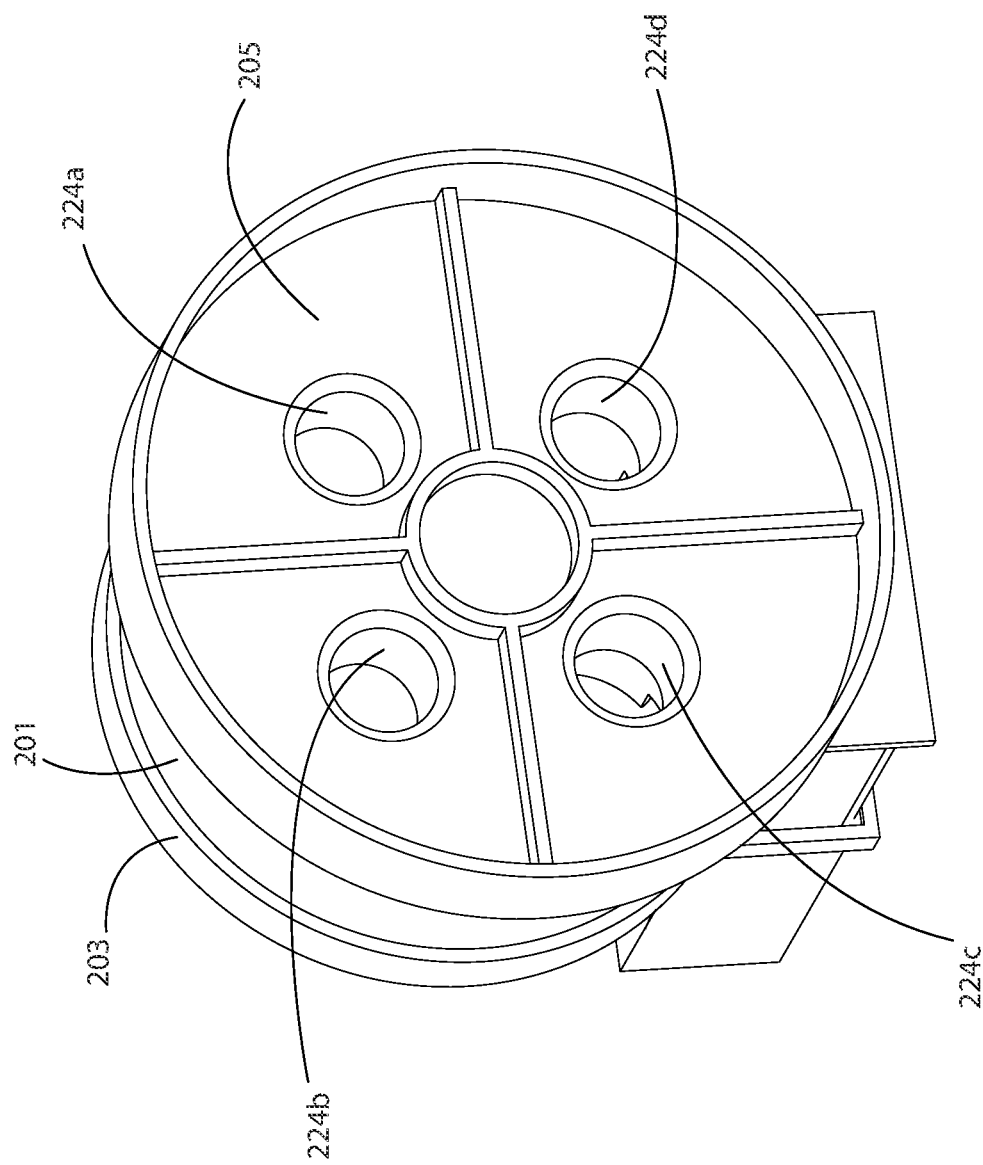
FIG. 5 is a perspective view of the downstream end of the second cyclonic cleaning stage of the surface cleaning apparatus of FIG. 1.
Figure 6:
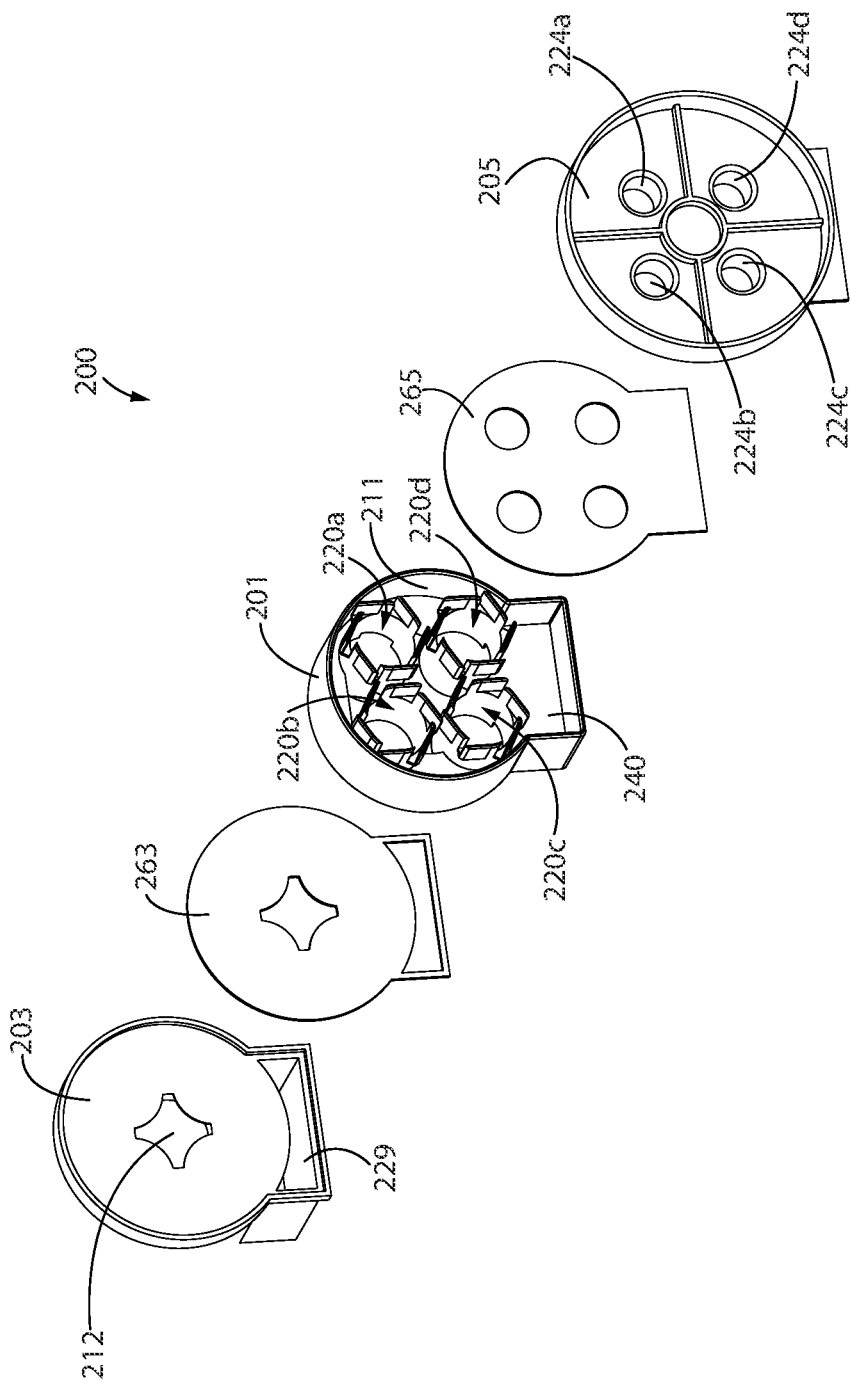
FIG. 6 is an exploded view of the second cyclonic cleaning stage of FIG. 5.
Figure 7:
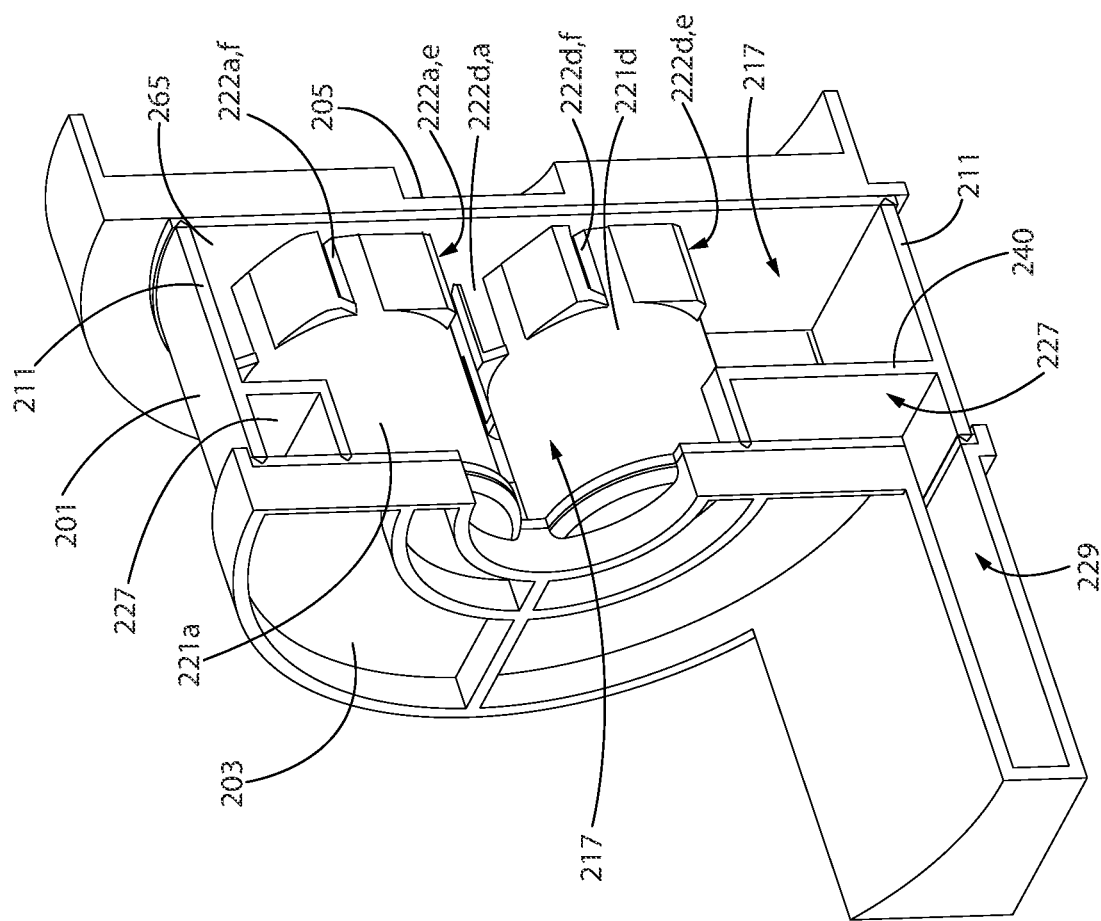
FIG. 7 is a perspective section view of the second cyclonic cleaning stage of FIG. 3, taken along line 7-7 shown in FIG. 3.

As illustrated in FIGS. 4 and 6, the cyclonic cleaning stage 200 may include a central body member 201, a first or front end wall member 203, and a second or rear end wall member 205. As in the illustrated example, an inlet sealing member 263 may be provided between the first end wall member 203 and the central body member 201, and an outlet sealing member 265 may be provided between the second end wall member 205 and the central body member 201. The sealing members 263, 265 may reduce or inhibit air leakage between the central body member 201 and the end wall members 203, 205 when the cyclonic cleaning stage 200 is assembled. Alternatively, the central body member 201 may be joined to one or both end wall members 203, 205 using a process that results in a relatively air-impermeable seal (e.g. sonic welding, adhesive, or the like), in which case one or both sealing members 263, 265 may not be provided.

Dirt Collection Plenum for Second Stage Cyclones Positioned Radially Outward of the Second Stage Cyclones The following is a description of the positioning of a dirt collection plenum for second stage cyclones that may be used by itself in any surface cleaning apparatus or in any combination or sub-combination with any other feature or features disclosed herein.

In accordance with one feature, a second stage dirt collection plenum may be provided between the dirt outlets of two or more second stage cyclone chambers and a second stage dirt collection region (or the dirt plenum may be the second stage dirt collection region). In one or more preferred embodiments, at least a portion of, and preferably most or substantially all of the second stage dirt collection plenum may be positioned radially outwardly of the second stage cyclone chambers. In such an embodiment, this preferred location for the second stage dirt collection plenum may facilitate a more compact design of the cyclonic cleaning stage 200.

As exemplified in FIGS. 1, 2, and 7-9, two or more second stage cyclone chambers 220 may be associated with a single second stage dirt collection chamber 229. Accordingly, for example, a single second stage dirt collection chamber 229 may be provided. Collectively, the second stage dirt collection chamber(s) 229 may be referred to generally as a second stage dirt collection region.

Figure 8:
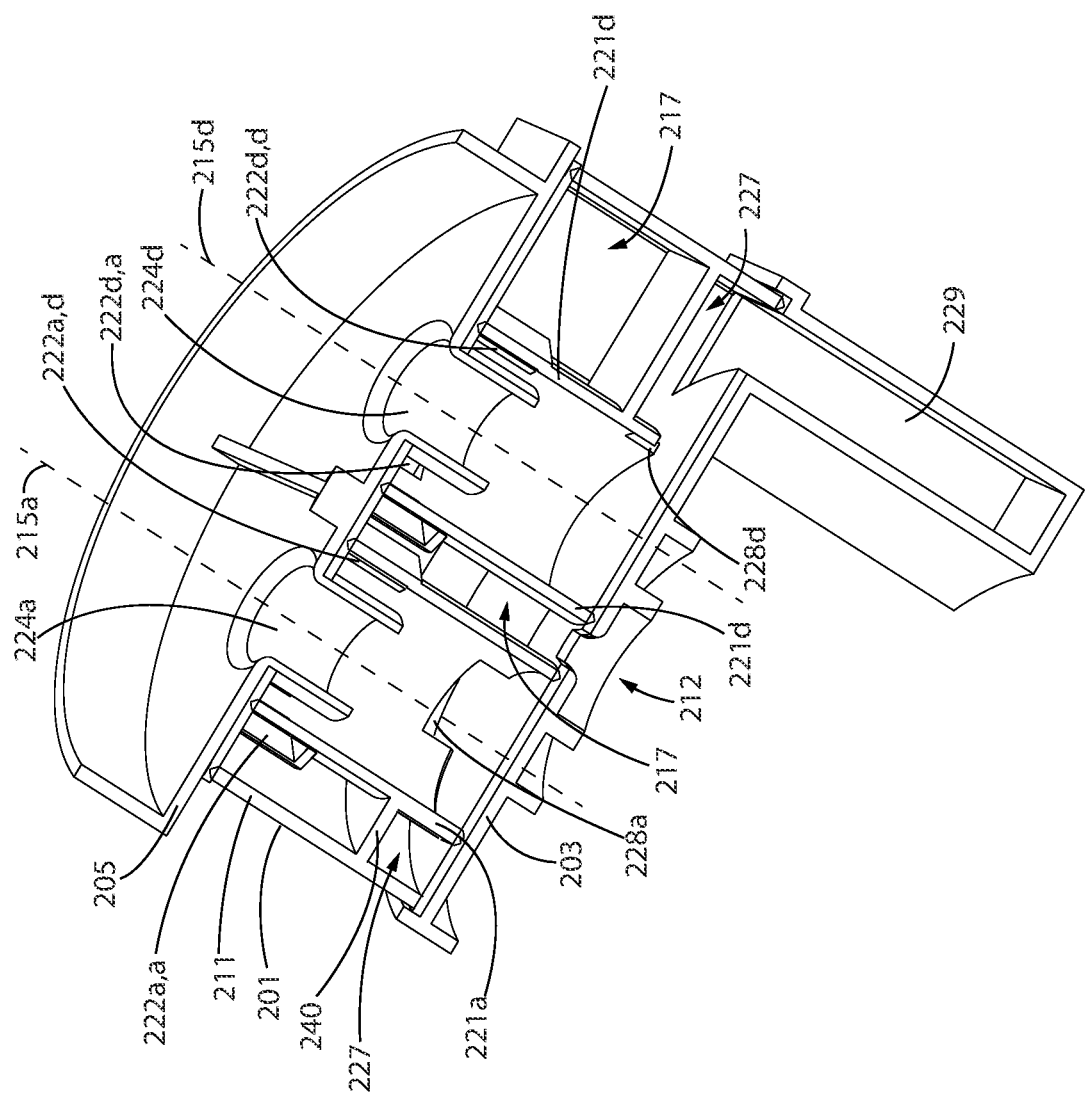
FIG. 8 is a perspective section view of the second cyclonic cleaning stage of FIG. 3, taken along line 8-8 shown in FIG. 3.
Figure 9:
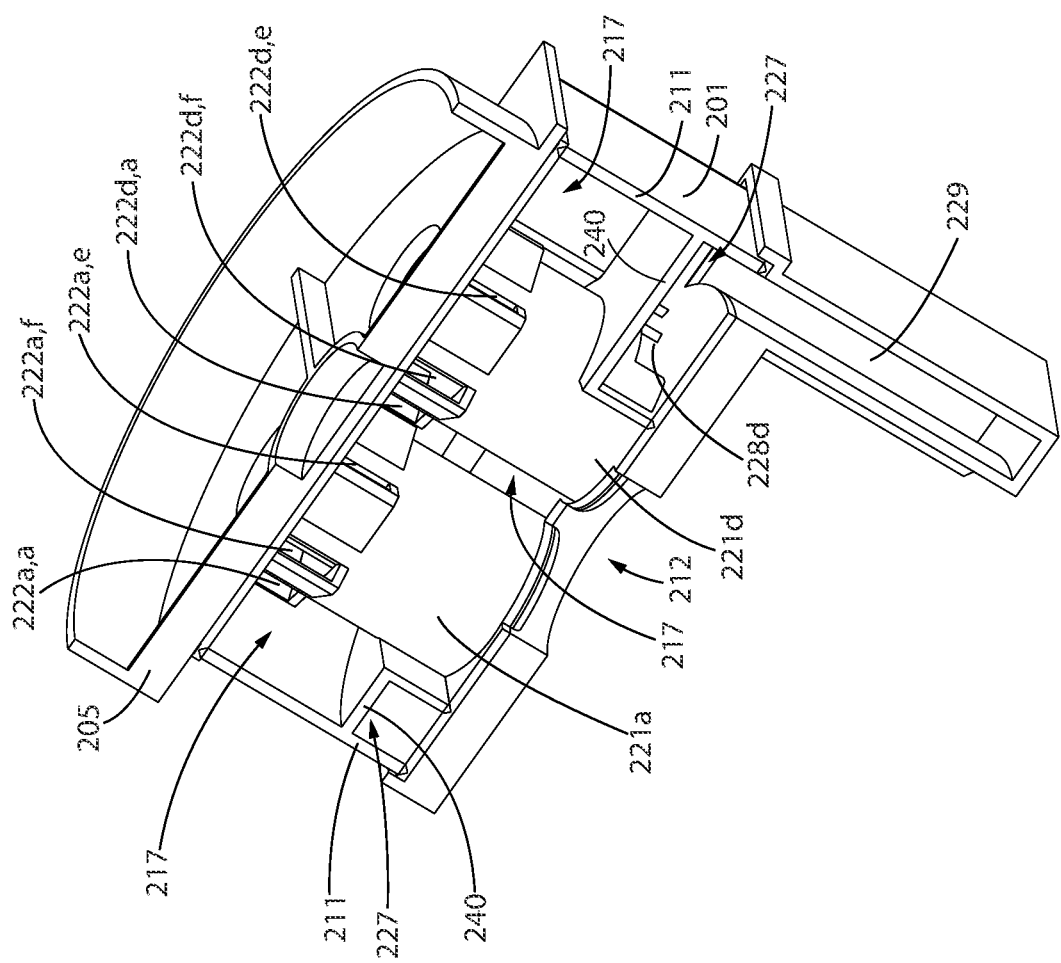
FIG. 9 is another perspective section view of the second cyclonic cleaning stage of FIG. 3, taken along line 7-7 shown in FIG. 3.
Figure 10:
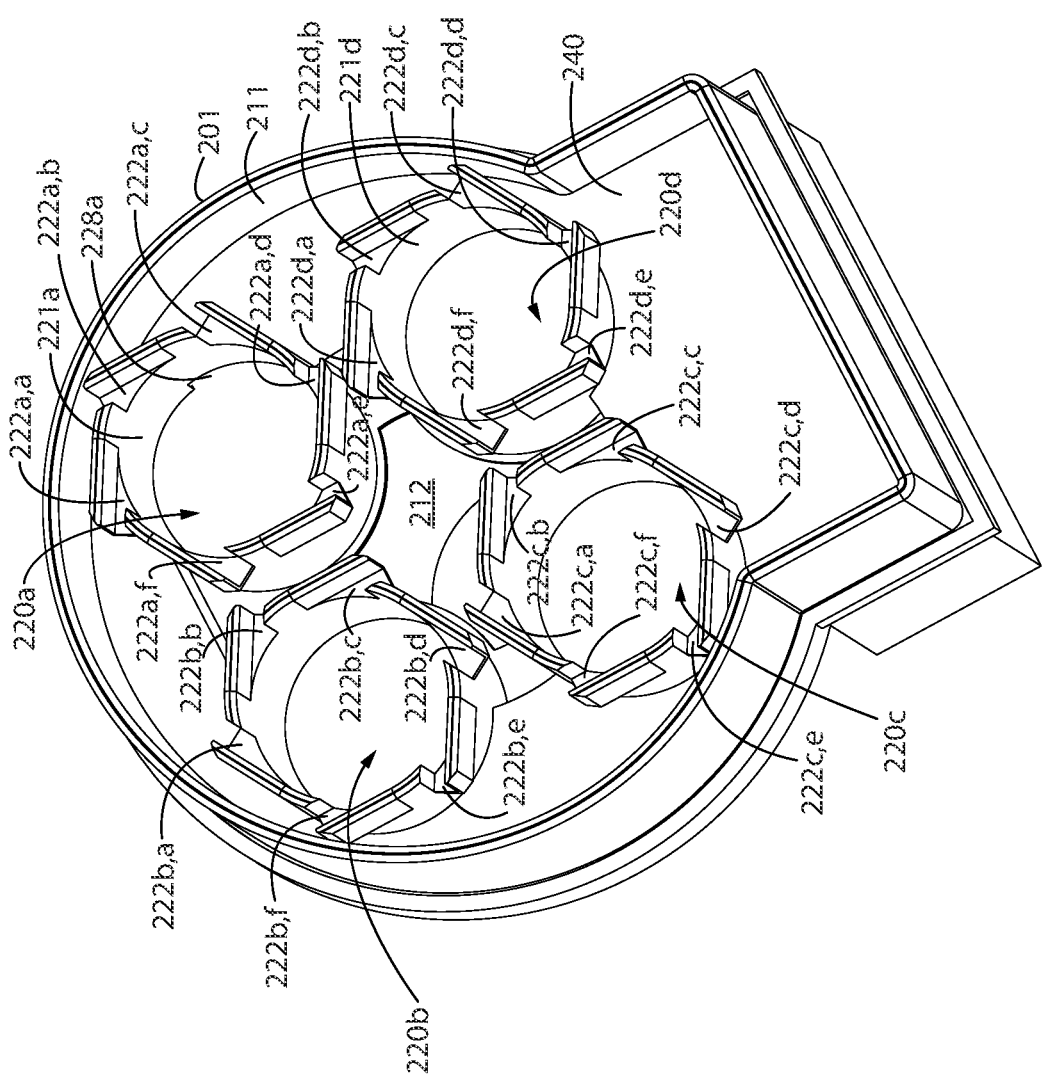
FIG. 10 is a perspective section view of the second cyclonic cleaning stage of FIG. 3, taken along line 10-10 shown in FIG. 3.

As exemplified in FIG. 8, in use air enters each second stage cyclone chamber 220 (e.g. chamber 220a) via one or more air inlets 222 (e.g. inlets 222a,a, 222a,b, 222a,c, 222a,d, 222a,e, and 222a,f) and exits each chamber 220 (e.g. chamber 220a) via an air outlet 224 (e.g. outlet 224a), while separated dirt and debris exits each cyclone chamber 220 (e.g. chamber 220a) via a dirt outlet 228 (e.g. outlet 228a), where it enters a dirt collection plenum 227. Dirt collection plenum 227 is also in communication with the second stage dirt collection region 229.

In the illustrated example, dirt collection plenum 227 is defined, in the radial direction, between an outer wall 211 of the central body member 201 and second stage cyclone chamber sidewalls 221, and a plurality of inner walls 231 extending between the second stage cyclone chamber sidewalls 221. Dirt collection plenum 227 is also defined, in the longitudinal direction, between an intermediate wall 240 of the central body member 201 and an inner surface of the first end wall member 203. The second stage cyclone chamber sidewalls 221 and the plurality of inner walls 231 extend between the intermediate wall 240 and first end wall member 203.

Figure 11:
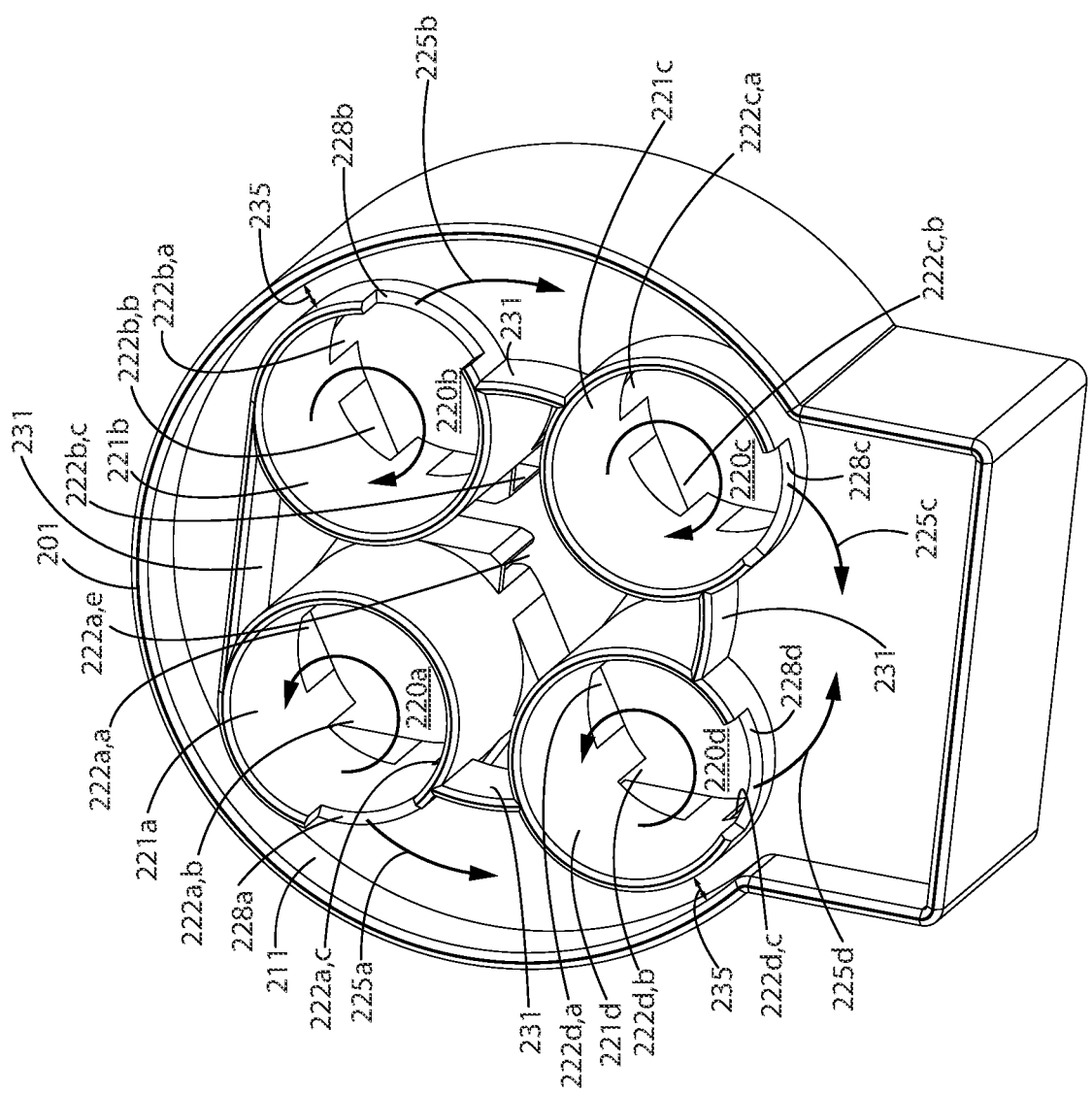
FIG. 11 is a perspective end view of the second stage cyclones of the second cyclonic cleaning stage of FIG. 3.
Figure 12:
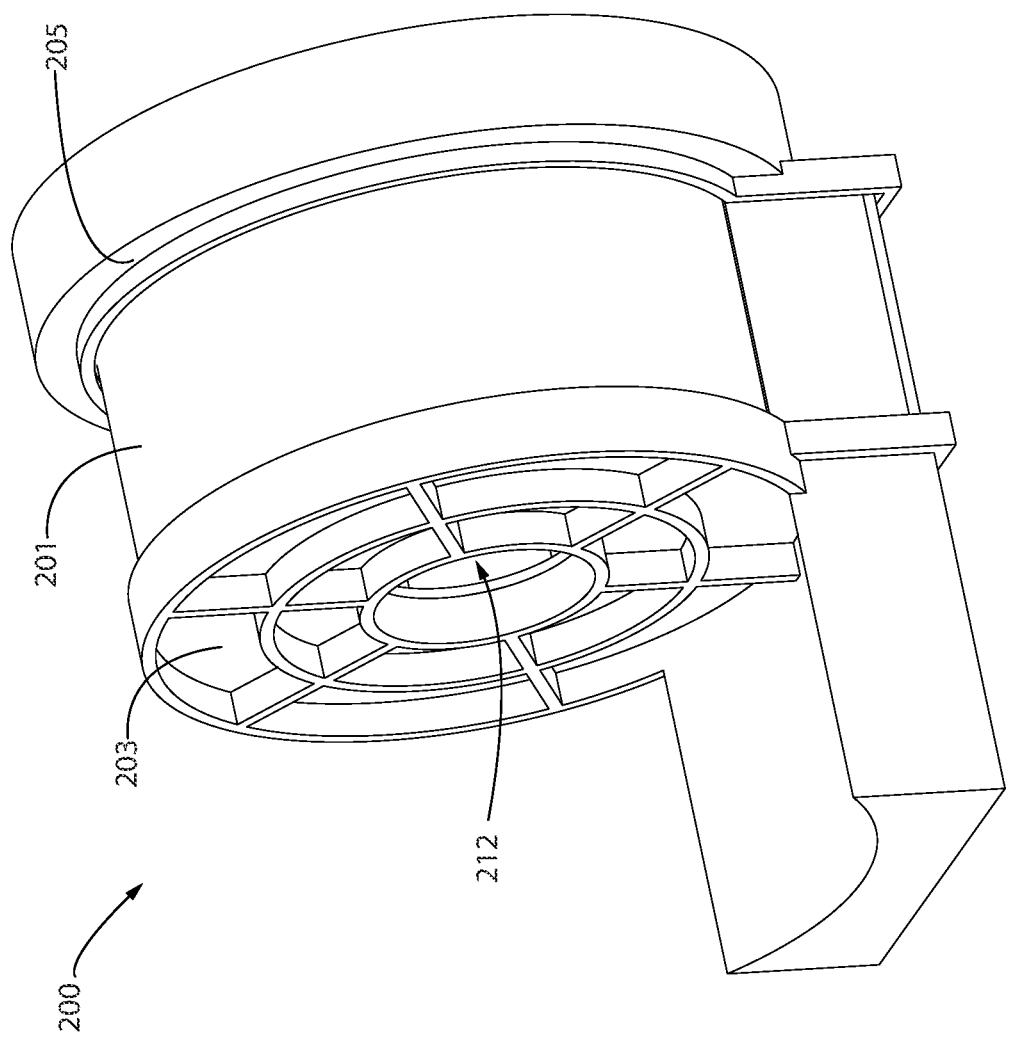
FIG. 12 is a perspective view of the upstream end of a second cyclonic cleaning stage in accordance with another embodiment.
Figure 13:
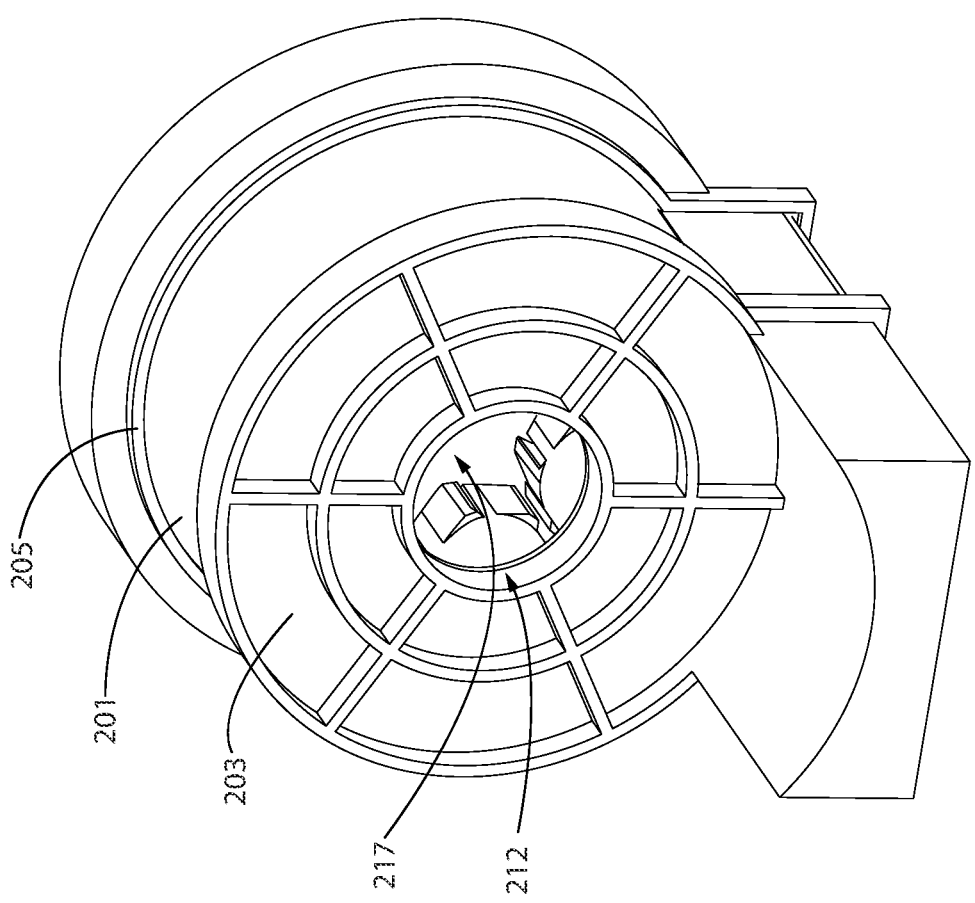
FIG. 13 is another perspective view of the upstream end of the second cyclonic cleaning stage of FIG. 12.
Figure 14:
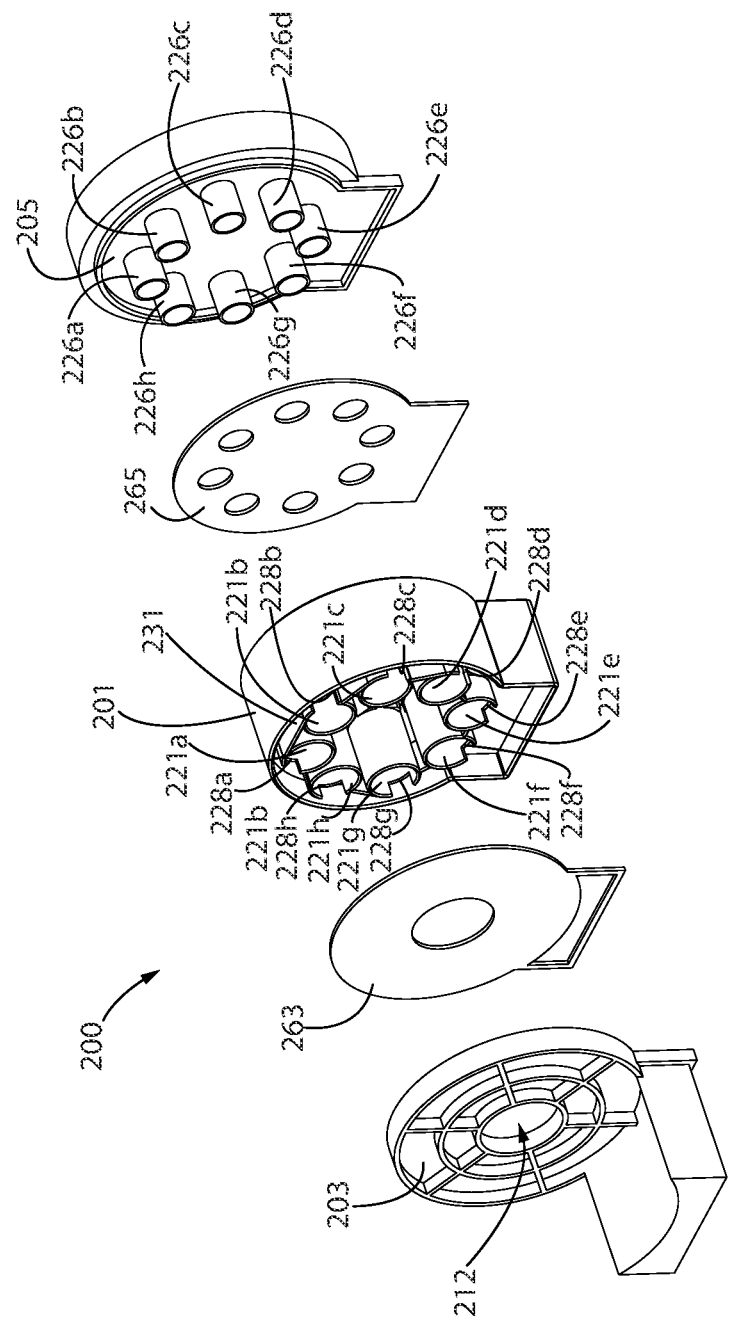
FIG. 14 is an exploded view of the second cyclonic cleaning stage of FIG. 12.
Figure 15:
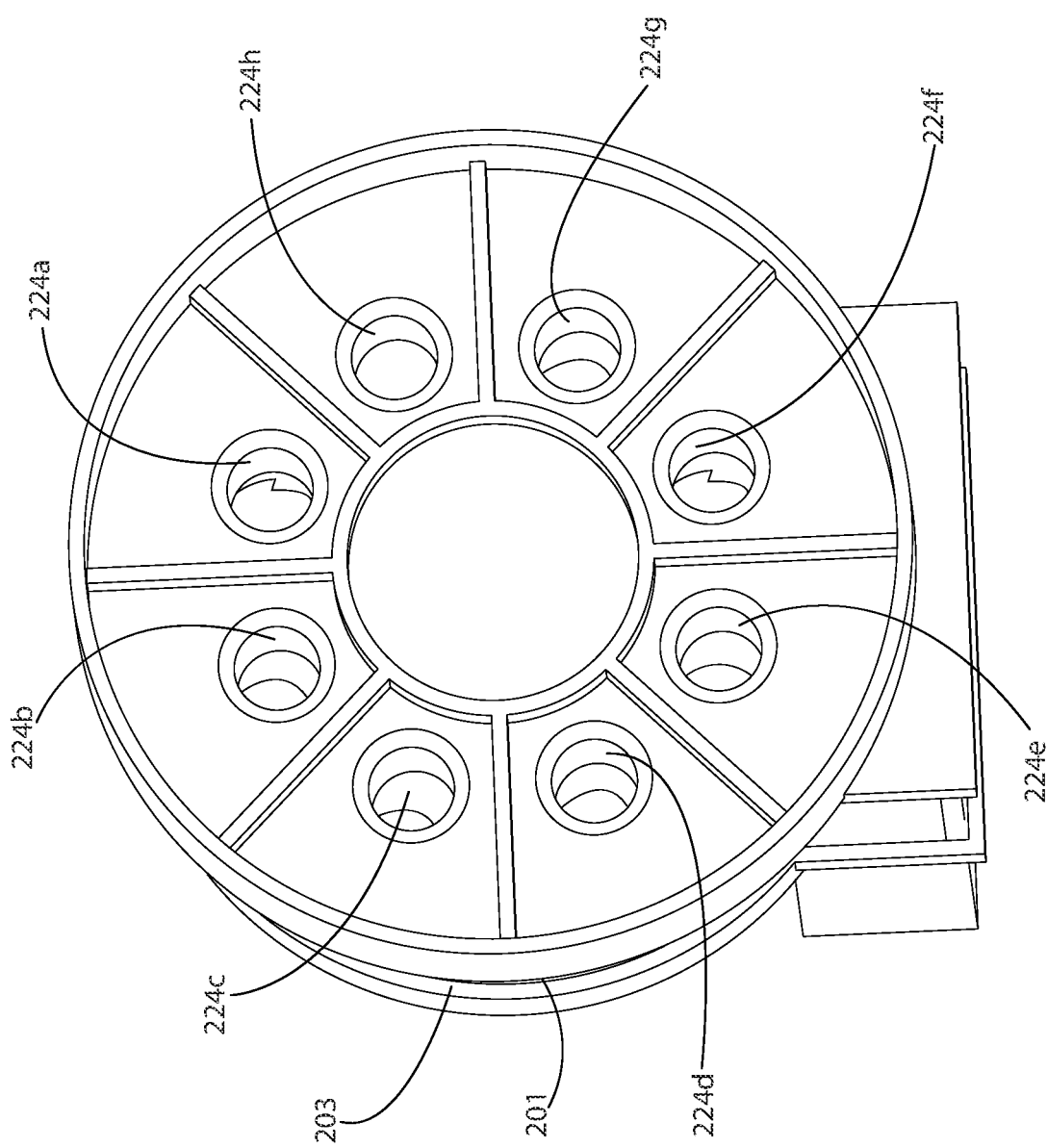
FIG. 15 is a perspective view of the downstream end of the second cyclonic cleaning stage of FIG. 12.
Figure 16:
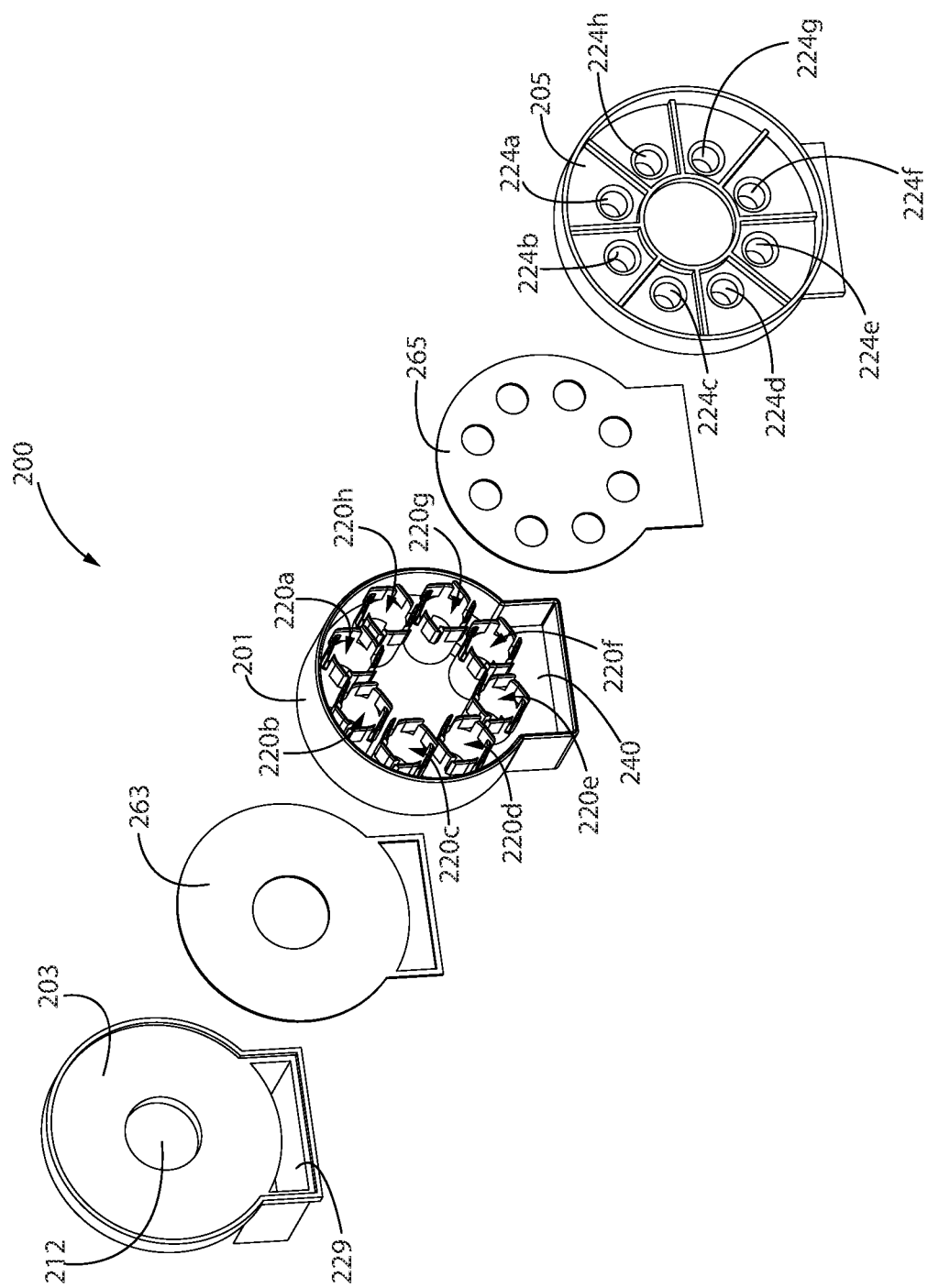
FIG. 16 is an exploded view of the second cyclonic cleaning stage of FIG. 15.
Figure 17:
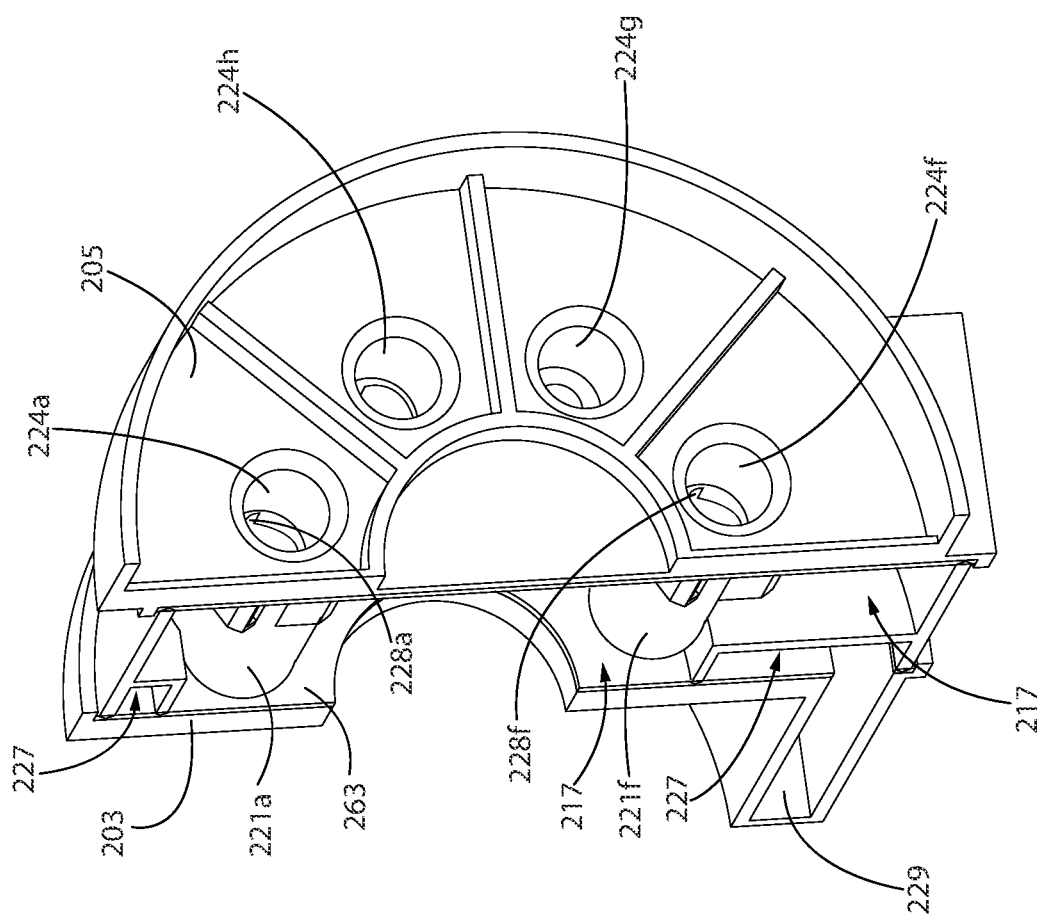
FIG. 17 is a perspective section view of the second cyclonic cleaning stage of FIG. 12, taken along line 17-17 shown in FIG. 12.
Figure 18:
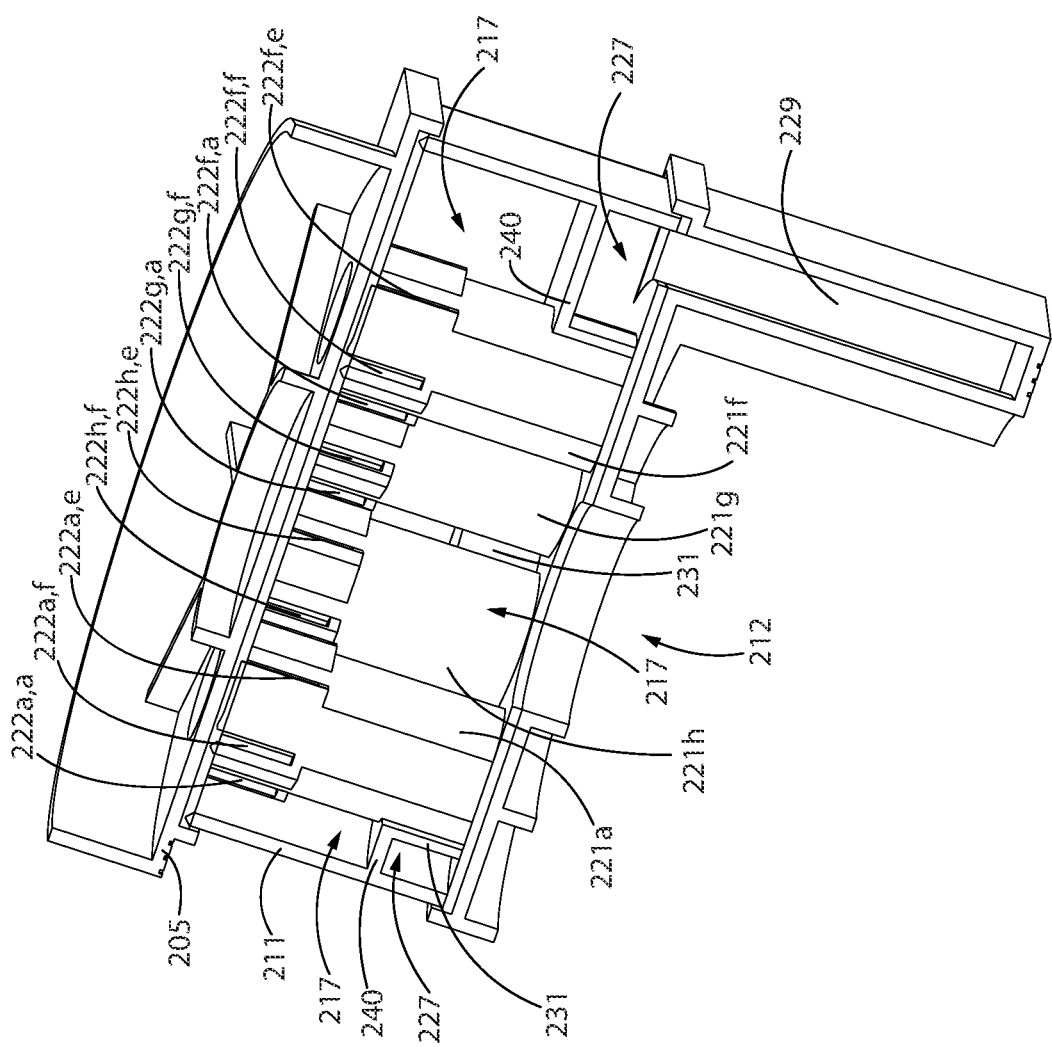
FIG. 18 is another perspective section view of the second cyclonic cleaning stage of FIG. 12, taken along line 17-17 shown in FIG. 12.
Figure 19:
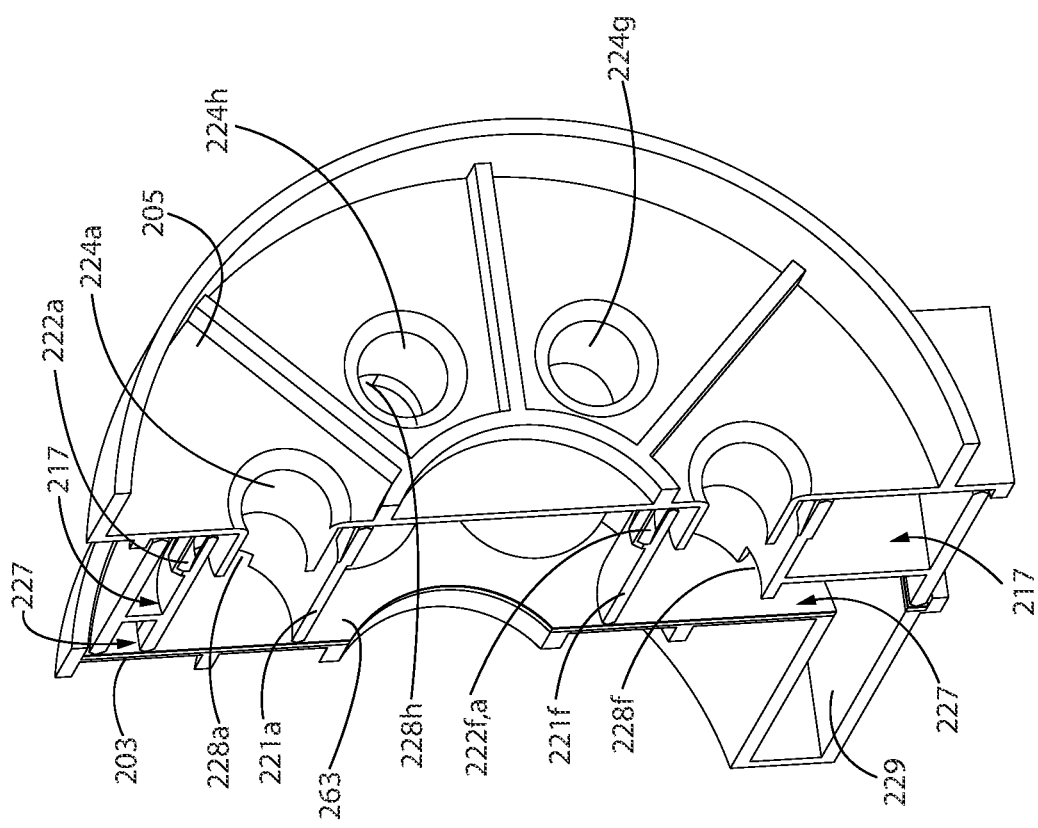
FIG. 19 is a perspective section view of the second cyclonic cleaning stage of FIG. 12, taken along line 19-19 shown in FIG. 12.
Figure 20:
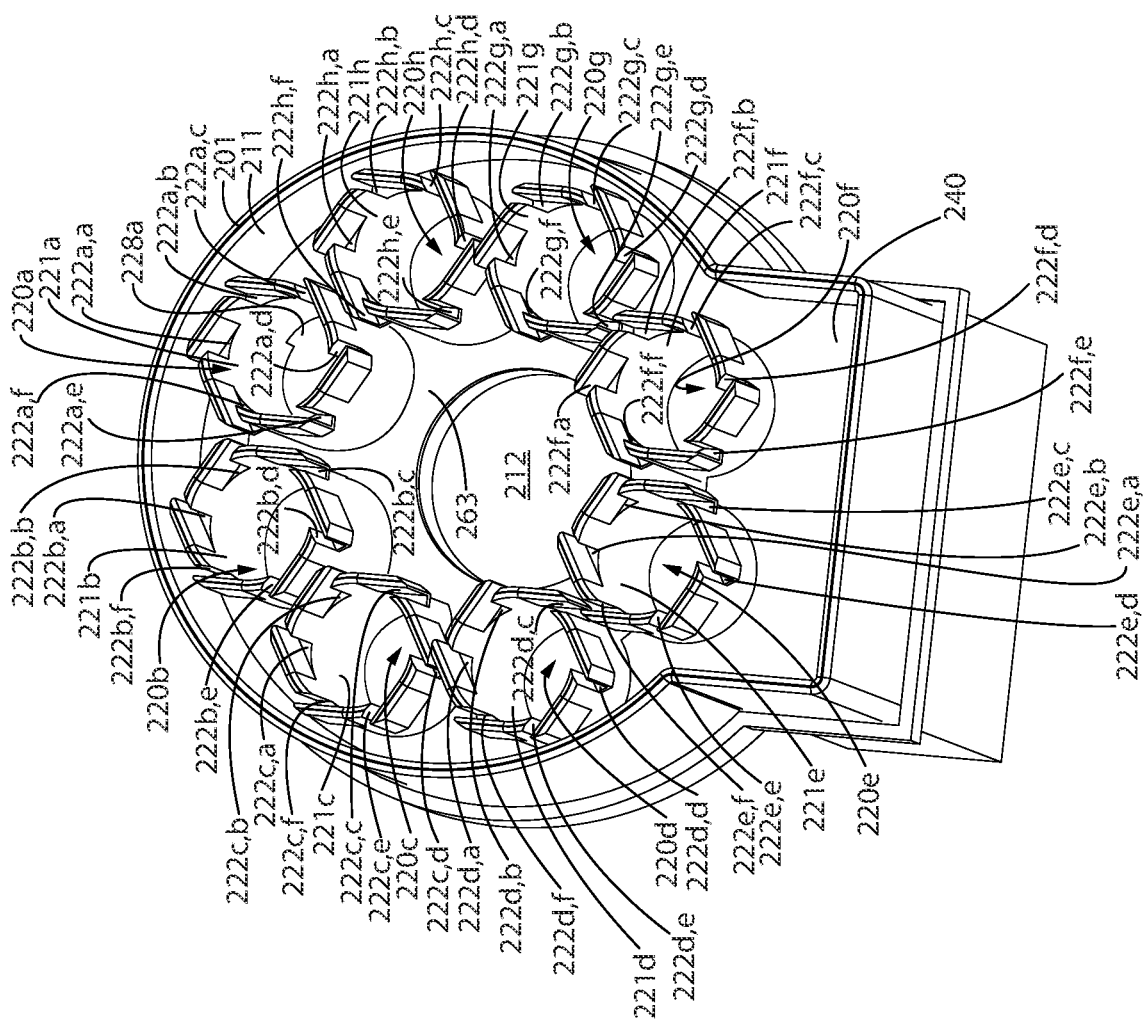
FIG. 20 is a perspective end view of the inlet plenum of the second stage cyclones of the second cyclonic cleaning stage of FIG. 12.

Notably at least part, and optionally all, of dirt collection plenum 227 is positioned radially outwardly from the second stage cyclone chambers 220a-d, and also radially outwardly from the second stage air inlet 212 of the second cyclonic cleaning stage 200 (see e.g. FIG. 11). Accordingly, as exemplified, a plane perpendicular to a cyclone axis 215 of a second stage cyclone chamber 220 that extends through a dirt outlet 228 of that cyclone chamber 220 may therefore extend through the dirt collection plenum 227. Such a design may have one or more advantages. For example, providing the plenum 227 radially outwardly from the second stage cyclone chambers 220a-d may result in a more compact design of a second cyclonic cleaning stage. In addition, less dirt may be re-entrained back into the cyclone chamber since the dirt may be collected distal to the dirt outlet. Alternatively, or in addition, the dirt may exit the dirt outlet and be directed into a void region which does not have a wall that may reflect the dirt back towards the dirt outlet, from where it could be re-entrained.

Preferably, the dirt outlets 228a-d of the second stage cyclone chambers 220a-d are oriented such that dirt is ejected outwardly into the dirt collection plenum 227 in a plane generally transverse to the cyclone axis of rotation 215 and preferably in a direction towards the second stage dirt collection region 229. For example, as illustrated in FIG. 11, in operation air within the second stage cyclone chambers 220a and 220d may rotate in a counter-clockwise direction, when viewed from the dirt outlet end. Accordingly, most if not all of the dirt ejected from the second stage cyclone chamber dirt outlets 228a and 228d may travel towards the dirt collection region 229, e.g. in directions 225a and 225b, respectively. Air may be induced to flow counter clockwise in second stage cyclone chambers 220a and 220d by using air inlets that will create a counter clockwise flow. As exemplified, air inlets 222a and 222d define a passage that will introduce air flowing in a counter clockwise direction into second stage cyclone chambers 220a and 220d.

Similarly, in operation air within the second stage cyclone chambers 220b and 220c may rotate in a clockwise direction, when viewed from the outlet end. Accordingly, most if not all of the dirt ejected from the second stage cyclone chamber dirt outlets 228b and 228c may travel towards the dirt collection region 229, e.g. in directions 225b and 225c, respectively. In the illustrated embodiments, a single dirt collection region 229 is provided. Air may be induced to flow clockwise in second stage cyclone chambers 220b and 220c by using air inlets that will create a clockwise flow. As exemplified, air inlets 222b and 222c define a passage that will introduce air flowing in a clockwise direction into second stage cyclone chambers 220b and 220c.

Figure 25:
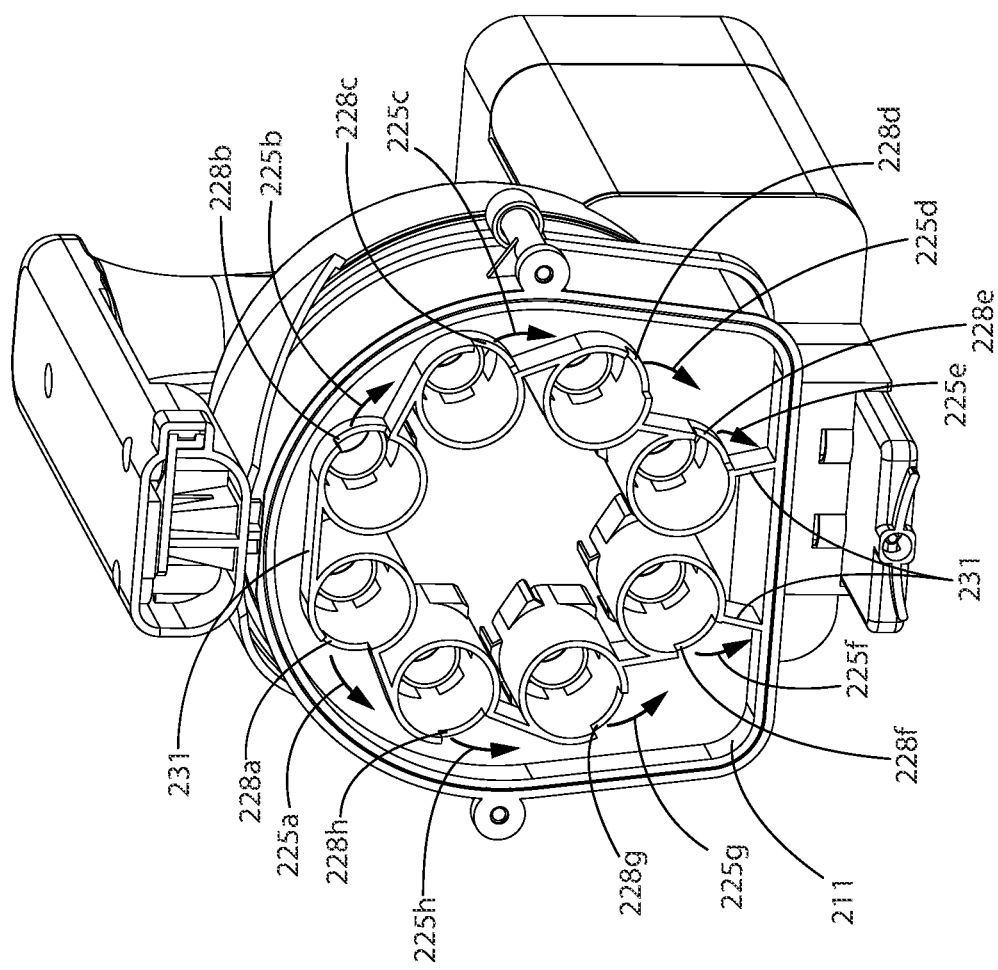
FIG. 25 is a section view of the surface cleaning apparatus of FIG. 24, taken along line 25-25 shown in FIG. 24.
Figure 26:
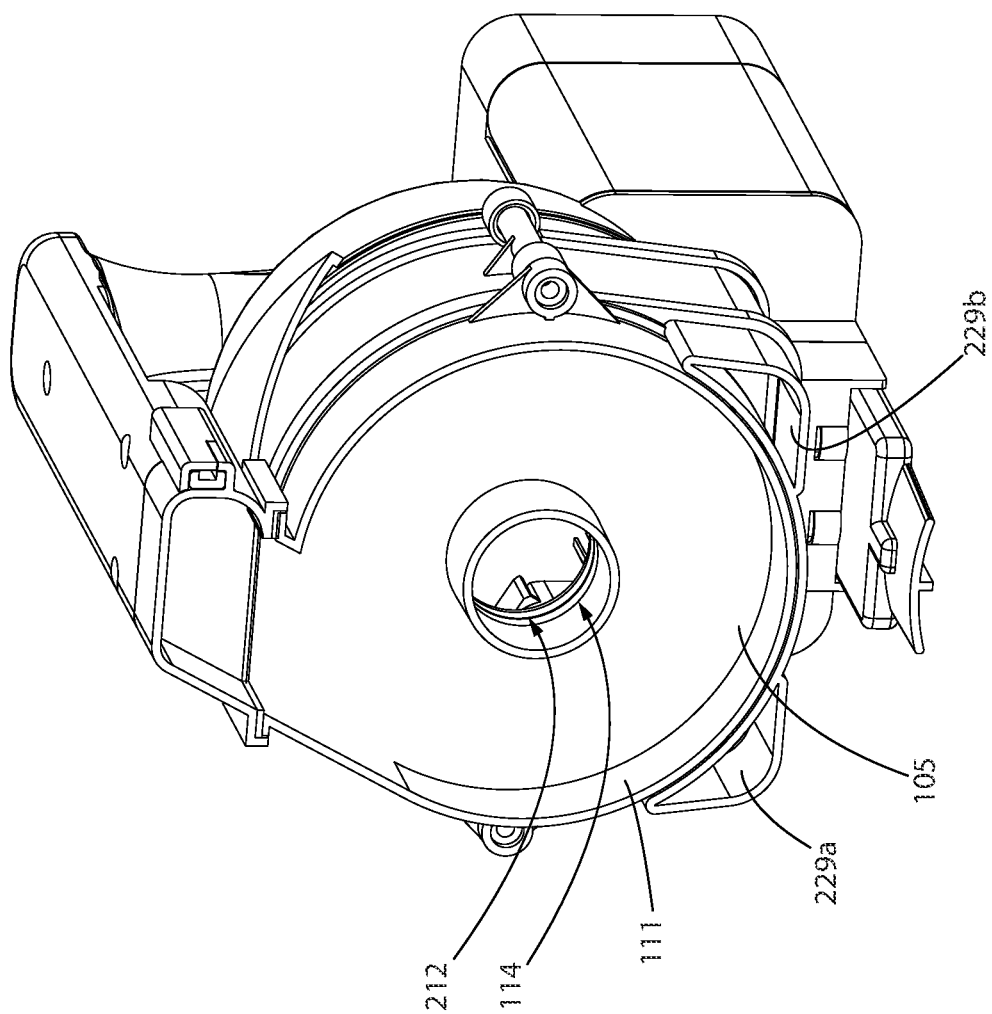
FIG. 26 is a section view of the surface cleaning apparatus of FIG. 24, taken along line 26-26 shown in FIG. 24.
Figure 27:
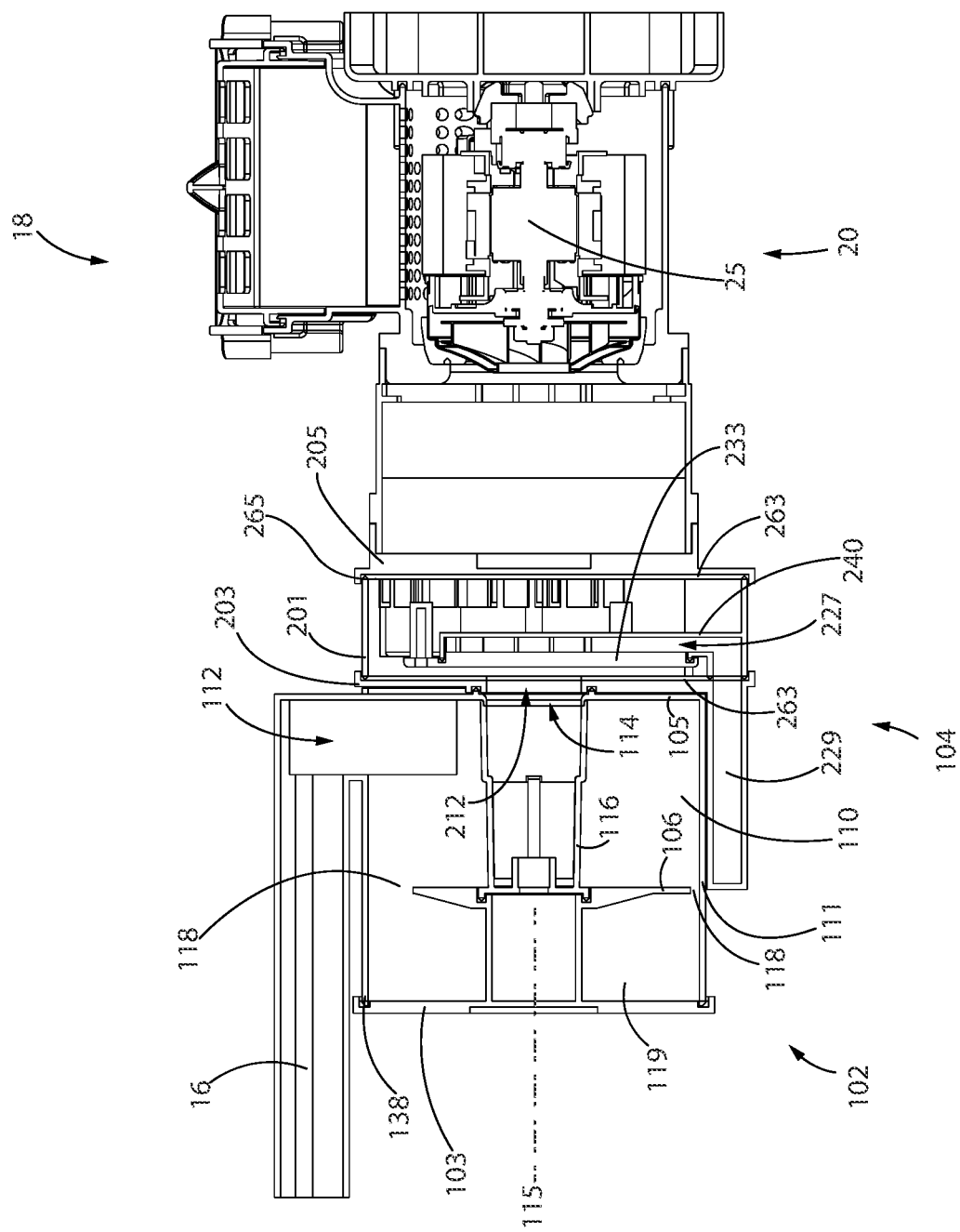
FIG. 27 is a perspective cross-section view of a surface cleaning apparatus comprising a first cyclonic cleaning stage and a second cyclonic cleaning stage in accordance with another embodiment.
Figure 28:
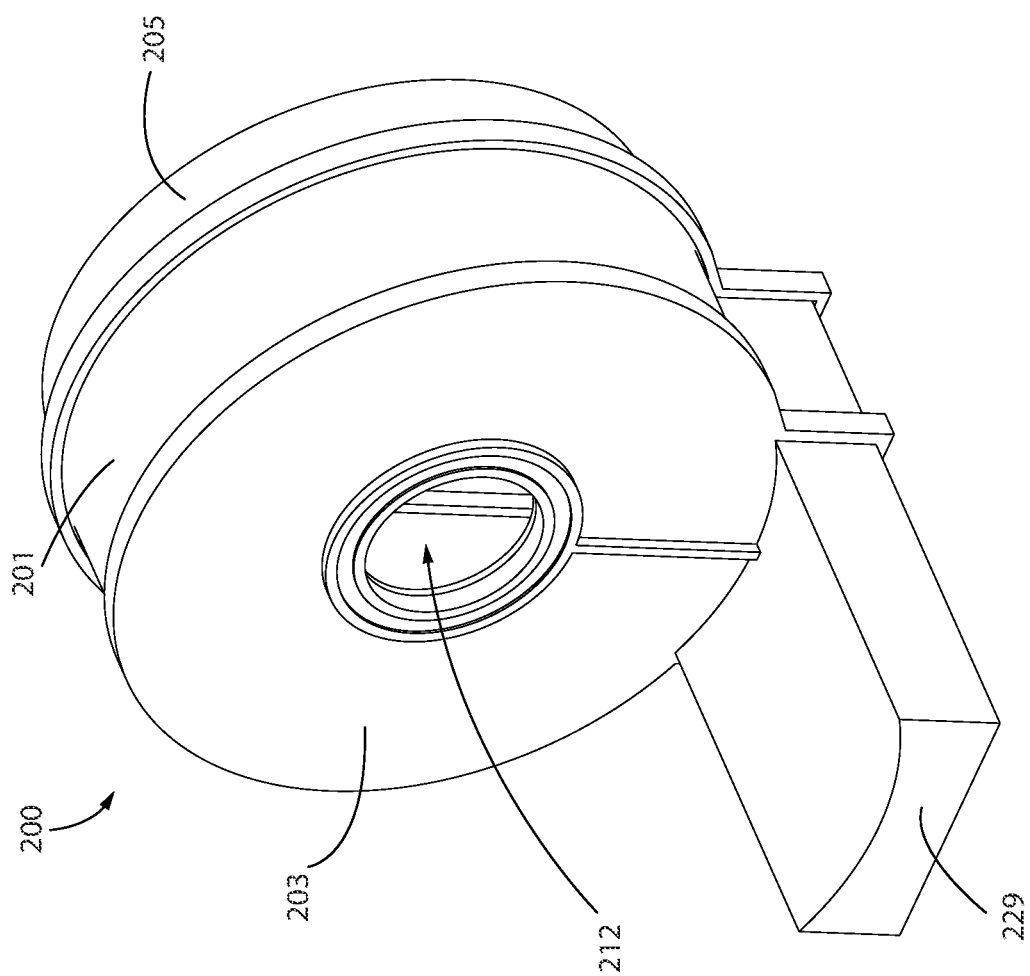
FIG. 28 is a perspective view from the front end of the surface cleaning apparatus of the second cyclonic cleaning stage of the surface cleaning apparatus of FIG. 27.
Figure 29:
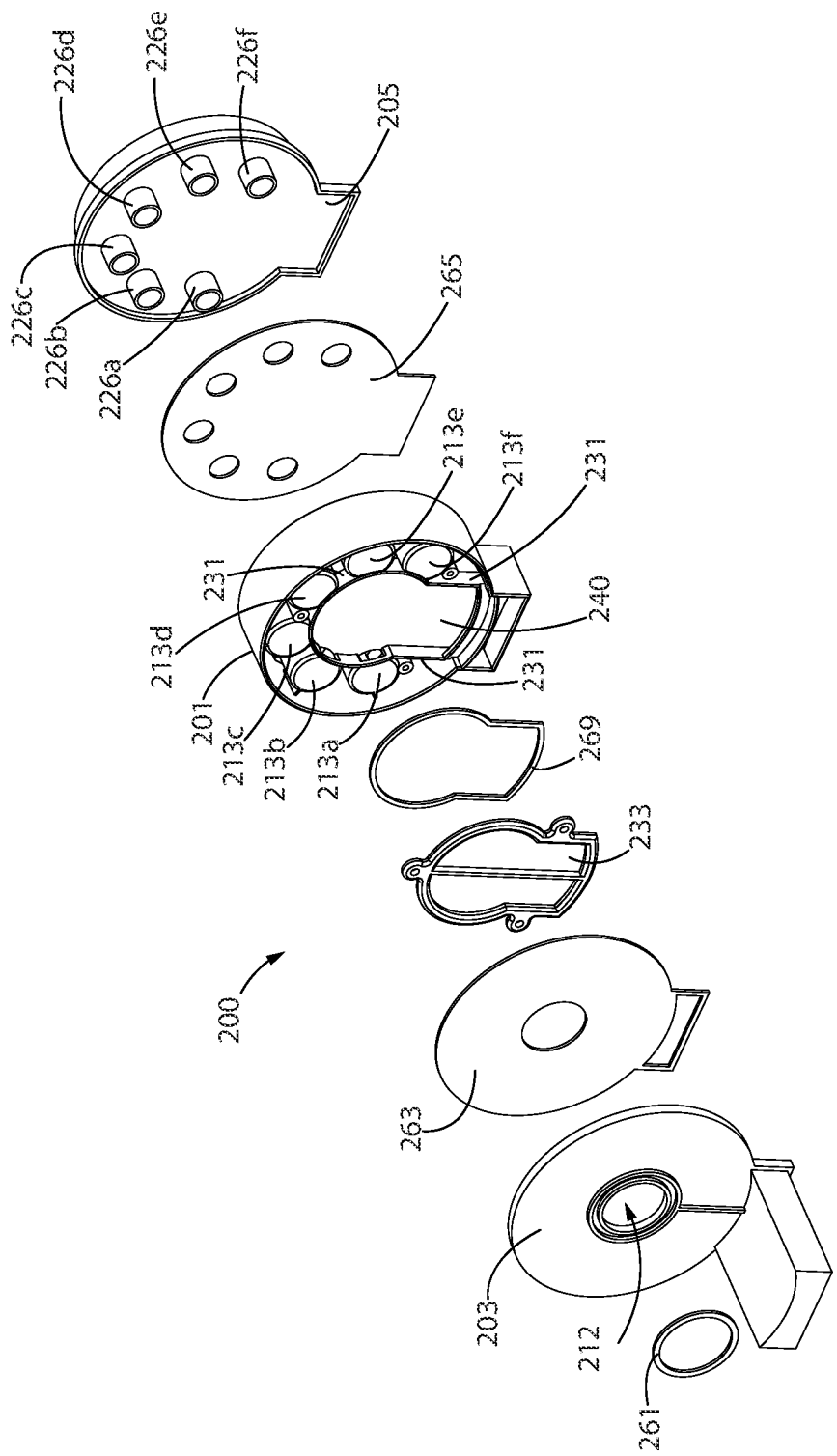
FIG. 29 is an exploded view from the front end of the surface cleaning apparatus of the second cyclonic cleaning stage of FIG. 28.
Figure 30:
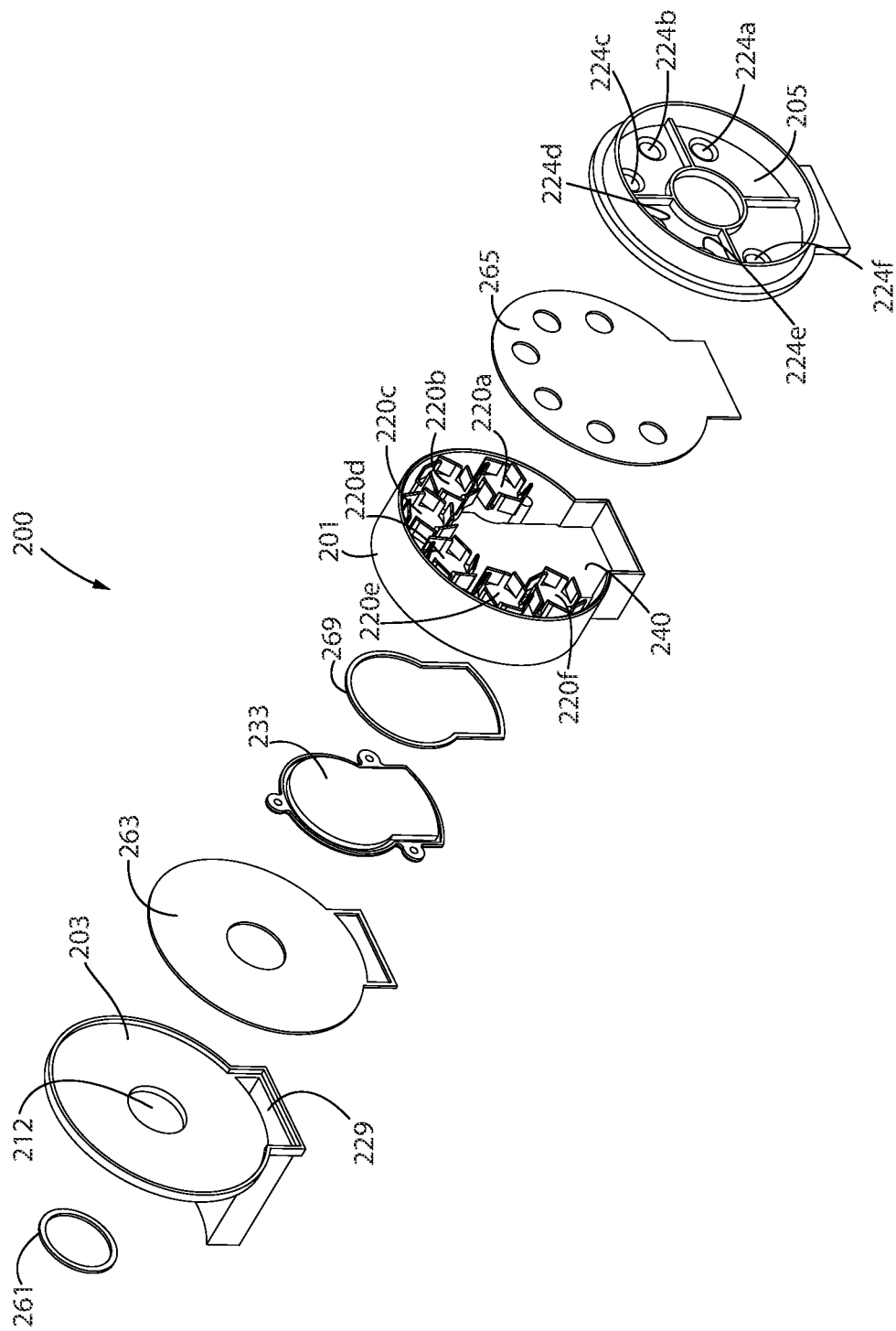
FIG. 30 is exploded view from the air inlet and outlet end of the second cyclonic cleaning stage of FIG. 28.

Alternatively, as exemplified in FIGS. 25 and 26, two or more dirt collection regions may be provided. For example, a dirt collection region in communication with cyclone chamber dirt outlets 228a and 228d (the dirt outlets on the left side of the second cyclonic cleaning stage 200 when viewed from the front of the hand vacuum cleaner), and another dirt collection region in communication with cyclone chamber dirt outlets 228b and 228c (the dirt outlets on the right side of the second cyclonic cleaning stage 200 when viewed from the front of the hand vacuum cleaner).

Orienting the cyclone chamber dirt outlets such that dirt is ejected outwardly into the dirt collection plenum and in a direction towards a second stage dirt collection region may have one or more advantages. For example, by orienting the direction of the ejected dirt a relatively small gap 235 (e.g. less than 10 mm, less than 5 mm, or about 3 mm) may be provided between the second stage cyclone chamber sidewalls 221 and the outer wall 211 of the central body member 201, which may result in a more compact design of a second cyclonic cleaning stage.

As discussed previously, in the illustrated embodiment, air exiting the first stage air outlet 114 is directed along a conduit 30 to a second stage air inlet 212 and into manifold 217 of the downstream cyclonic cleaning stage 200. Alternatively, conduit 30 may not be provided (or may have a de minimus length) such that air exiting the first stage air outlet 114 passes directly through second stage air inlet 212 and into manifold 217. In such embodiments, the second stage dirt collection chamber 229 may be provided alongside of the first stage air treatment member (e.g. radially outward of cyclone chamber 110). In such a configuration, the dirt collection chamber 119 and the second stage dirt collection region 229 may be configured to be concurrently openable. For example, end wall 103 may be configured so that when it is in the closed position, the surface facing the cyclone chamber 110 cooperatively engages an end surface of the sidewall 111 and also cooperatively engages an end surface of the second stage dirt collection region 229.

FIGS. 12 to 21 illustrate an embodiment of a cyclonic cleaning stage, referred to generally as 200. In this example embodiment, eight second stage cyclone chambers 220 are shown, referred to as 220a, 220b, 220c, 220d, 220e, 220f, 220g, and 220h, respectively. Elements having similar structure and/or performing similar function as those in the example cyclonic cleaning stage illustrated in FIGS. 1 to 11 are numbered similarly, and will not be discussed further.

The embodiment illustrated in FIGS. 12 to 21 is generally similar to the embodiment illustrated in FIGS. 1 to 11, with the exception of the number of second stage cyclone chambers. Notably, in the eight-cylinder embodiment of FIGS. 12 to 21, the second stage air inlet 212 has a circular cross-section, which is possible due to the space resulting from the generally circular arrangement of the eight second stage cyclone chambers 220a-h. This is in contrast to the generally cross-shaped air inlet 212 of the four-cylinder embodiment of FIGS. 1 to 11, which results from the reduced spacing of the four second stage cyclone chambers 220a-d.

Figure 21:
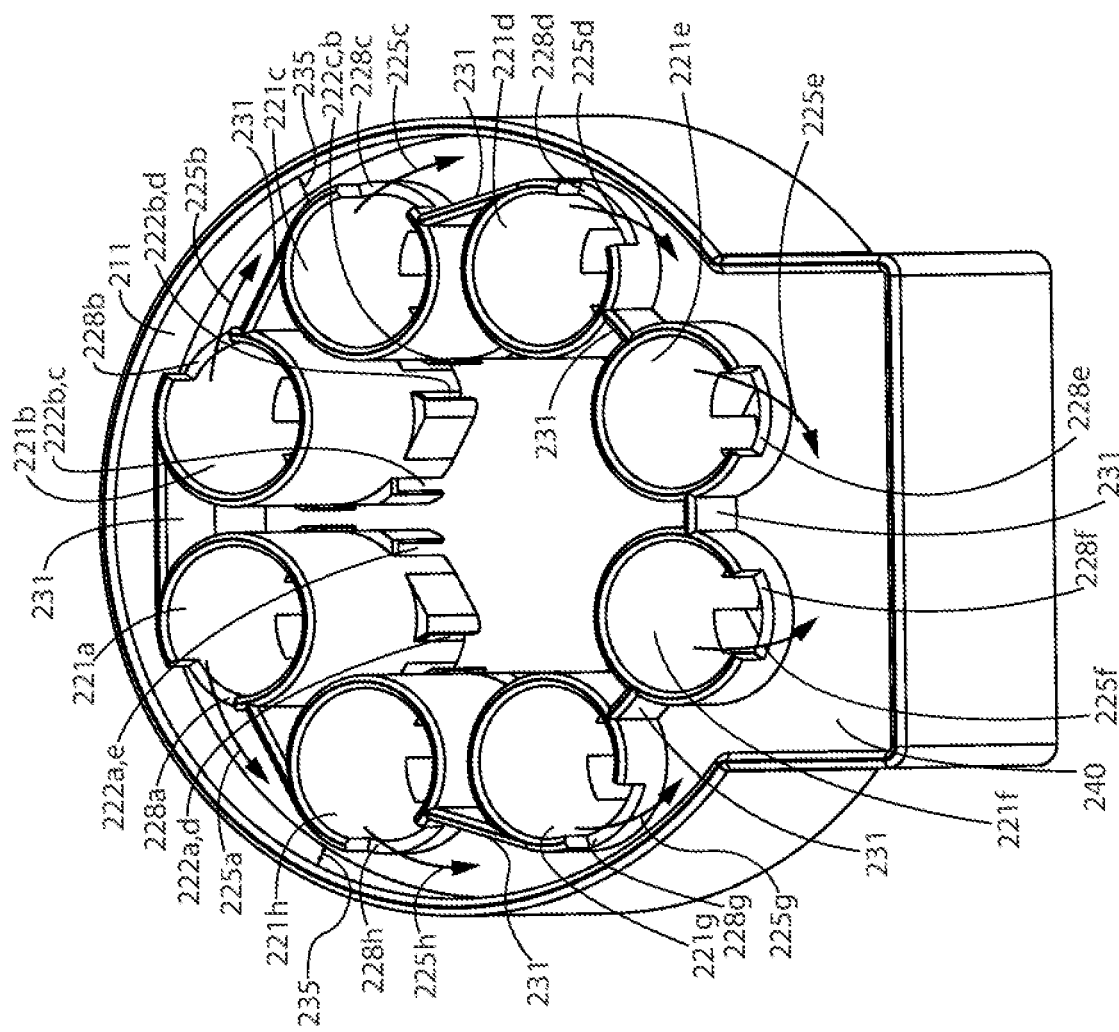
FIG. 21 is a perspective end view of the first ends of the second stage cyclones of the second cyclonic cleaning stage of FIG. 12.

In this example embodiment, the location and/or angle of the inner walls 231 that extend between adjacent second stage cyclone chamber sidewalls 221 is different than in the embodiment illustrated in FIG. 11. In the embodiment of FIG. 21, some of the walls 231 extend from a position adjacent the downstream end of a dirt outlet of one cyclone to the sidewall 221 of an adjacent cyclone chamber. In contrast, in the embodiment of FIG. 11, walls 231 extend from a position spaced from the dirt outlet of one cyclone chamber to a portion of the sidewall 221 of an adjacent cyclone chamber that is also spaced from the dirt outlet of that cyclone chamber.

Figure 22:
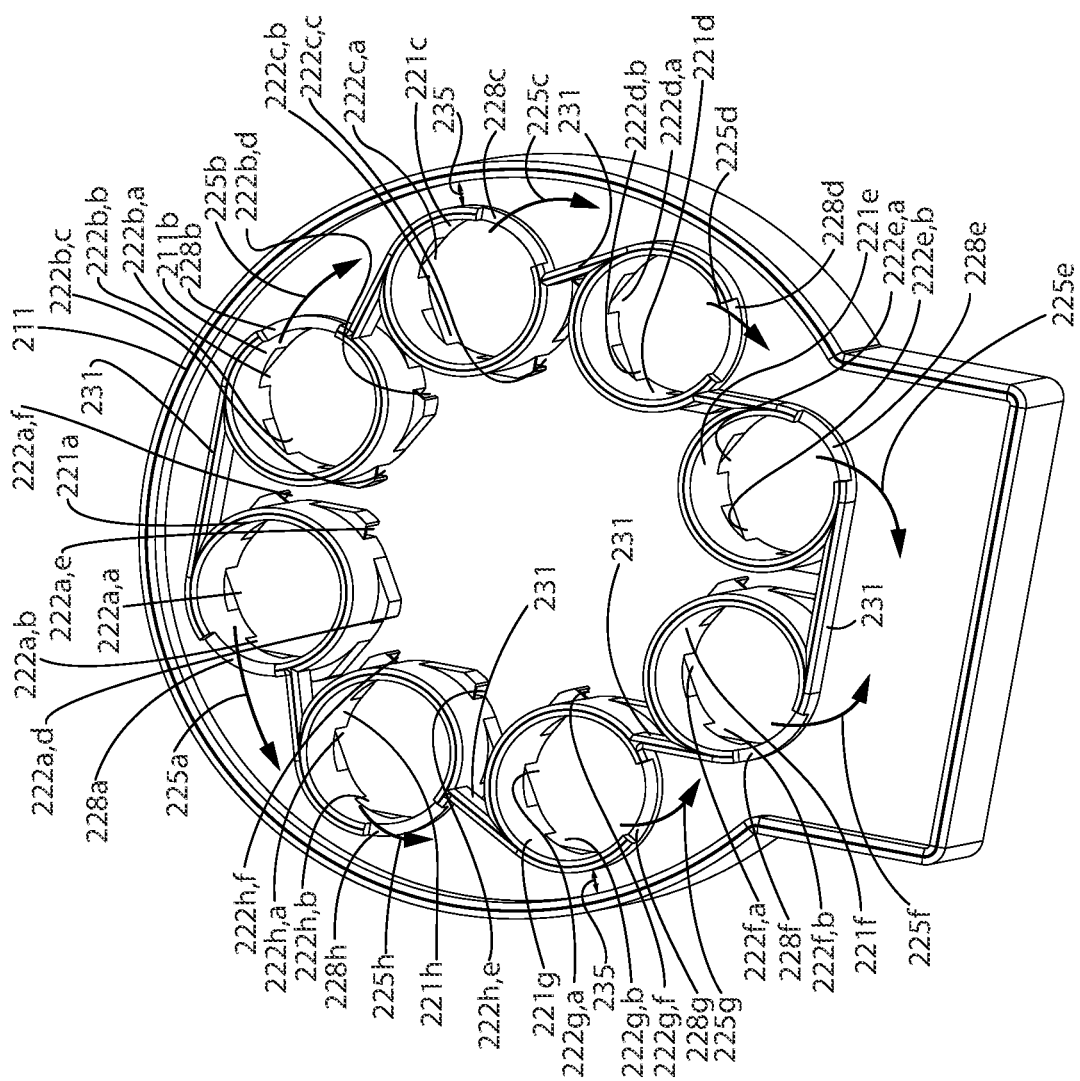
FIG. 22 is a perspective end view of the first ends of the second stage cyclones of a second cyclonic cleaning stage in accordance with another embodiment.

FIG. 22 illustrates another eight cyclone embodiment of a cyclonic cleaning stage. In this example embodiment, the location and/or angle of the inner walls 231 that extend between the adjacent second stage cyclone chamber sidewalls 221 located at the portion of the dirt plenum facing the dirt chamber 229 is different than in the embodiment illustrated in FIG. 21. As exemplified in FIG. 22, walls 231 that extend between cyclone chambers 228f and 228g, and between 228c and 228d also extend from a position adjacent the downstream end of a dirt outlet of one of the cyclone chambers. In addition, a wall 231 extends from a position adjacent the downstream end of the dirt outlet of cyclone chamber 228f to a position adjacent the downstream end of the dirt outlet of cyclone chamber 228c. Altering the position and/or angle of the inner walls 231 may inhibit or prevent debris from accumulating in the areas of the plenum 227 between the cyclone chamber sidewalls (e.g. the area adjacent wall 231 between sidewalls 221b and 221c).

Figure 23:
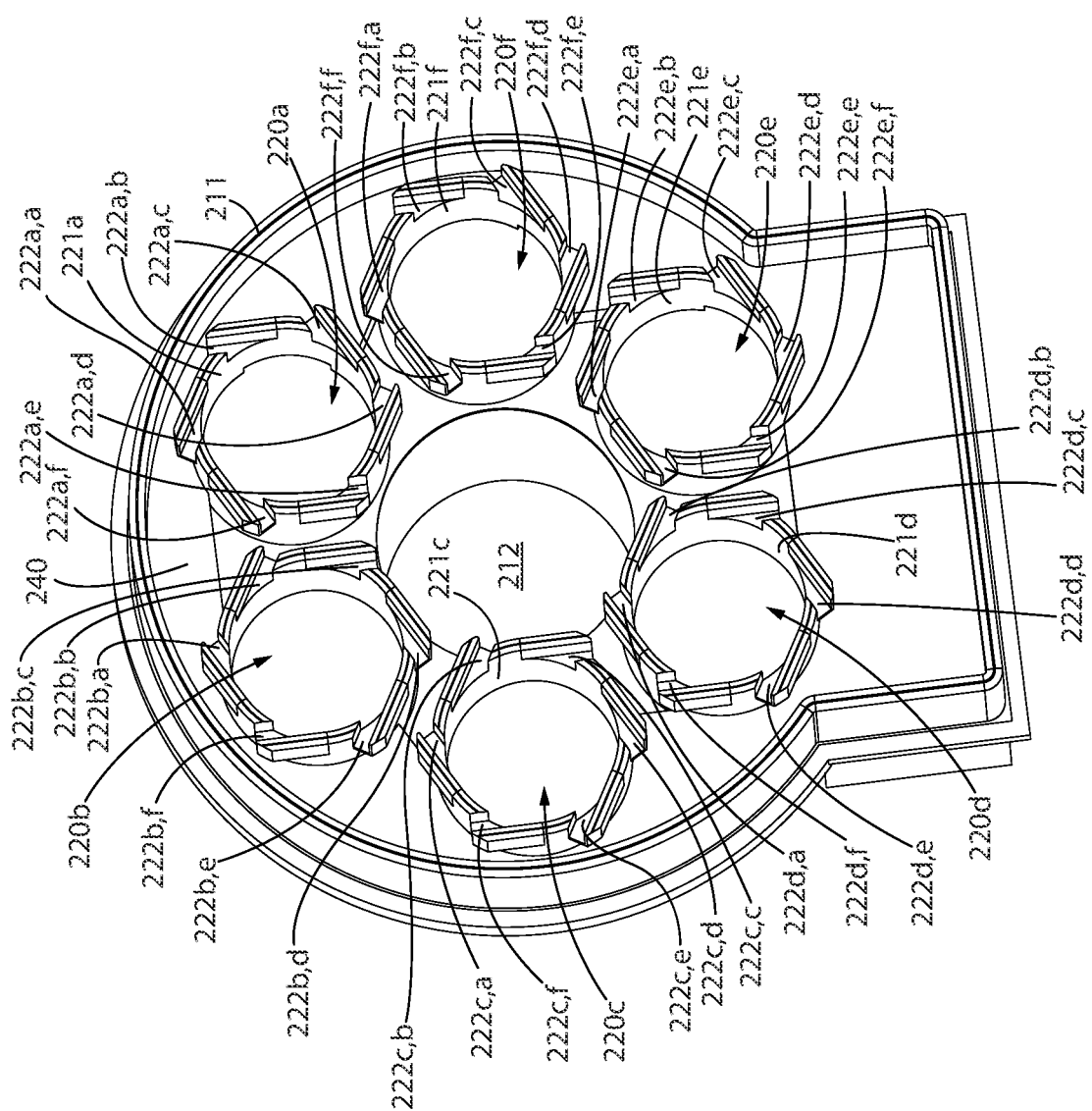
FIG. 23 is a perspective end view of the inlet plenum of the second stage cyclones of a second cyclonic cleaning stage in accordance with another embodiment.

FIG. 23 illustrates an embodiment of a cyclonic cleaning stage having six second stage cyclone chambers 220a-f. Elements having similar structure and/or performing similar function as those in the example cyclonic cleaning stage illustrated in FIGS. 1 to 11 are numbered similarly. This embodiment is generally similar to the embodiment illustrated in FIGS. 12 to 22, with the exception of the number of second stage cyclone chambers.

Figure 24:
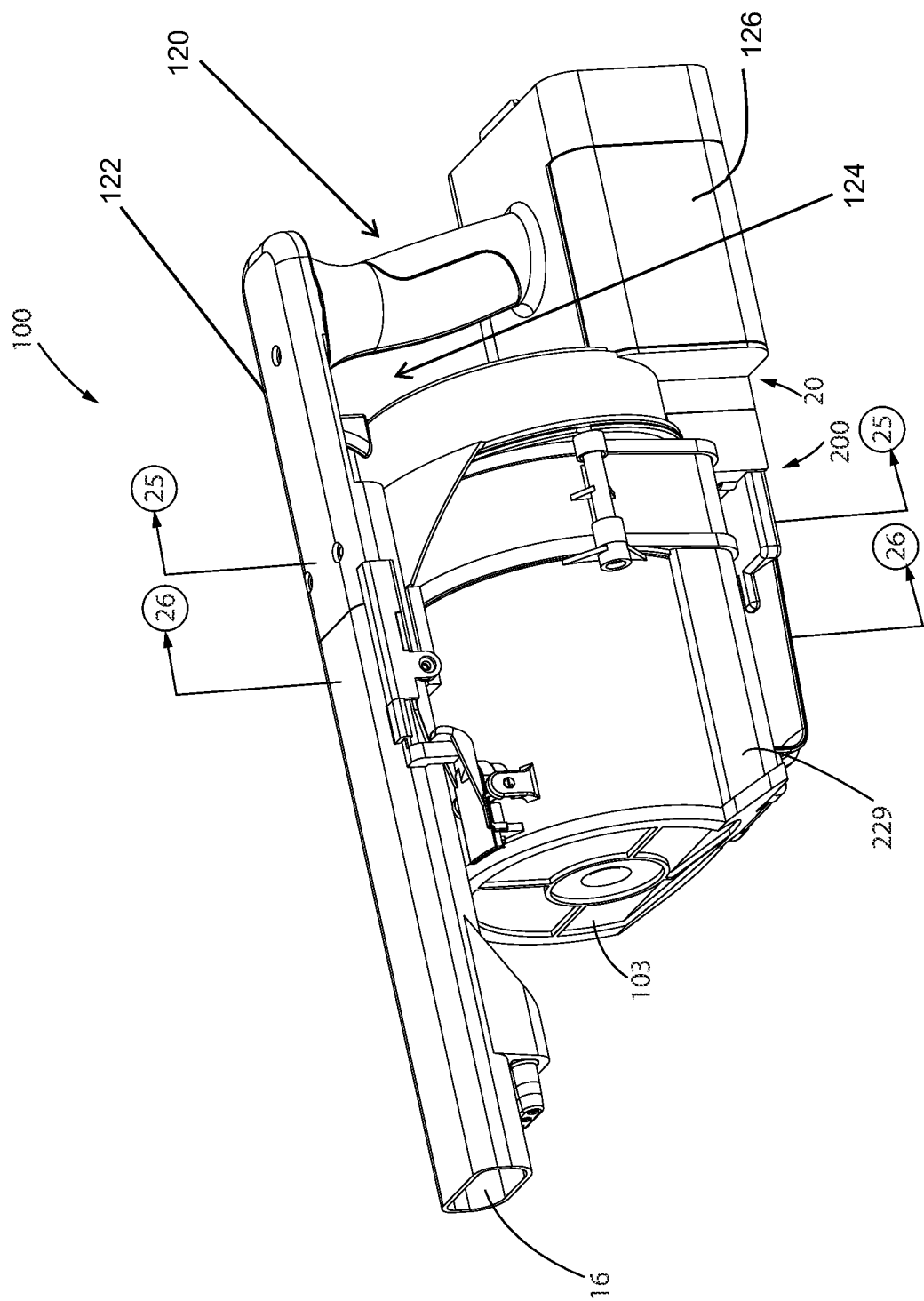
FIG. 24 is a perspective view of a surface cleaning apparatus comprising a first cyclonic cleaning stage and a second cyclonic cleaning stage in accordance with another embodiment.

FIGS. 24 to 26 illustrate a surface cleaning apparatus 100, in this case a hand vacuum, having an embodiment of a cyclonic cleaning stage, referred to generally as 200. Elements having similar structure and/or performing similar function as those in the example cyclonic cleaning stage illustrated in FIGS. 1 to 11 are numbered similarly, and will not be discussed further.

The embodiment illustrated in FIGS. 24 to 26 is generally similar to the embodiment illustrated in FIGS. 12 to 21, with the exception of the number of dirt collection regions and the configuration of the dirt collection plenum. Notably, in the embodiment of FIGS. 24 to 26, two second stage dirt collection regions 229 are provided.

As illustrated in FIG. 26, a first second stage dirt collection region 229a is provided on one side of cyclone chamber 110, and another (or second) second stage dirt collection region 229b is provided on another side of cyclone chamber 110. The illustrated locations of the dirt collection regions may facilitate a more compact design of the surface cleaning apparatus. It will be appreciated that the dirt collection regions may be positioned elsewhere in alternative embodiments.

As illustrated in FIG. 25, the dirt outlets 228a, 228f, 228g, and 228h of the second stage cyclone chambers 220a, 220f, 220g, and 220h are oriented such that dirt is ejected outwardly into the dirt collection plenum 227 in a direction towards the dirt collection region 229a. For example, as illustrated in FIG. 25, the air inlets 222a,a-f, 222f,a-f, 222g,a-f, and 222h,a-f may be oriented such that, in operation, air is directed into the second stage cyclone chambers 220a, 220f, 220g, and 220h such that air within the cyclone chamber may rotate in a counter-clockwise direction, when viewed from the outlet end. Accordingly, most if not all of the dirt ejected from the second stage cyclone chamber dirt outlets 228a, 228f, 228g, and 228h may be directed towards the dirt collection region 229a, e.g. in directions 225a, 225f, 225g, and 225h, respectively.

The dirt outlets 228b, 228c, 228d, and 228e of the second stage cyclone chambers 220b, 220c, 220d, and 220e are oriented such that dirt is ejected outwardly into the dirt collection plenum 227 in a direction towards the dirt collection region 229b. For example, as illustrated in FIG. 25, the air inlets 222b,a-f, 222c,a-f, 222d,a-f, and 222e,a-f may be oriented such that, in operation, air is directed into the second stage cyclone chambers 220b, 220c, 220d, and 220e such that air within the cyclone chamber may rotate in a clockwise direction, when viewed from the outlet end. Accordingly, most if not all of the dirt ejected from the second stage cyclone chamber dirt outlets 228b, 228c, 228d, and 228e may be directed towards the dirt collection region 229b, e.g. in directions 225b, 225c, 225d, and 225e, respectively.

Dirt Collection Plenum for Second Stage Cyclones Positioned Radially Inward of the Second Stage Cyclones The following is a description of the positioning of a dirt collection plenum for second stage cyclones that may be used by itself in any surface cleaning apparatus or in any combination or sub-combination with any other feature or features disclosed herein.

In accordance with one feature, a second stage dirt collection plenum is provided between the dirt outlets of two or more second stage cyclone chambers and a second stage dirt collection region. In accordance with this feature, the air flow path to the air inlets 222 of the cyclone chambers is provided radially outwardly from the dirt collection plenum. Accordingly, at least a portion of, and preferably all or substantially all of the second stage dirt collection plenum may be positioned radially inwardly of the second stage cyclone chambers. In such an embodiment, this preferred location for the second stage dirt collection plenum may facilitate a more compact design of the cyclonic cleaning stage 200.

FIGS. 27 to 32 illustrate an embodiment of a cyclonic cleaning stage, referred to generally as 200. In this example embodiment, six second stage cyclone chambers 220 are shown, referred to as 220a, 220b, 220c, 220d, 220e, and 220f, respectively. Elements having similar structure and/or performing similar function as those in the example cyclonic cleaning stage illustrated in FIGS. 1 to 11 are numbered similarly, and will not be discussed further.

In the illustrated embodiments, air entering the downstream cyclonic cleaning stage 200 via second stage air inlet 212 is directed into a chamber or manifold 217, which is in communication with the air inlets 222 of the cyclone chambers 220.

In the embodiments illustrated in FIGS. 1 to 26, air directed through second stage air inlet 212 enters a central portion of the manifold 217 (e.g., a portion axially aligned with conduit 30), and a portion of the air flow may diffuse radially outwardly towards the outer wall 211 of the central body member 201 to surround the air inlets 222 of the cyclone chambers 220.

In contrast, in the embodiments illustrated in FIGS. 27 to 32, air passing through second stage air inlet 212 is directed radially outwardly towards the outer wall 211 of the central body member 201 (i.e. a radially outward portion of the manifold 217), and a portion of the air flow may diffuse radially inwardly towards a central portion of the manifold 217 to surround the air inlets 222 of the cyclone chambers 220.

Since the air flow path to the manifold 217 is centrally located in the embodiments illustrated in FIGS. 1 to 26, each cyclone chamber 220 may extend along a respective cyclone axis 215 and includes a sidewall 221 that extends between a first end wall 203 and a second end wall 205 of the second cyclonic stage. In contrast, in the embodiments illustrated in FIGS. 27 to 32, a plenum may be provided at the front end of the second cyclonic stage to distribute the air towards the outer wall 221. Therefore, instead of the second stage cyclones extending from the front end wall 203 of the second cyclonic stage, the forwardly positioned wall of the second stage cyclones (which is designated as first end wall 213) is spaced from front end wall 203 of the second cyclonic stage to accommodate an air flow plenum at the front end of the second cyclonic cleaning stage. Accordingly, each cyclone chamber 220 extends along a respective cyclone axis 215 and includes a sidewall 221 that extends between the first end wall 213 and a second end wall 205.

Figure 31:
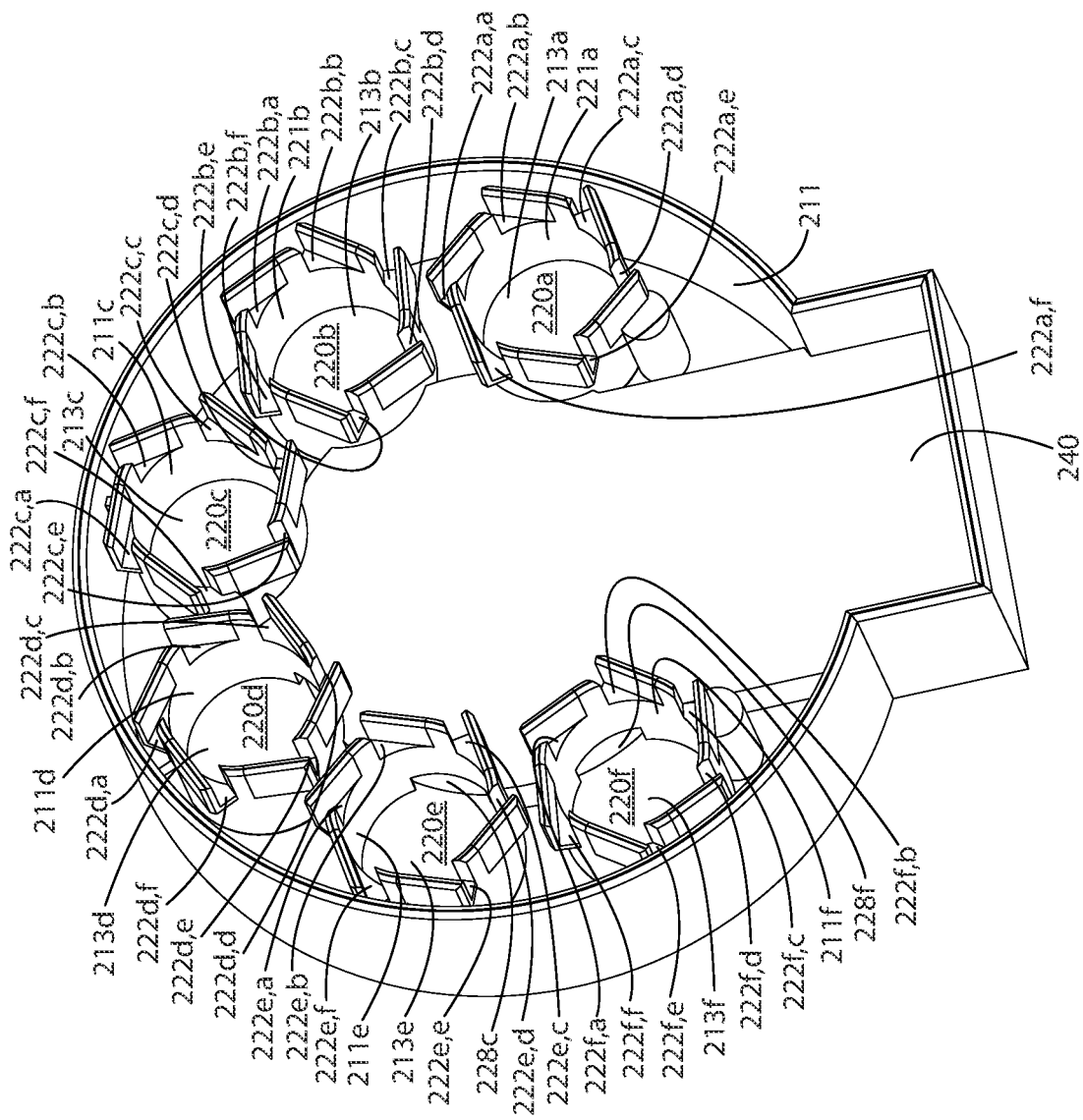
FIG. 31 is a perspective end from the air inlet and outlet end view of the first ends of the second stage cyclones of the second cyclonic cleaning stage of FIG. 27.
Figure 32:
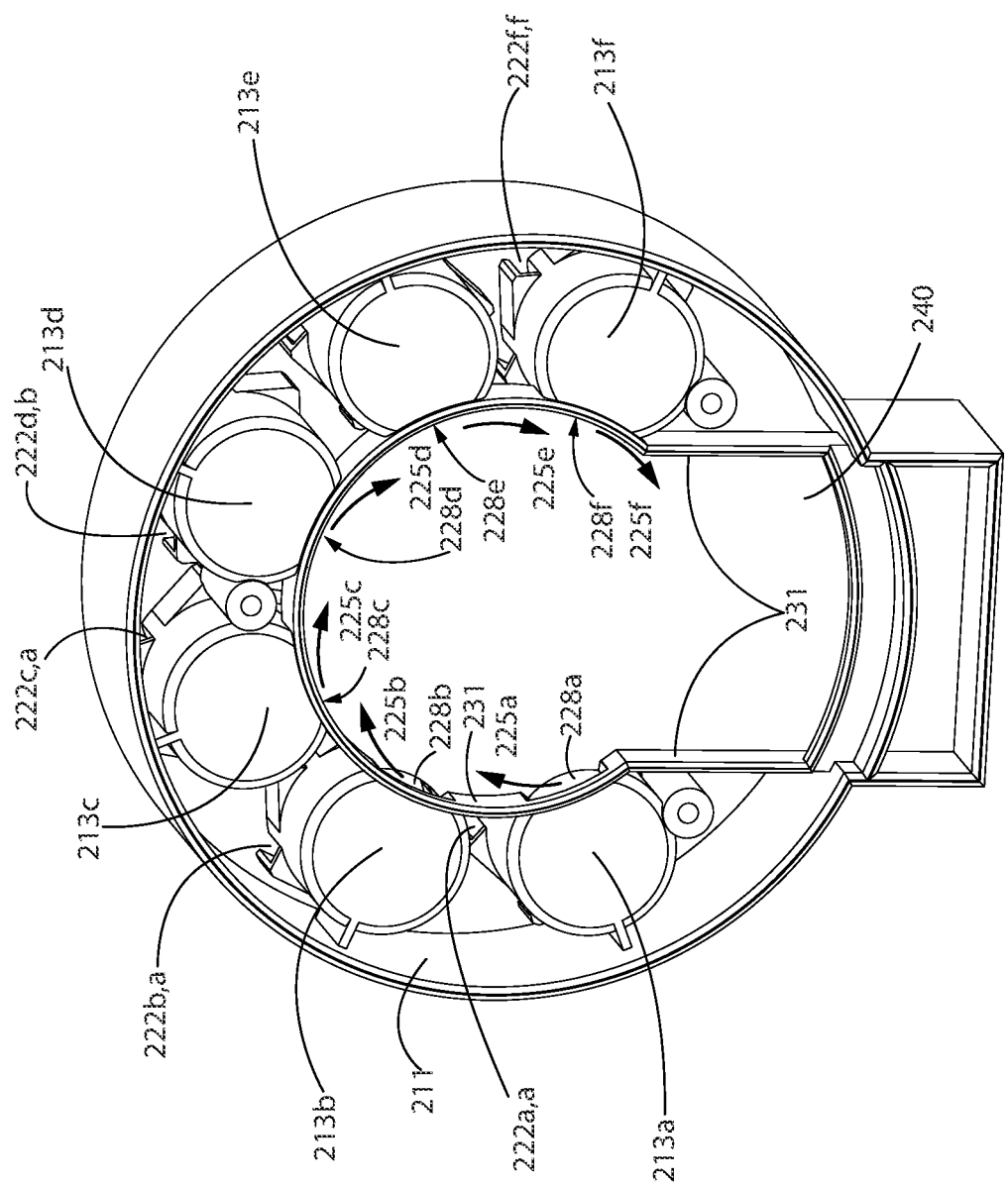
FIG. 32 is a perspective end from the front end of the surface cleaning apparatus view of the inlet ends of the second stage cyclones of the second cyclonic cleaning stage of FIG. 27.
Figure 33:
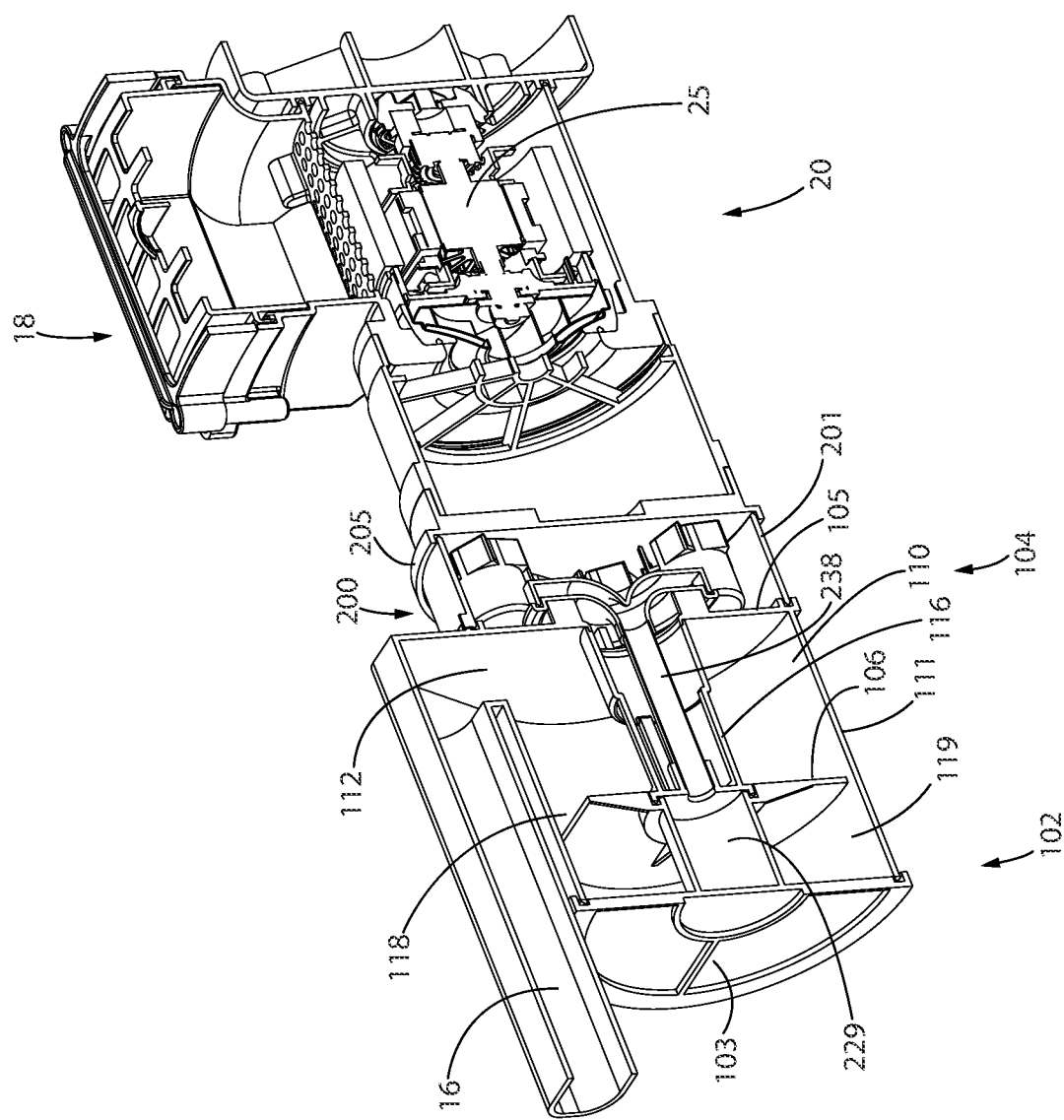
FIG. 33 is a perspective cross-section view of a surface cleaning apparatus comprising a first cyclonic cleaning stage and a second cyclonic cleaning stage in accordance with another embodiment.

As illustrated in FIG. 31, dirt collection plenum 227 is defined by an intermediate wall 240 of the central body member 201, an inner surface of an intermediate plate 233, and an inner wall 231 (which may be characterized as a dirt plenum side wall 231) extending between the intermediate wall 240 and the intermediate plate 233.

Accordingly, as exemplified, a majority of dirt collection plenum 227 may be positioned radially inwardly from the second stage cyclone chambers 220a-f. As shown in the illustrated example, dirt outlets 228a-f are oriented such that dirt is ejected inwardly into the dirt collection plenum 227 in a plane generally transverse to the cyclone axis of rotation 215. Put another way, substantially all of the portion of dirt collection plenum 227 in direct communication with dirt outlets 228a-f of the second stage cyclone chambers 220a-f is positioned radially inwardly from the second stage cyclone chambers 220a-f.

As exemplified, the air inlets 222a,a-f, 222b,a f, 222c,a-f, 222d,a f, 222e,a-f, and 222f,a-f may be oriented such that, in operation, air is directed into the second stage cyclone chambers 220a-f such that air within the cyclone chambers may rotate in a counter-clockwise direction, when viewed from the outlet end. Accordingly, most if not all of the dirt ejected from the second stage cyclone chamber dirt outlets 228a, 228b, 228c, 228d, 228e, and 228f may travel in generally the same direction towards the dirt collection region 229, e.g. in directions 225a, 225b, 225c, 225d, 225e, and 225f, respectively. An advantage of this design is that it may promote a cyclonic air flow within the dirt collection plenum 227.

Alternatively, some or all of the air inlets 222 for a cyclone chamber 220 may be oriented such that, in operation, air within some cyclone chambers may rotate in a clockwise direction. For example, cyclone chambers 220a, 220b, and 220c may be configured to promote air rotation in a counter-clockwise direction, and cyclone chambers 220d, 220e, and 220f may be configured to promote air rotation in a counter-clockwise direction. An advantage of this design is that dirt may be ejected from the cyclone chamber dirt outlets 228 into the dirt collection plenum in a direction towards the second stage dirt collection region 229.

In the illustrated embodiments, a single dirt collection region 229 is provided. Alternatively, two or more dirt collection regions may be provided (e.g. a dirt collection region in communication with cyclone chamber dirt outlets 228a, 228b, and 228c, and another dirt collection region in communication with cyclone chamber dirt outlets 228d, 228e, and 228f.)

FIGS. 33 to 42 illustrate an embodiment of a cyclonic cleaning stage, referred to generally as 200. In this example embodiment, the second stage dirt collection region 229 is located within the first stage cyclone and a conduit 238 connecting the second stage dirt collection plenum and the second sage dirt collection region 229 extends within the air flow passage from the first cyclonic stage to the second cyclonic stage. As exemplified, eight second stage cyclone chambers 220 are shown, referred to as 220a, 220b, 220c, 220d, 220e, 220f, 220g, and 220h, respectively. Elements having similar structure and/or performing similar function as those in the example cyclonic cleaning stage illustrated in FIGS. 27 to 32 are numbered similarly, and will not be discussed further.

Similar to the embodiments illustrated in FIGS. 27 to 32, in the embodiments illustrated in FIGS. 33 to 42, air passing through second stage air inlet 212 is directed radially outwardly towards the outer wall 211 of the central body member 201 (i.e. a radially outward portion of the manifold 217), and a portion of the air flow diffuses radially inwardly towards a central portion of the manifold 217 to surround the air inlets 222 of the cyclone chambers 220.

In the embodiments illustrated in FIGS. 33 to 42, dirt collection plenum 227 is defined by an intermediate wall 240 of the central body member 201, an inner surface of an intermediate plate 233, and an inner wall 231 (which may be characterized as a dirt plenum side wall 231) extending between the intermediate wall 240 and the intermediate plate 233.

Figure 34:
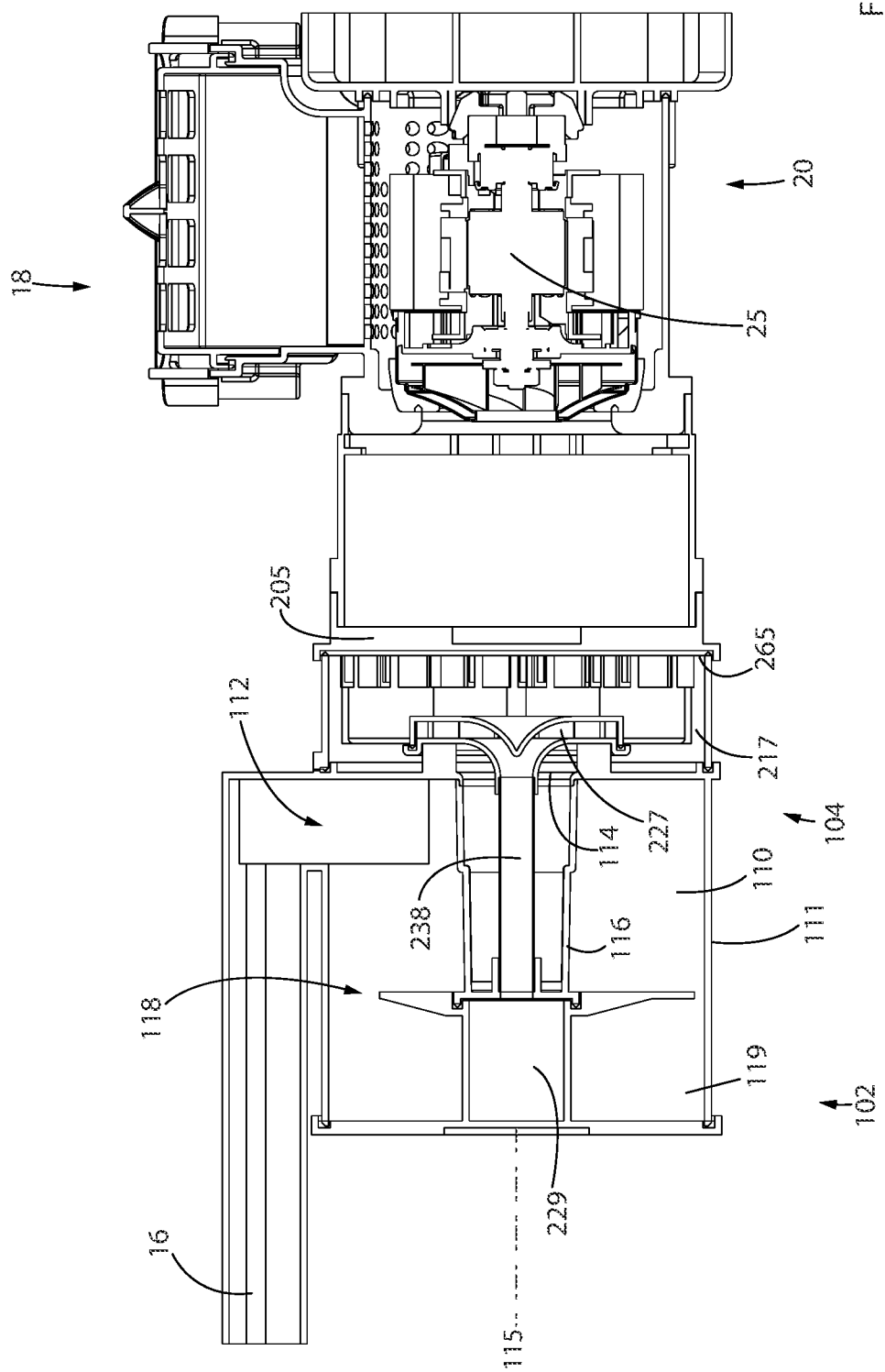
FIG. 34 is a cross-section view of the surface cleaning apparatus of FIG. 33.
Figure 35:
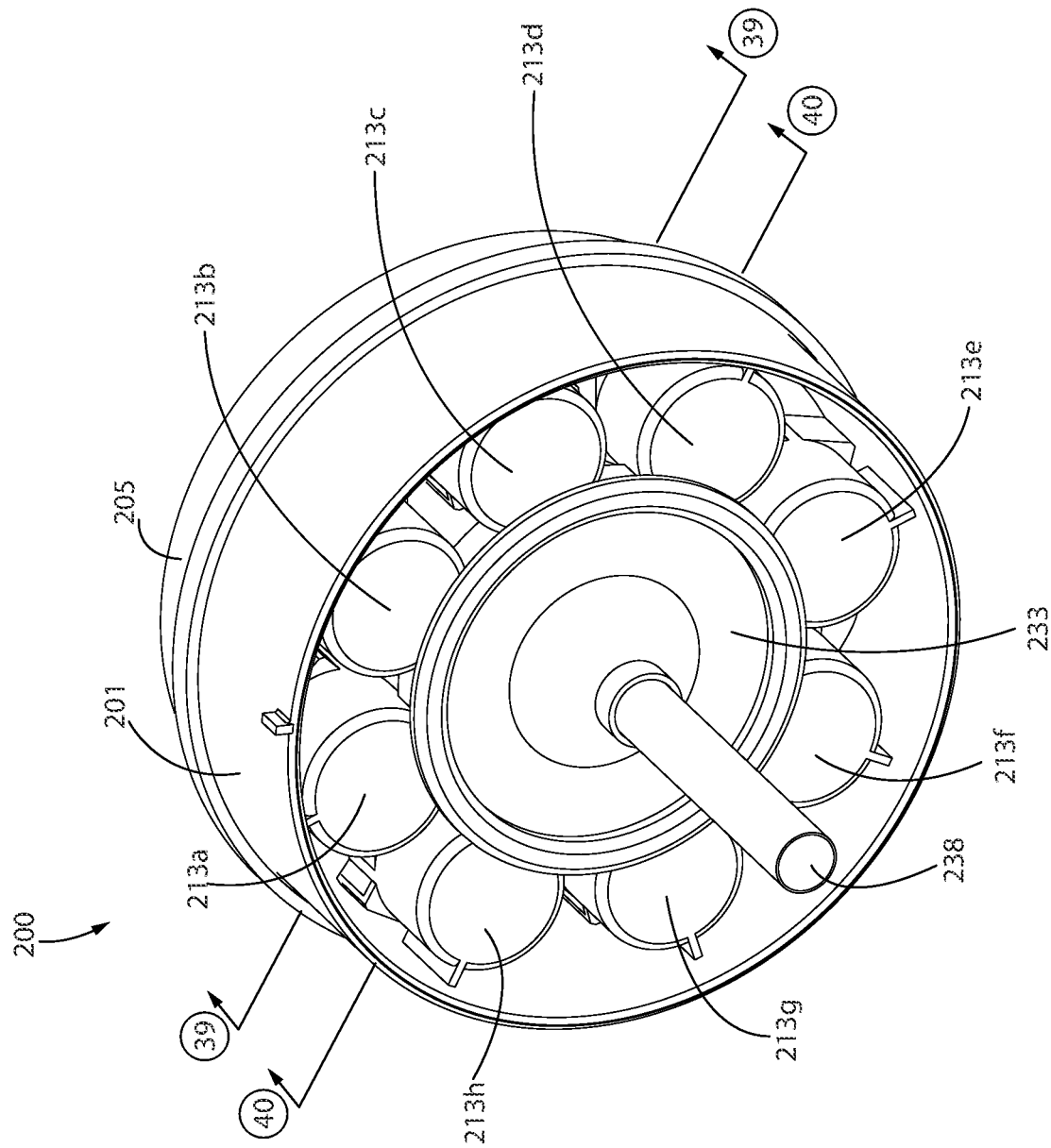
FIG. 35 is a perspective view from the front end of the surface cleaning apparatus of the second cyclonic cleaning stage of the surface cleaning apparatus of FIG. 33.
Figure 36:
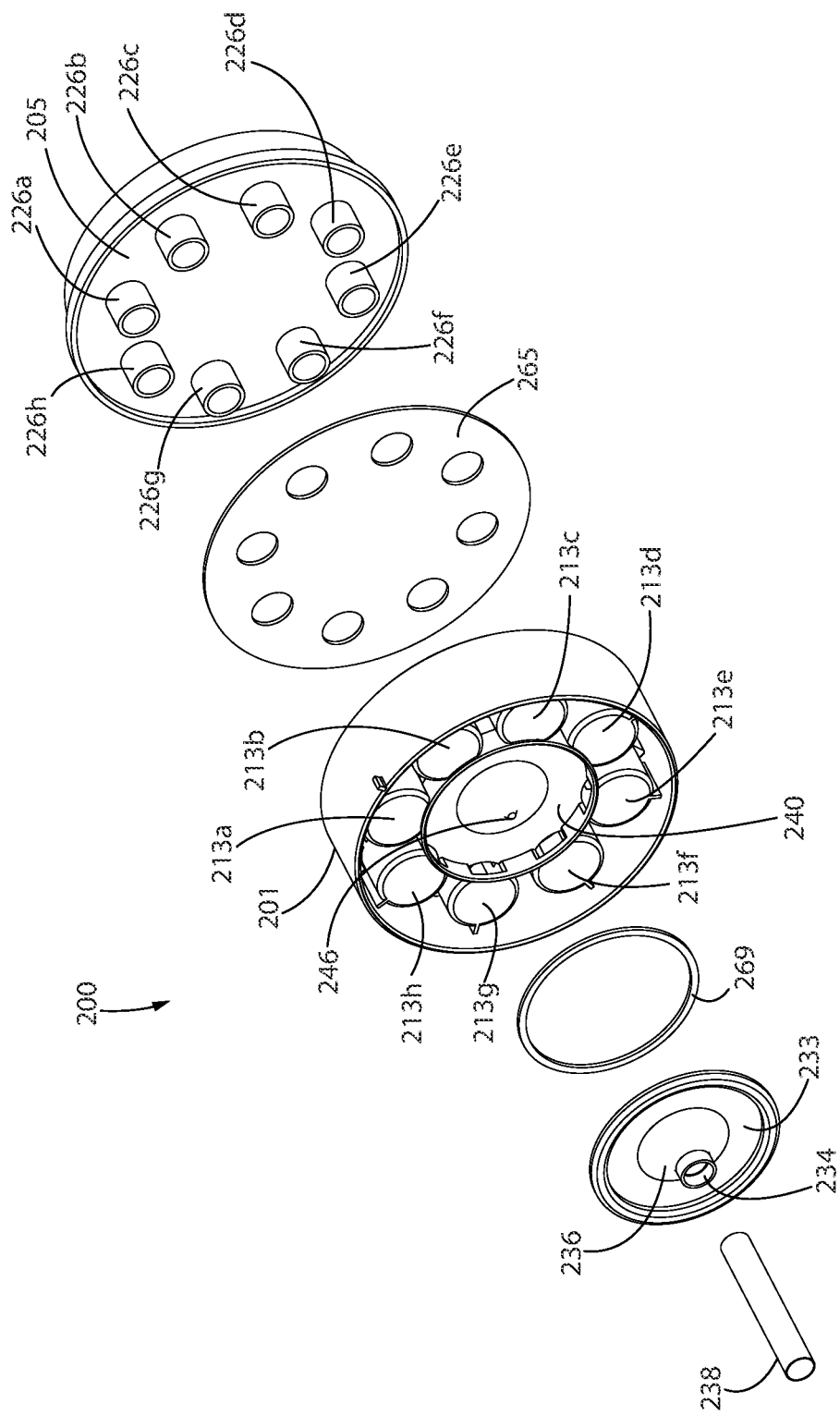
FIG. 36 is an exploded view from the front end of the surface cleaning apparatus of the second cyclonic cleaning stage of FIG. 35.
Figure 37:
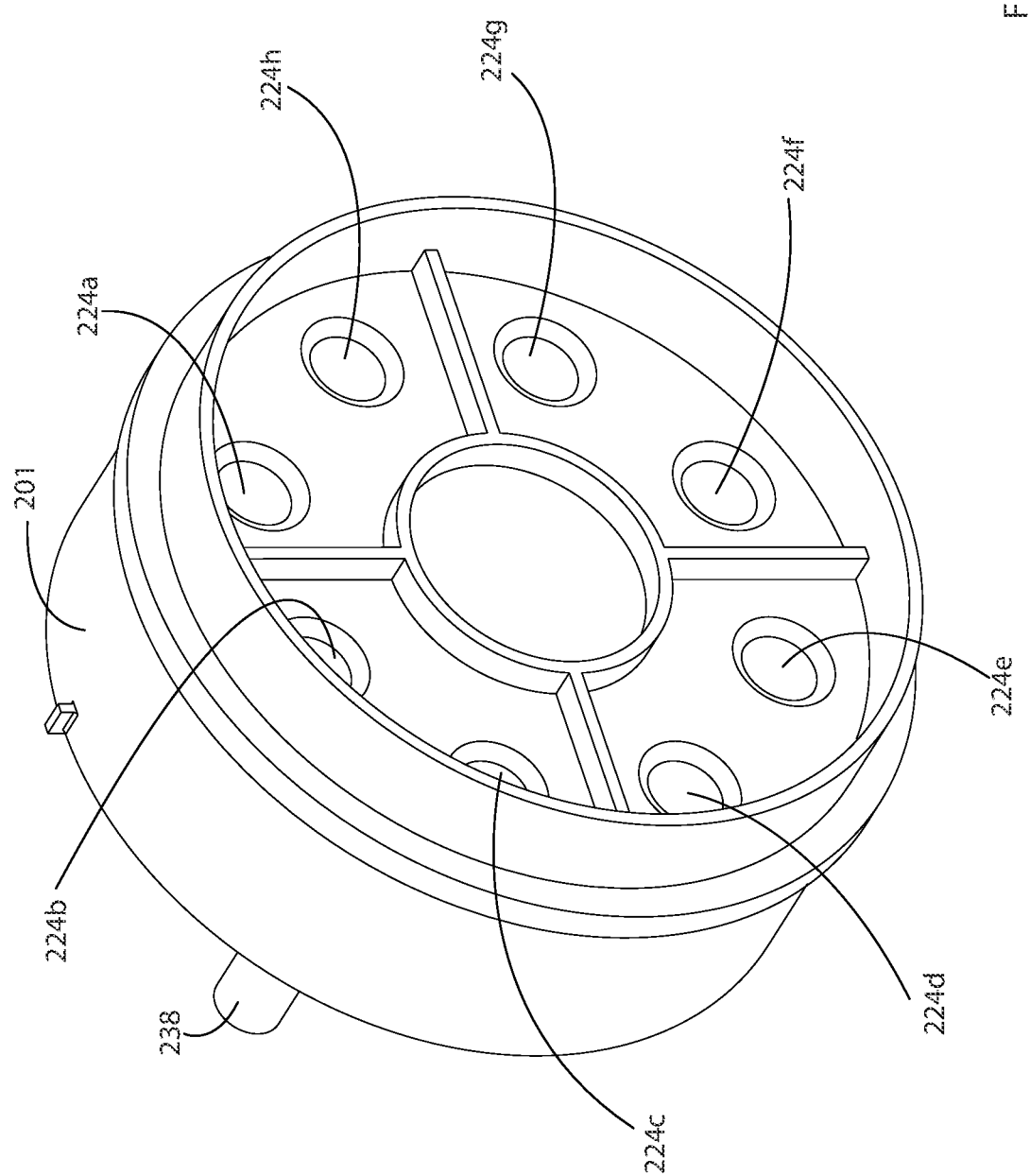
FIG. 37 is a perspective view of the downstream end of the second cyclonic cleaning stage of the surface cleaning apparatus of FIG. 33.
Figure 38:
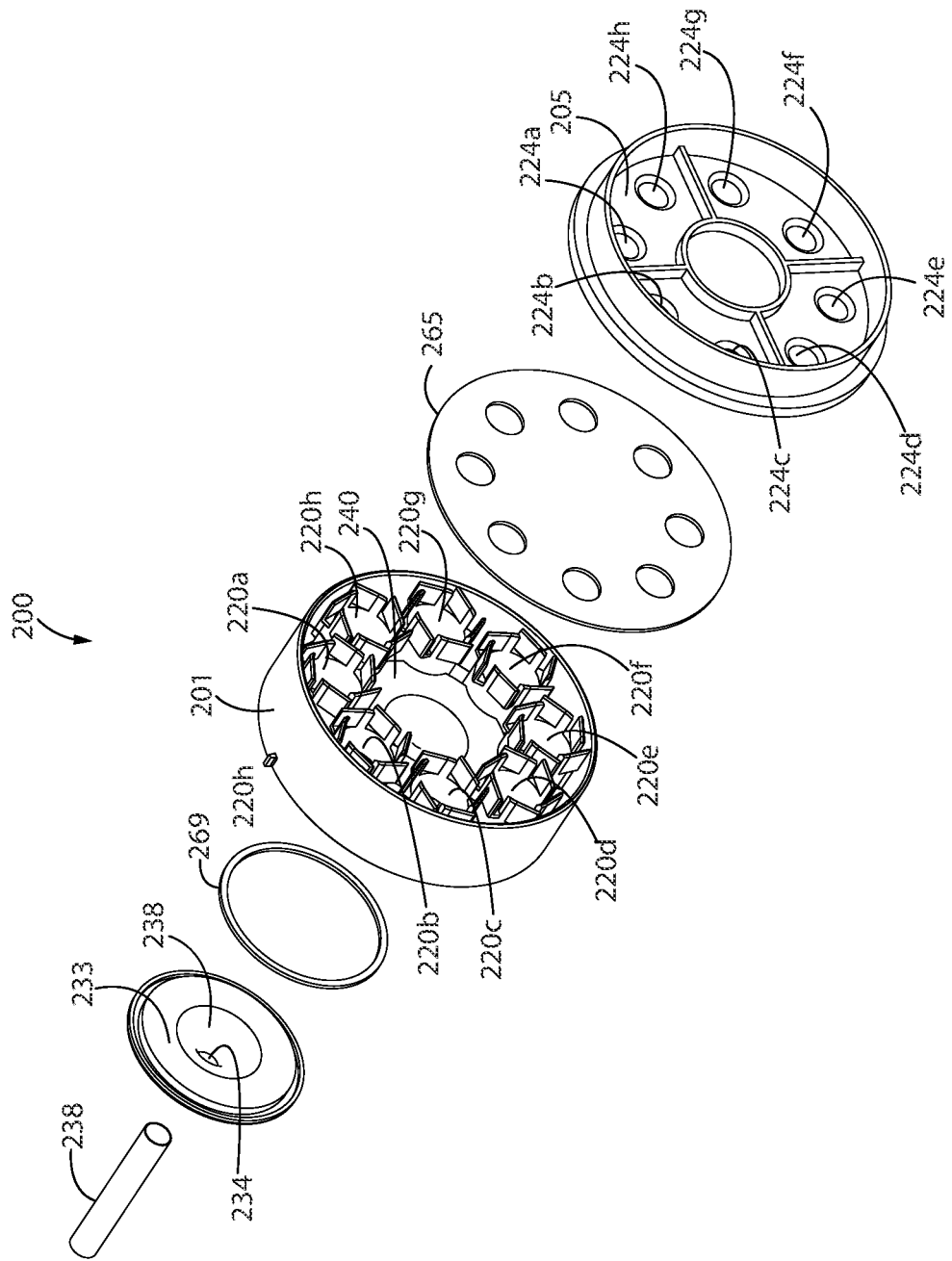
FIG. 38 is an exploded view from the downstream end of the second cyclonic cleaning stage of FIG. 37.
Figure 39:
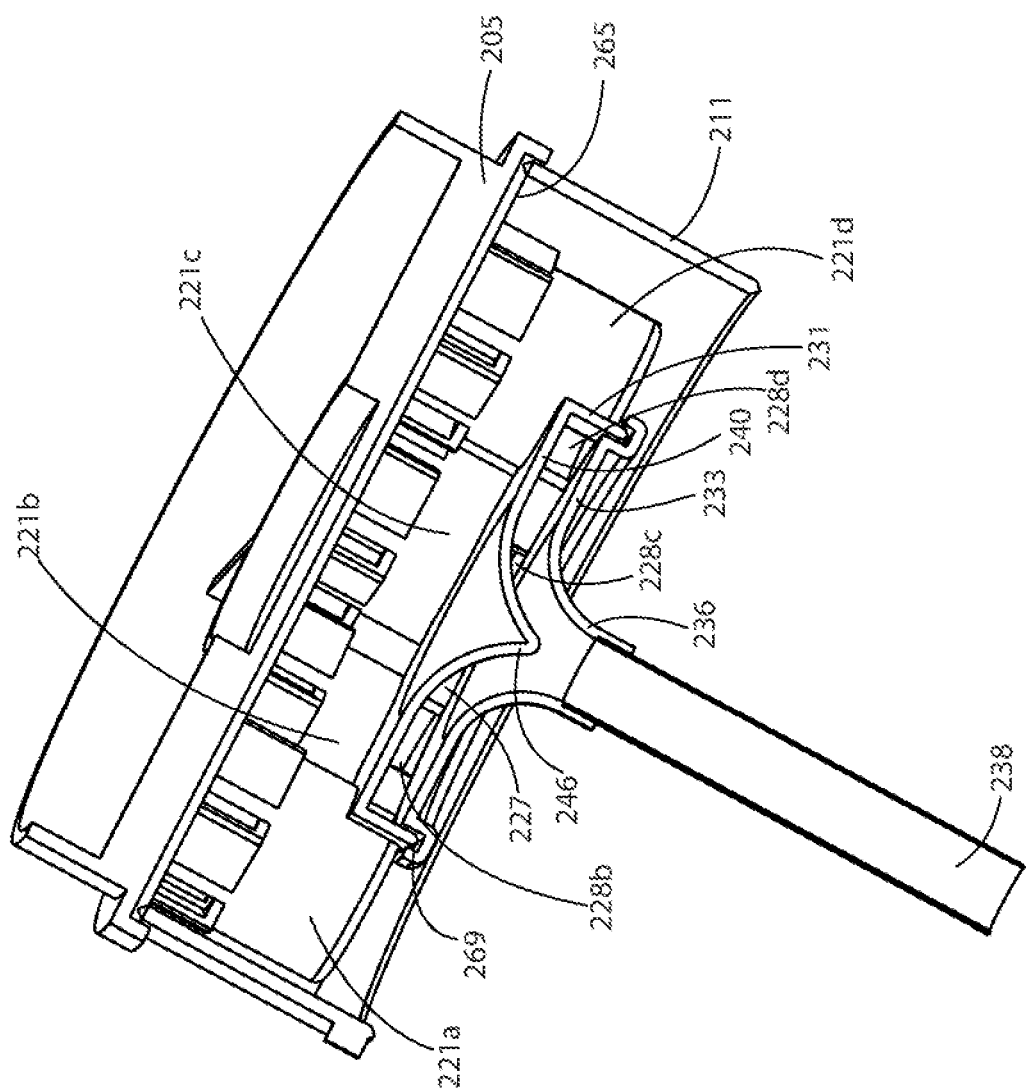
FIG. 39 is a perspective section view of the second cyclonic cleaning stage of FIG. 33, taken along line 39-39 shown in FIG. 35.
Figure 40:
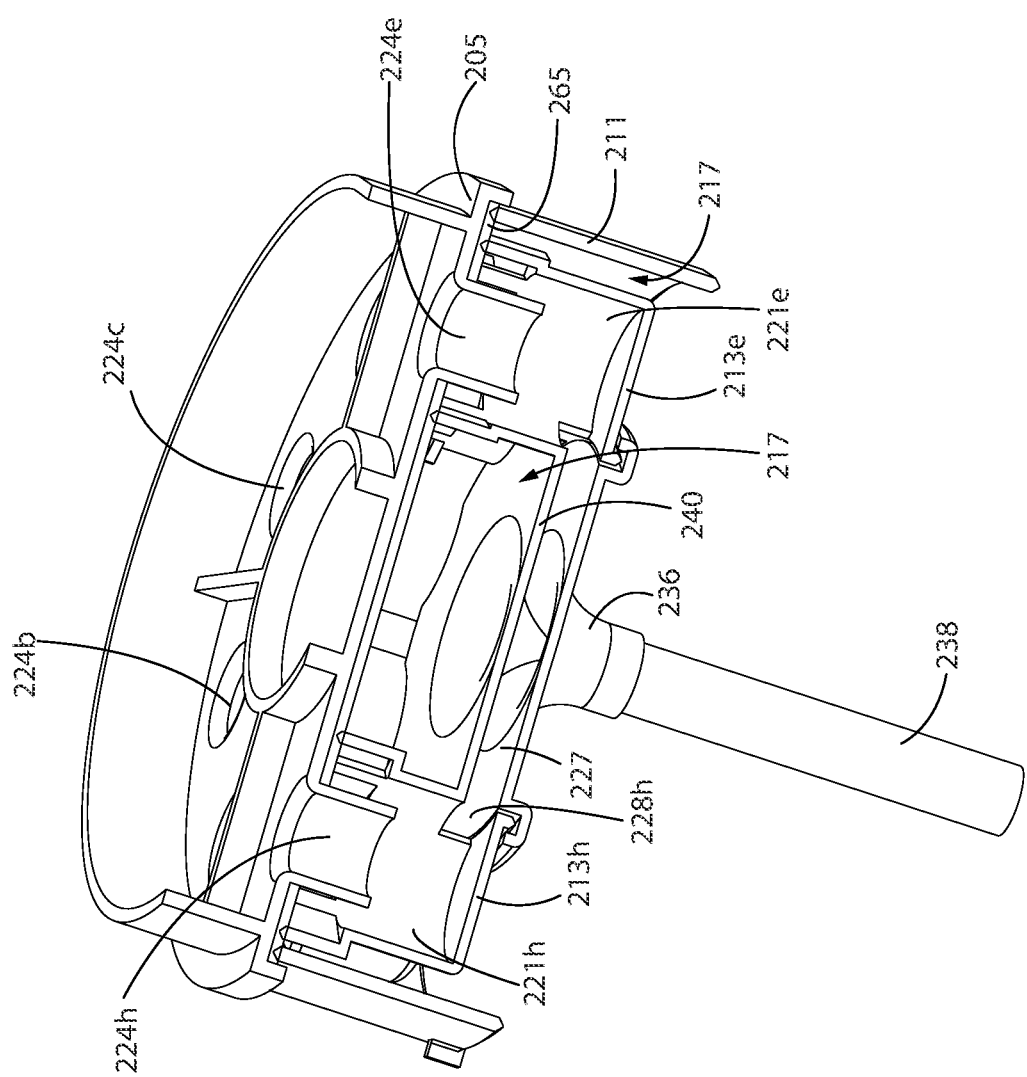
FIG. 40 is a perspective section view of the second cyclonic cleaning stage of FIG. 33, taken along line 40-40 shown in FIG. 35.
Figure 41:
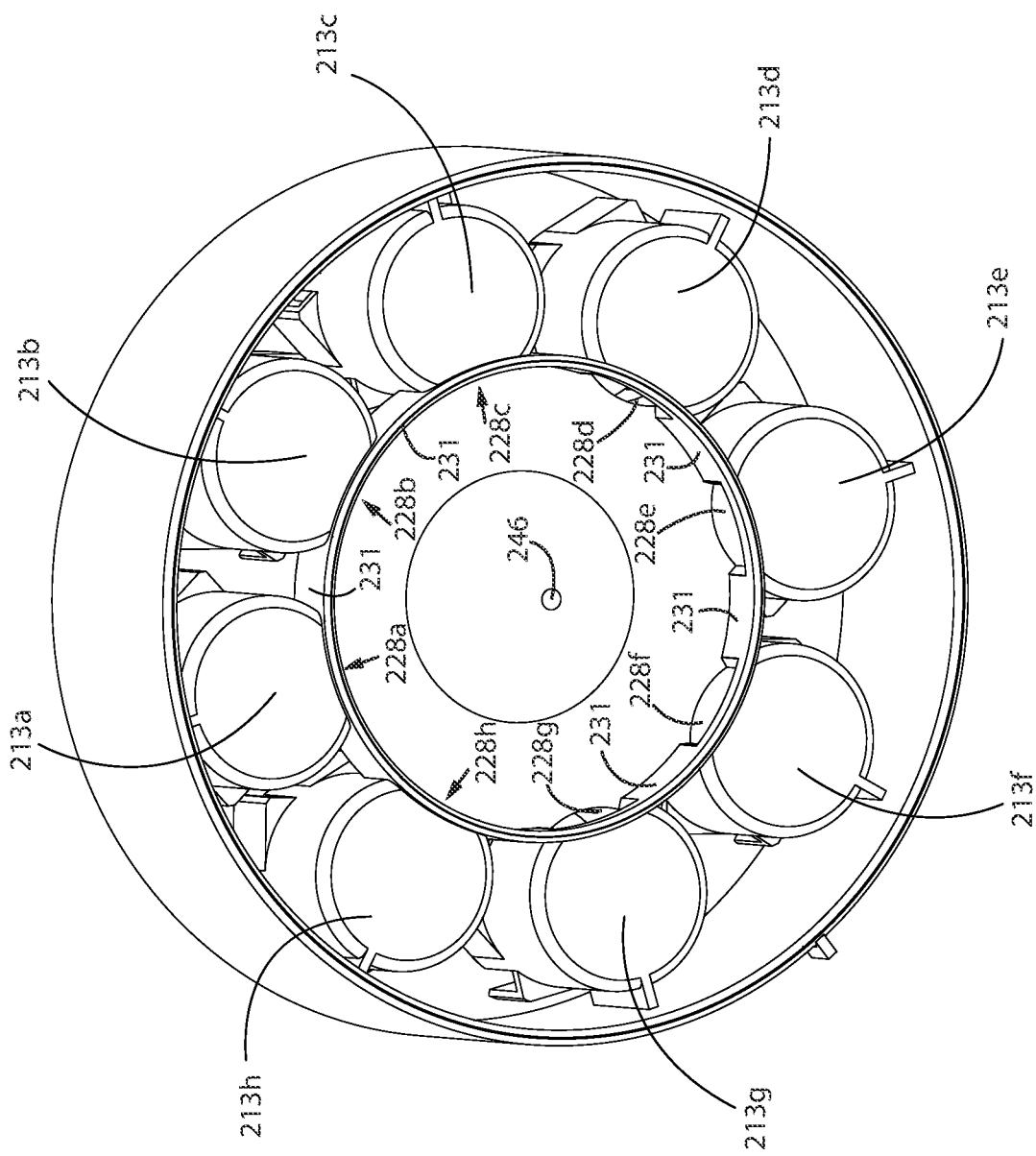
FIG. 41 is a perspective end view from the front end of the surface cleaning apparatus of the first ends of the second stage cyclones of the second cyclonic cleaning stage of FIG. 35.
Figure 42:
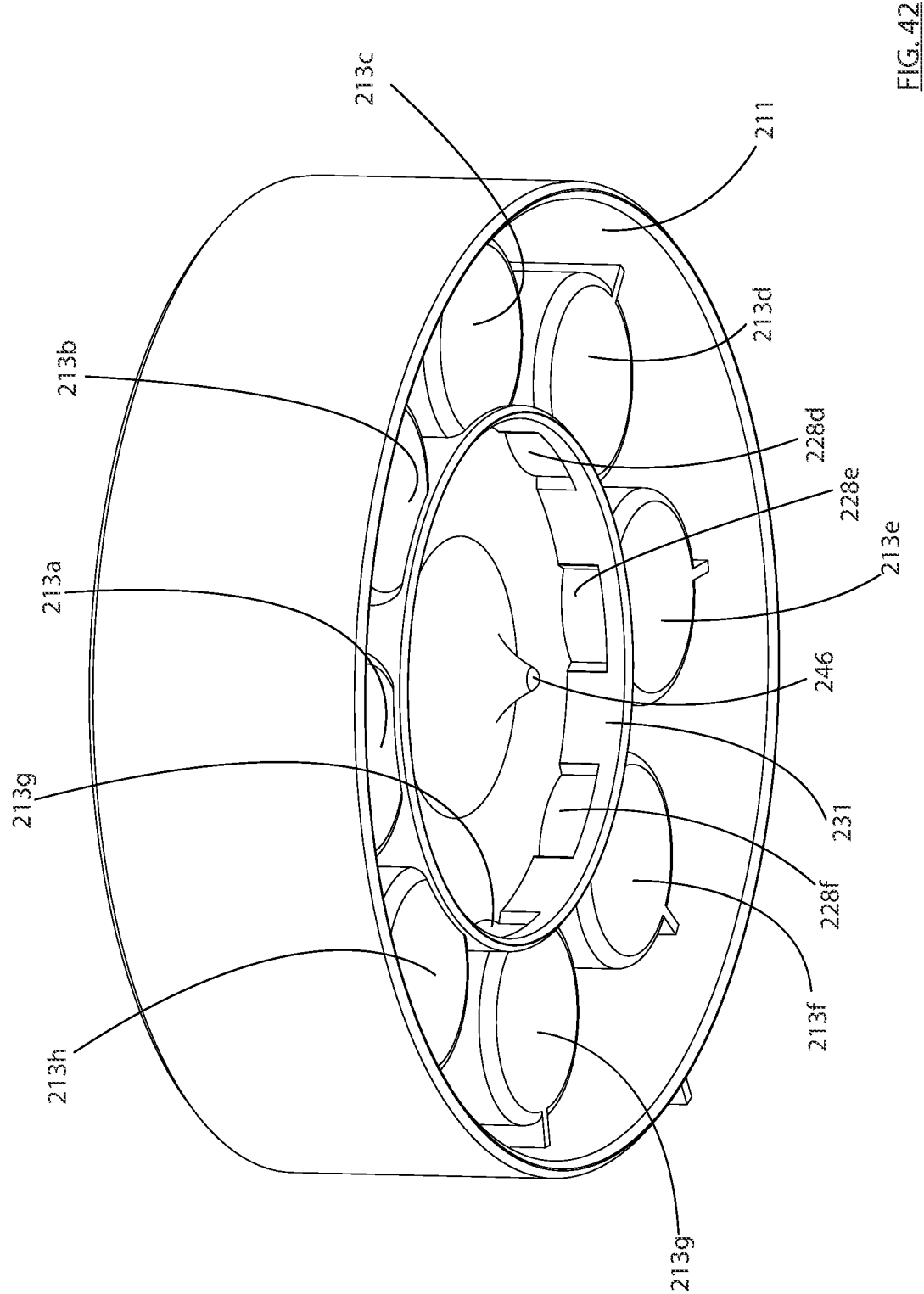
FIG. 42 is another perspective end view from the front end of the surface cleaning apparatus of the first ends of the second stage cyclones of the second cyclonic cleaning stage of FIG. 35.

As illustrated in FIG. 39, the intermediate plate 233 has a central recessed portion 236, with an aperture 234 located at a lower end of the recessed portion. As illustrated in FIG. 34, a conduit 238 extends from aperture 234 through the cyclone air outlet 114 of the first stage cyclone chamber 110, and to the second stage dirt collection region 229, which in this example is located below an arrestor plate 106 and at the first end 102 of the cyclone chamber 110.

In the embodiments illustrated in FIGS. 33 to 42, substantially all of dirt collection plenum 227 is positioned radially inwardly from the second stage cyclone chambers 220a-h. Such a design may have one or more advantages. For example, providing substantially all of the plenum 227 radially inwardly of the second stage cyclone chambers may result in a more compact design of a second cyclonic cleaning stage.

In the illustrated example, the intermediate wall 240 has a projection 246 that overlies the central recessed portion 236 of the intermediate plate 233. As a result, the distance between the intermediate wall 240 and the intermediate plate 233 (which may be characterized as the height of the dirt collection plenum 227 is substantially constant. Also, since the second stage cyclone chambers are provided with 'sideways' dirt outlets (i.e. at least a portion of, and preferably most or substantially all of the dirt exiting a second stage cyclone travels in a radial direction), the projection 246 may deflect dirt ejected from the second stage cyclone chambers towards the conduit 238 (e.g. towards the second stage dirt collection region 229).

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner having a front end having a dirty air inlet, a rear end, an upper end and a lower end, the hand vacuum cleaner comprising:
(a) an air flow path extending from the dirty air inlet to a clean air outlet, wherein a suction motor is provided in the air flow path, the suction motor has a motor axis of rotation;
(b) an air treatment stage having a front end and a rear end, the air treatment stage comprising a cyclone having a cyclone axis of rotation extending between the front and rear ends of the air treatment stage, wherein the cyclone and the suction motor are in a fixed position with respect to each other at all times while the hand vacuum cleaner is in use to clean a surface;
(c) an inlet conduit extending rearwardly from the dirty air inlet to the air treatment stage, the inlet conduit provided at the upper end of the hand vacuum cleaner and above the cyclone axis of rotation when the hand vacuum cleaner is positioned with the cyclone axis of rotation extends horizontally with the upper end of the hand vacuum cleaner above the lower end of the hand vacuum cleaner;
(d) a pistol grip handle provided at the rear end of the hand vacuum cleaner, the pistol grip handle has a hand grip around which all fingers of a user are wrapped when the user holds the hand vacuum cleaner and the hand grip is the sole hand grip around which the user may wrap their fingers;
(e) an arm member extending rearwardly from the inlet conduit to an upper end of the pistol grip handle, the inlet conduit having an inlet conduit axis that extends through the arm member; and,
(f) a housing provided at a lower end of the pistol grip handle,
wherein all operating components of the hand vacuum cleaner are located between a lower end of the housing and the inlet conduit, and
wherein the cyclone axis of rotation intersects the pistol grip handle and the motor axis of rotation intersects a central portion of the pistol grip handle.

2. The hand vacuum cleaner of claim 1 wherein all of the operating components of the hand vacuum cleaner are located between a lower end of the housing and a lower side of the inlet conduit.

3. The hand vacuum cleaner of claim 1 further comprising an enclosed finger grip area provided forward of the pistol grip handle.

4. The hand vacuum cleaner of claim 3 wherein the enclosed finger grip area is provided below the arm member and above the housing.

5. The hand vacuum cleaner of claim 1 wherein the front end of the air treatment stage is openable.

6. The hand vacuum cleaner of claim 5 wherein the front end of the air treatment stage is at the front end of the hand vacuum cleaner.

7. The hand vacuum cleaner of claim 1 wherein the front end of the air treatment stage is at the front end of the hand vacuum cleaner.

8. The hand vacuum cleaner of claim 1 wherein, when the cyclone axis of rotation extends horizontally with the upper end of the hand vacuum cleaner above the lower end of the hand vacuum cleaner, a dirt collection chamber underlies the cyclone.

9. The hand vacuum cleaner of claim 1 wherein, when the cyclone axis of rotation extends horizontally with the upper end of the hand vacuum cleaner above the lower end of the hand vacuum cleaner, a lower end of the air treatment stage is positioned below the lower end of the pistol grip handle.

10. A hand vacuum cleaner having a front end having a dirty air inlet, a rear end, an upper end and a lower end, the hand vacuum cleaner comprising:
   (a) an air flow path extending from the dirty air inlet to a clean air outlet, wherein a suction motor is provided in the air flow path, the suction motor has a motor axis of rotation;
   (b) an air treatment stage having a front end and a rear end, the air treatment stage comprising a cyclone having a cyclone axis of rotation extending between the front and rear ends of the air treatment stage, wherein the cyclone and the suction motor are in a fixed position with respect to each other at all times while the hand vacuum cleaner is in use to clean a surface;
   (c) an inlet conduit extending rearwardly from the dirty air inlet to the air treatment stage, the inlet conduit provided at the upper end of the hand vacuum cleaner;
   (d) a pistol grip handle provided at the rear end of the hand vacuum cleaner;
   (e) an arm member extending rearwardly from the inlet conduit to an upper end of the pistol grip handle, the inlet conduit having an inlet conduit axis that extends through the arm member;
   (f) a housing provided at a lower end of the pistol grip handle; and,
   (g) a finger grip area provided forward of the pistol grip handle, below the arm member and above the housing, wherein the pistol grip handle has a hand grip around which all fingers of a user are wrapped when the user holds the hand vacuum cleaner, the fingers extend through the hand grip area when the user holds the hand vacuum cleaner and the hand grip is the sole hand grip around which the user may wrap their fingers,
   wherein the cyclone is located below the inlet conduit and wherein the cyclone axis of rotation intersects the pistol grip handle and the motor axis of rotation intersects a central portion of the pistol grip handle.

11. The hand vacuum cleaner of claim 10 wherein all operating components of the hand vacuum cleaner are located below the inlet conduit.

12. The hand vacuum cleaner of claim 10 wherein the front end of the air treatment stage is openable.

13. The hand vacuum cleaner of claim 12 wherein the front end of the air treatment stage is at the front end of the hand vacuum cleaner.

14. The hand vacuum cleaner of claim 10 wherein the front end of the air treatment stage is at the front end of the hand vacuum cleaner.

15. The hand vacuum cleaner of claim 10 wherein the cyclone axis of rotation intersects the pistol grip handle.

16. The hand vacuum cleaner of claim 10 wherein, when the cyclone axis of rotation extends horizontally with the upper end of the hand vacuum cleaner above the lower end of the hand vacuum cleaner, a lower end of the air treatment stage is positioned below the lower end of the pistol grip handle.

17. A hand vacuum cleaner having a front end having a dirty air inlet, a rear end, an upper end and a lower end, the hand vacuum cleaner comprising:
   (a) an air flow path extending from the dirty air inlet to a clean air outlet, with a suction motor provided in the air flow path, the suction motor has a motor axis of rotation;
   (b) an air treatment stage having a front end and a rear end, the air treatment stage comprising a cyclone having a cyclone axis of rotation extending between the front and rear ends of the air treatment stage, wherein the cyclone and the suction motor are in a fixed position with respect to each other at all times while the hand vacuum cleaner is in use to clean a surface;
   (c) an inlet conduit extending rearwardly from the dirty air inlet to the air treatment stage, the inlet conduit provided at the upper end of the air treatment stage;
   (d) a pistol grip handle having an upper end and a lower end, wherein the upper end and the lower end are provided at the rear end of the hand vacuum cleaner rearward of the air treatment member and the suction motor, wherein the longitudinal axis intersects the suction motor and the pistol grip handle;
   (e) an arm member extending rearwardly from the inlet conduit to an upper end of the pistol grip handle, the inlet conduit having an inlet conduit axis that extends through the arm member;
   (f) a housing provided at a lower end of the pistol grip handle; and,
   (g) a finger grip area provided forward of the pistol grip handle and below the arm member, wherein the pistol grip handle has a hand grip around which all fingers of a user are wrapped when the user holds the hand vacuum cleaner, the fingers extend through the hand grip area when the user holds the hand vacuum cleaner and the hand grip is the sole hand grip around which the user may wrap their fingers,
   wherein the cyclone axis of rotation intersects the pistol grip handle and the motor axis of rotation intersects a central portion of the pistol grip handle.

18. The hand vacuum cleaner of claim 17 wherein the cyclone is an extension of the inlet conduit.

19. The hand vacuum cleaner of claim 17 wherein the cyclone is directly connected to the inlet conduit.

* * * * *